United States Patent [19]
Bouton et al.

[11] Patent Number: 5,610,631
[45] Date of Patent: Mar. 11, 1997

[54] RECONFIGURABLE JOYSTICK CONTROLLER RECALIBRATION

[75] Inventors: Frank M. Bouton; Rodney W. Kimmell, both of Beaverton, Oreg.

[73] Assignee: Thrustmaster, Inc., Hillsboro, Oreg.

[21] Appl. No.: 662,844

[22] Filed: Jun. 12, 1996

Related U.S. Application Data

[60] Division of Ser. No. 177,625, Jan. 5, 1994, Pat. No. 5,551,701, which is a continuation-in-part of Ser. No. 78,763, Jun. 15, 1993, abandoned, which is a continuation-in-part of Ser. No. 2,828, Jan. 7, 1993, Pat. No. 5,396,267, which is a continuation-in-part of Ser. No. 932,501, Aug. 19, 1992, Pat. No. 5,245,300, which is a continuation-in-part of Ser. No. 911,765, Jul. 9, 1992, abandoned.

[51] Int. Cl.$^6$ ................................................. G09G 5/08
[52] U.S. Cl. ........................ 345/161; 345/168; 273/148 B
[58] Field of Search .................................... 345/161, 156, 345/157, 168; 273/148 B, 438

[56] References Cited

U.S. PATENT DOCUMENTS

| | | |
|---|---|---|
| 4,321,851 | 3/1982 | Adachi . |
| 4,392,211 | 7/1983 | Nakano et al. . |
| 4,483,230 | 11/1984 | Yamauchi . |
| 4,501,424 | 2/1985 | Stone et al. . |
| 4,516,777 | 5/1985 | Nikora . |
| 4,588,187 | 5/1986 | Dell . |
| 4,659,313 | 4/1987 | Kuster et al. . |
| 4,703,302 | 10/1987 | Hino et al. . |
| 4,716,542 | 12/1987 | Pelz et al. . |
| 4,739,128 | 4/1988 | Grisham . |
| 4,804,940 | 2/1989 | Takigawa et al. . |
| 4,824,111 | 4/1989 | Hoye et al. . |
| 4,852,031 | 7/1989 | Brasington . |
| 4,868,780 | 9/1989 | Stern . |
| 4,924,216 | 5/1990 | Leung . |
| 4,976,435 | 12/1990 | Shatford et al. . |
| 5,134,395 | 7/1992 | Stern . |
| 5,245,320 | 9/1993 | Bouton . |
| 5,286,202 | 2/1994 | deGyarfas et al. . |
| 5,296,871 | 3/1994 | Paley . |
| 5,389,950 | 2/1995 | Bouton . |
| 5,396,267 | 3/1995 | Bouton . |

*Primary Examiner*—Kee M. Tung
*Assistant Examiner*—Matthew Luu
*Attorney, Agent, or Firm*—Marger, Johnson, McCollom & Stolowitz, P.C.

[57] ABSTRACT

A video game/simulator system in a personal computer (PC) with game port and keyboard port includes a joystick includes a base and a joystick handle pivotally mounted on the base for two-dimensional movement. The joystick controller is connectable to both the game port of the personal computer and to the keyboard port via a second, throttle controller. The throttle and joystick controller inputs are reconfigurable to work with different video game/simulator programs by downloading a new set of keycodes from the personal computer via the keyboard port to a microcontroller and nonvolatile memory in the throttle controller. The throttle and joystick controller have variable inputs which can be input to the PC in either analog or digital form. The digital inputs can be calibrated by changing their corresponding keycodes. A multi-stage trigger switch is hingedly mounted on the joystick for actuation by a user's index finger. The multi-stage trigger has a default position, a first actuated position, and a second actuated position and can be configured to fire a weapon in the first position and control a camera in the second position during operation of the video game/simulator.

12 Claims, 14 Drawing Sheets

AFTER BURNER RANGE GENERATES AB INC-DEC CHARACTERS.

THROTTLE RANGE GENERATES THR INC-DEC CHARACTERS.

IDLE RANGE GENERATES ENGINE START, ENGINE IDLE CHARACTERS.

RECONFIGURABLE JOYSTICK CONTROLLER RECALIBRATION

RELATED APPLICATION DATA

This application is a division of application Ser. No. 08/177,625, filed Jan. 5, 1994, now U.S. Pat. No. 5,551,701, which is a continuation-in-part of application U.S. Ser. No. 08/078,763, filed Jun. 15, 1993, now abandoned, which is a continuation-in-part of application U.S. Ser. No. 08/002,828 filed Jan. 7, 1993, now U.S. Pat. No. 5,396,267, which is a continuation-in-part of application U.S. Ser. No. 07/932,501 filed Aug. 19, 1992, now U.S. Pat. No. 5,245,320, which is a continuation-in-part of application U.S. Ser. No. 07/911,765 filed Jul. 9, 1992, now abandoned, and continued as application U.S. Ser. No. 08/140,329, filed Oct. 20, 1993, now abandoned in favor of continuation application U.S. Ser. No. 08/206,204, filed Mar. 2, 1994, now U.S. Pat. No. 5,389,950.

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyrights whatsoever.

BACKGROUND OF THE INVENTION

This invention relates generally to controllers for video games and simulators implemented on a computer and more particularly to reconfiguring game controllers to correspond to a particular video game.

Conventionally, a personal computer (PC) is enabled to be controlled by external manual control devices by means of a game card, which provides an external game port into which control devices, such as a joystick, can be plugged. To provide widespread compatibility, which is essential to the ability to mass market a wide variety of video games and simulation programs, industry standards have been developed for game cards for personal computers such as those commonly referred to as IBM-compatibles. The universal adoption of these standards means that any external manual input device designed to control such computers and software must be compatible with the industry-standard game port. Any input device lacking such compatibility will not be able to be used with conventional personal computers equipped with standard game boards and will not be widely accepted.

The problem is that the industry standard game port provides only a limited number of inputs: four discrete signal inputs for receiving binary signals signifying "On" and "Off" and four analog signal inputs for receiving variable voltage signals, such as output by a potentiometer, which are continuously variable over a limited range. The number of game boards that can be plugged into a conventional PC is also limited, to one. Consequently, the number of controllers supported by a standard game port, and the number of allowable functions communicated thereby, are severely restricted.

For example, a PC configured as a combat aviation video game/simulator as shown in FIG. 1 has a joystick controller and a foot-pedal rudder controller. The joystick conventionally has a handle pivotally coupled to a base for forward/rearward movement and left/right movement by the user. The handle is connected in the base to transducers, such as potentiometers, which are coupled to two of the analog inputs of the game port to input proportional signals to the PC microprocessor for controlling analog functions in the video game/simulation program. The handle also includes four discrete switches that are operable by the user's fingers to control discrete functions in the video game/simulation program. The joystick controller therefore consumes two of the analog inputs and all four of the discrete inputs.

Attempting to circumvent these limitations, video game and simulator programmers have implemented many commands by programming function keys on the PC keyboard. This approach detracts from the realism of simulation, which is particularly important to flight simulation video games. Developers have strived to attain more realism by designing microprocessor-based input devices which output keycodes to the PC keyboard port emulating function keys on the PC keyboard. One example is disclosed in U.S. Pat. No. 4,852,031 to Brasington. The assignee of the present invention has also marketed a throttle controller that outputs keycodes to the PC keyboard port. These efforts have been successful but require a manufacturer to design the controller to transmit a unique keycode for each individual controller input function.

Each video game has its own set of keycodes that it recognizes, with each keycode effectuating a corresponding response within the video game. There is no standard set of keycodes throughout the video game industry. Efforts to convert the keycodes supplied by a video game input to those required by a pre-existing video game program typically require a terminate-and-stay-resident ("TSR") program running on the computer concurrently with the video game. TSRs consume valuable memory and can potentially conflict with existing programs.

Another method of providing compatibility with new or existing video games requires the manufacturer to supply an updated version of the controller firmware to the user, usually in the form of a programmable-read-only-memory ("PROM"). This technique has several disadvantages. The first is that there is additional expense to the manufacturer in providing the updated firmware, which is ultimately passed on to the user. The second disadvantage is that most video game users are either unqualified or unwilling to install the PROM into their game controller. Installing the PROM incorrectly can render the controller inoperable by damaging the PROM or other electronic components due to electrostatic-discharge (ESD). Moreover, many video game users are simply unwilling to disassemble their game controllers for fear of damaging the device.

A related problem with video game controllers is a limitation on the number of inputs that can be supported by an individual controller. Currently, due in large part to the exponential growth in personal computer performance, video games can process many more inputs than can be supported on the one or two controllers that can be reasonably handled by an individual user. As a result, only a select few of the available video game inputs are actually used by the user.

The problem is exacerbated by real-time video games such as flight simulators where the user is required to supply the appropriate input in a timely manner or terminate the simulator, i.e., crash. The user in these real-time video games does not have time to change controllers or even to reposition the user's hands on the current controllers. For example, when engaging an adversary during simulated air combat, the user must be able to activate a camera to be begin recording the engagement. The user cannot take the time or the risk to reposition his hands for fear of losing sight of the adversary.

Accordingly, a need remains for a way to add camera activation capability to a video game system which does not require the user to reposition the user's hands.

SUMMARY OF THE INVENTION

It is, therefore, an object of the invention is to enable the user to reconfigure their video game controllers to match the users's individual preference for location of desired functions on the controller.

Another object of the invention is to enable the user to reconfigure their video game controllers to match the user's video game/simulator of choice.

Another object is to enable the user to add camera activation capability to a video game system.

Another object is to enable the user to reconfigure the camera activation function to match a particular video game/simulator.

A further object of the invention is to eliminate the need for a terminate and stay resident ("TSR") program running on the computer for use with the video game controllers.

One aspect of the invention enables the individual switches and input devices of the game controllers to be reconfigured to match a target video game format. The video game/simulator system includes a personal computer (PC) running a video game program during a functional mode and a reconfiguration program during a reconfiguration mode. The video system can include several game controllers such as a joystick, a throttle controller, and a foot-pedal rudder controller. In the preferred embodiment of the invention, the throttle controller includes microcontroller circuitry that acts as both a video game controller and a reconfiguration engine. In an alternative embodiment, the reconfiguration electronics are included in a joystick controller. The throttle controller, including the reconfiguration electronics, is coupled to a keyboard interface port to receive reconfiguration keycodes downloaded from the PC to the throttle controller during the reconfiguration mode. The throttle controller also allows the keyboard to operate in a conventional manner during the functional mode. A joystick is coupled to the throttle controller to receive joystick input signals therefrom. The throttle controller transmits keycodes via the keyboard interface port corresponding to the inputs received by the controller, including its own, during the functional mode. The keycodes transmitted by the controller to the PC need to correspond to those required by the particular video game/simulation program to effectuate a user's desire response to the program. To meet this need for different programs, the PC includes means for downloading the reconfiguration keycodes to the throttle controller reconfiguration engine over the keyboard interface port during the reconfiguration mode.

A reconfiguration program runs on the personal computer prior to invoking the video game program. The reconfiguration program preferably presents a graphical representation of the individual game controllers and allows the user to input a keycode corresponding to each of the controller inputs. The user can either type the keycodes in individually or, alternatively, specify a pre-stored file including a previously-entered set of keycodes. Thus, the user can save separate reconfiguration file in the PC memory for a number of separate video games. The reconfiguration program further enables the user to calibrate the game controllers during the reconfiguration mode. Finally, the reconfiguration program downloads the keycodes to the throttle controller circuitry to be stored in a non-volatile memory in the controller so as to retain the last set of downloaded keycodes even after the video program has been terminated. The throttle controller's reconfiguration engine reconfigures the input devices of the game controllers so as to transmit a reconfiguration keycode downloaded to correspond to a particular controller input when that input is actuated.

In another aspect of the invention, a multi-stage trigger switch is mounted on a joystick controller. The multi-stage trigger has a default position, a first actuated position, and a second actuated position. The first and second actuated positions can be assigned any desired keycode to correspond to any desired function by the reconfiguration program. In the preferred embodiment, the first actuated position corresponds to a camera command and the second actuated position corresponds to a fire activation command.

A significant advantage of the invention is the ability to retain the configuration information even after the video program has been terminated and the machine is turned off while enabling the configuration to be changed electrically without physical replacement of the storage devices.

Another advantage of the invention is the ability to provide both analog and digital throttle, pitch, and roll to the computer.

A further advantage of the invention is the ability to calibrate the controllers and thereby use less precise components in the controllers.

The foregoing and other objects, features and advantages of the invention will become more readily apparent from the following detailed description of a preferred embodiment of the invention which proceeds with reference to the accompanying drawings.

APPENDIX A is an example of a reconfiguration file for a throttle controller according to the invention.

APPENDIX B is a printout of an example of source code for programming the host computer to operate according to the invention.

APPENDIX C is a printout of an example of source code for programming the microcontroller to operate according to the invention.

DETAILED DESCRIPTION OF THE PREFERRED EMBODIMENT OF THE INVENTION

Figure 1:
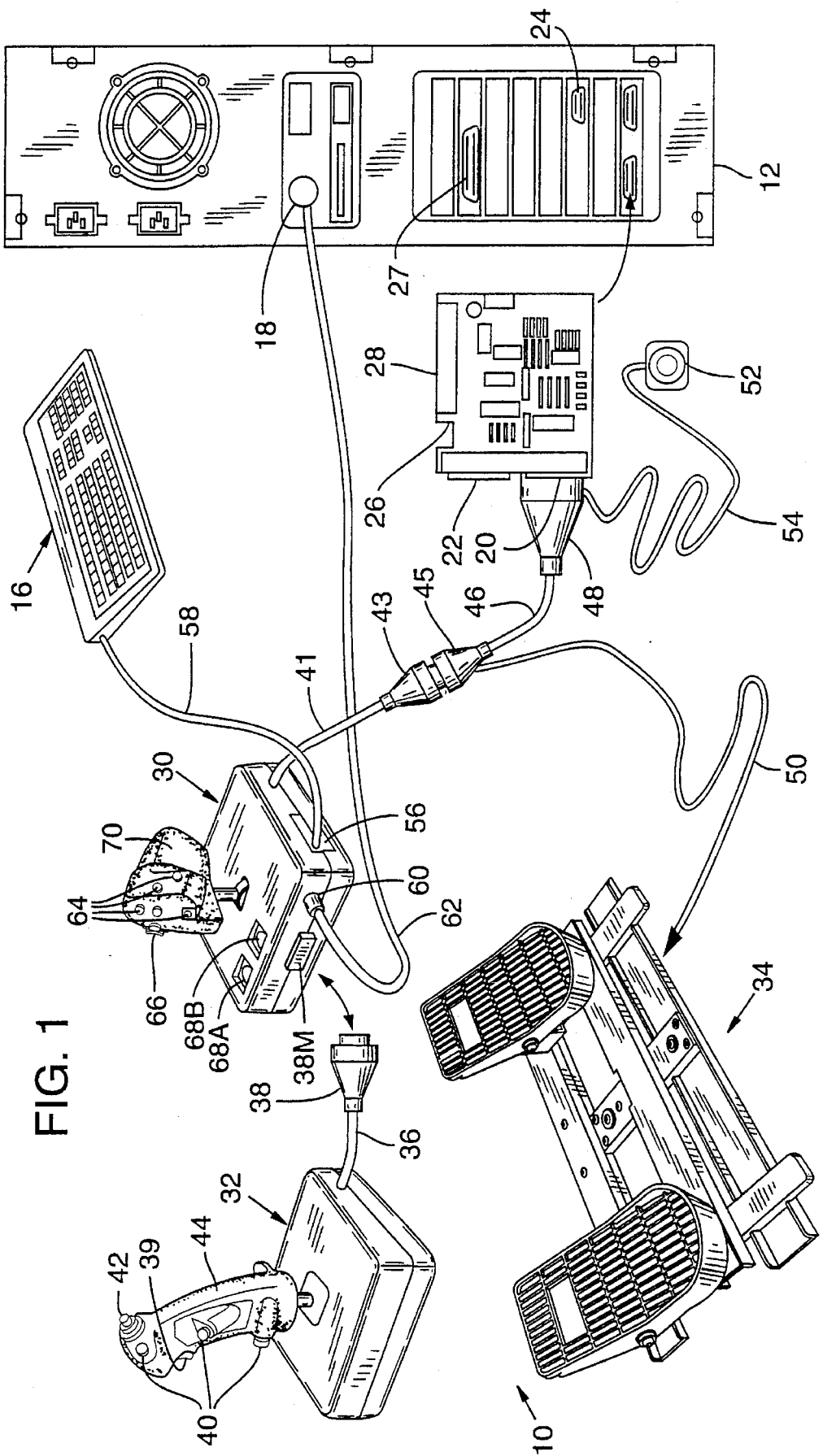
FIG. 1 is a perspective view of a video game/simulator system including a personal computer and several game controllers connected according to the invention.
Figure 11:
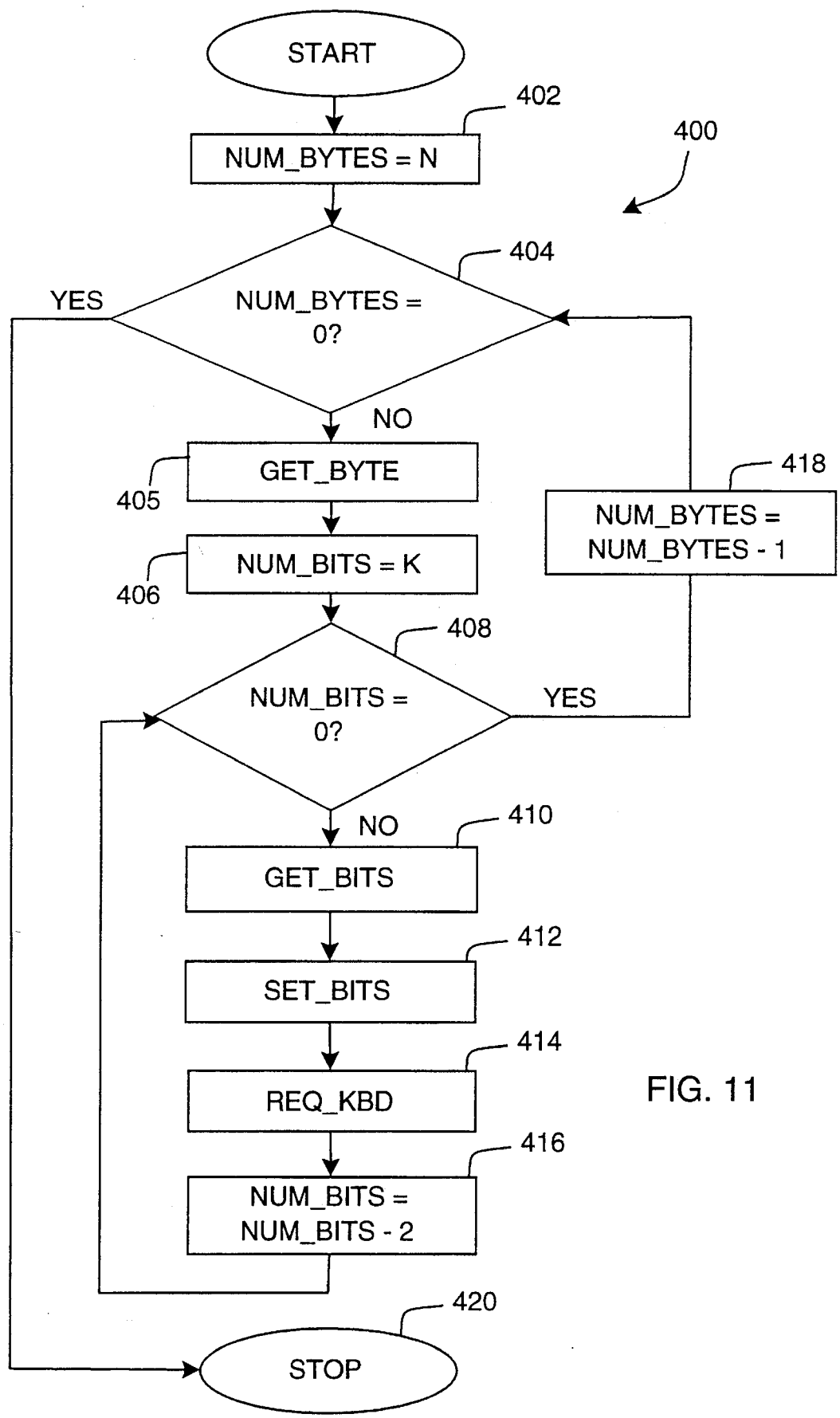
FIG. 11 is a flowchart showing the operation of the transmit keycodes step of FIGS. 9 and 10.
Figure 12:
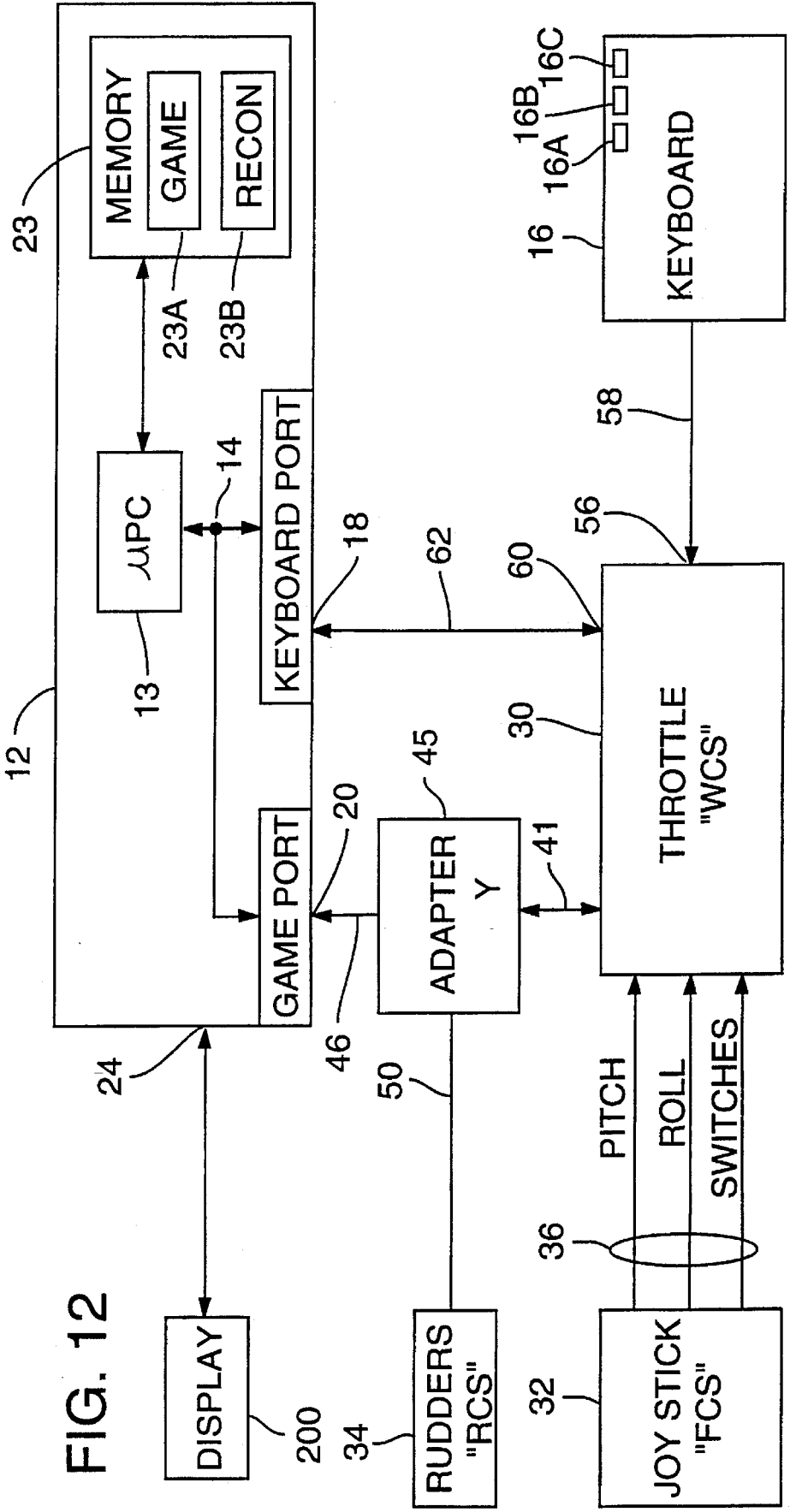
FIG. 12 is a block diagram of the reconfiguration video game/simulation system of FIG. 1.

FIG. 1 shows a video game/simulation system 10 for simulating operation of a complex system having a plurality of user-controlled functions such as a combat aviation video game program. As shown in FIG. 1, the system includes a conventional personal computer (PC) 12. Referring also to FIG. 12, the personal computer includes a microprocessor 13 operable under control of a video game/simulation program stored in memory 23 during a functional mode or, according to the invention, operable under control of a reconfiguration program during a reconfiguration mode. The design and operation of the reconfiguration program and circuitry is described below with reference to FIGS. 2–11. The computer also includes an input/output bus for connecting peripheral input and output devices to the microprocessor 13, e.g., a game card 30, and a keyboard port 18 for a conventional keyboard 16. A conventional video display (200) is used for displaying images produced by operation of the program in the microprocessor.

Included on the computer 12, typically on the backside as shown in FIG. 1, are the input or output ports of the computer. The computer 12 includes a keyboard interface port 18 for, under normal operations, connecting the keyboard 16 to the computer, as well as a video port 24 for connecting to the display.

Also included on the computer 12 are two game ports 20 and 22. The dual game ports 20 and 22 are shown as if game board 26 were inserted into the computer input/output bus. The multi-ported game board 26 inserts along horizontal guides within the computer such that male edge connector 28 makes electrical contact with the input/output bus of the computer. The multi-ported game board 26 is described further in commonly assigned U.S. Pat. No. 5,245,320, MULTIPORT GAME CARD WITH CONFIGURABLE ADDRESS, Ser. No. 07/932,501, filed Aug. 19, 1992, which is a continuation in part of copending application VIDEO GAME/FLIGHT SIMULATOR CONTROLLER WITH SINGLE ANALOG INPUT TO MULTIPLE DISCRETE INPUTS, Ser. No. 07/911,765, filed Jul. 9, 1992, both of which are incorporated herein by reference.

Preferably, for running aviation video games and simulation programs, both a throttle controller 30 and a joystick controller 32 are connected to the computer, as well as a foot-pedal rudder controller 34. The joystick controller 32 includes cable 36 having a game port connector 38. The game port connector 38 is connectable to a mating game port connector 38M, like game ports 20 and 22, on throttle controller 30. The joystick controller 32 includes a plurality of input devices including a multi-stage switch 39, switches 40, hat 42, as well as the joystick handle 44. All of the input information, including the state of the switches and hat, is conveyed over the cable 36 to the throttle controller 30 for further processing as described further below.

Figure 14:
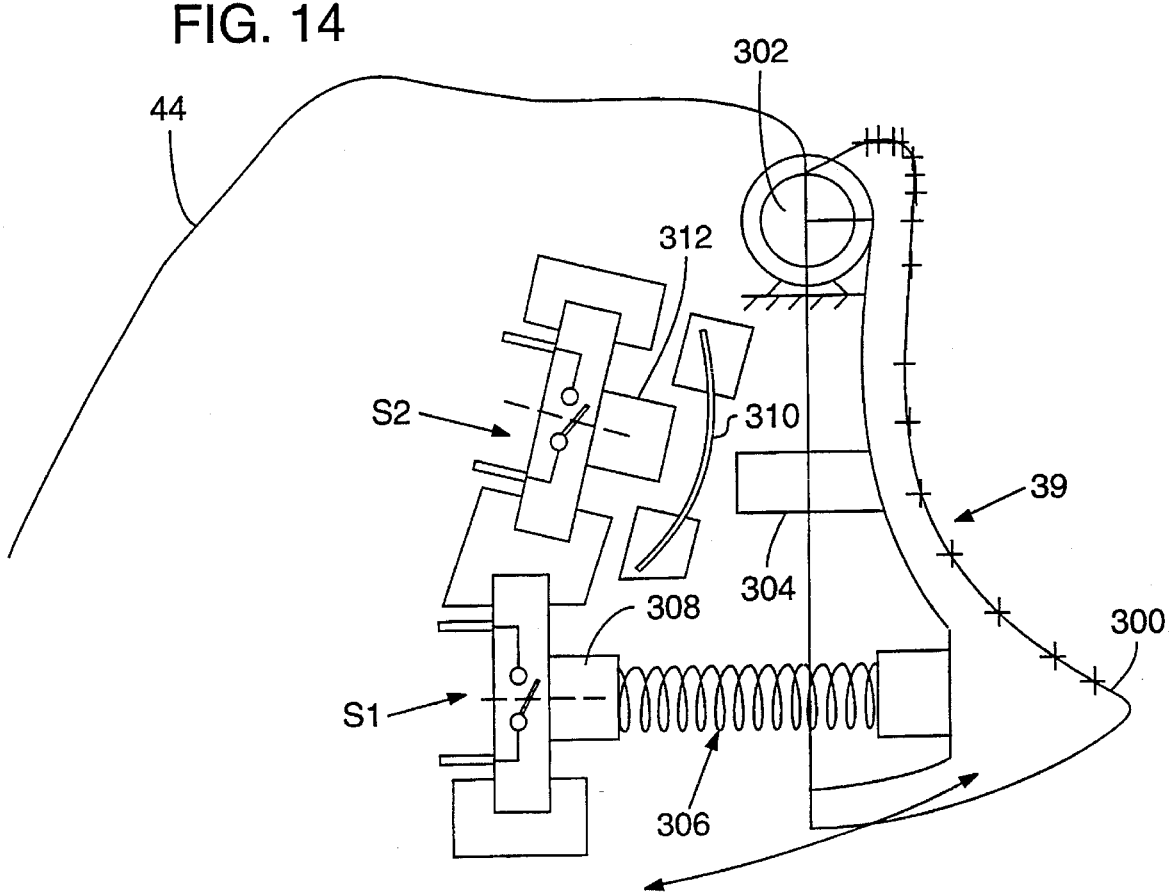
FIG. 14 is a cross section of the joystick of FIG. 1 showing details of a dual stage trigger according to the invention.

Referring now to FIG. 14, the multi-stage trigger switch 39 is hingedly mounted on a front side of the joystick controller handle 44 at a position where a user's index finger normally resides when using the joystick. The multi-stage trigger 39 includes a trigger lever 300 that is hingedly mounted on the handle 44 by a pivot member 302. The trigger lever is received in a slot along the front side of the handle 44 to allow the trigger lever to be movable towards the handle 44. An actuator member 304 is connected to an inner wall of the trigger lever 300 to actuate a switch S2. A spring 306 is coupled between the underside of the trigger lever 300 and a switch S1. The spring 306 biases the lever 300 outward.

The two switches S1 and S2 are fixedly mounted in the handle 44 for selective actuation by the trigger lever 300. The spring 306 is mounted on an actuator stem 308 of switch S1 to be actuated thereby when the spring 306 is compressed by the trigger lever 300. A flat spring 310 is mounted opposite a switch actuator stem 312 of switch S2. The flat spring 310 is interposed between the actuator member 304 and the actuator stem 312 to require an additional force beyond that required to actuate S1 to be exerted on the trigger lever 300 in order to actuate switch S2. The flat spring 310 is actually somewhat of a misnomer because the flat spring 310 is actually concave.

The multi-stage trigger switch 39 has a default unactuated position, a first actuated position, and a second actuated position. The unactuated position corresponds to the position shown in FIG. 14 wherein neither switch S1 or S2 are actuated. The first actuated position corresponds to where the trigger lever 300 is slightly compressed thereby actuating only switch S1. In the preferred embodiment, actuating switch S1 would activate a video camera in the video game. The second actuating position corresponds to having the trigger lever 300 completely depressed with sufficient force to cause the actuator member 304 to deform the flat spring 310 and thereby depress actuator stem 312. Thus, in the second actuated position both switch S2 and S1 are actuated. In the preferred embodiment, the second actuated position activates the weapons system in the video game/simulator.

In an alternative embodiment, the multi-stage trigger 39 can have a plurality of individual positions, e.g., three or four, limited mainly by the travel of the switch. In the preferred embodiment of the invention, the joystick controller 32 adds an additional conductor to the cable 36 to transmit an electrical position signal which indicates whether the switch is in the second actuated position. Thus, cable 36 has a total of nine conductors for all of the joystick outputs. If the multi-stage switch 39 has more than two actuated positions, the cable requires an additional conductor for each additional position, or the use of a discrete switch multiplexing circuit.

Referring again to FIG. 1, the throttle controller 30 is shown connected to game port 20 of game card 26 ultimately residing in the housing of computer 12, as described above. The throttle controller 30 includes a cable 41 having a game port connector 43 at one end. Connected to the connector 43 is a mating game port Y-connector 45 which couples the throttle controller output signals from cable 41 and also the foot-pedal rudder controller position signals from signal line 50 across cable 46 to connector 48 which is connected to game port 20. The foot-pedal rudder controller signal line 50 is coupled to an analog signal line of cable 46 unused by throttle controller 30. Optionally, a calibration knob 52 is connected to game port 20 across signal line 54, and is used to calibrate the controller input signals.

The throttle controller 30 further includes a keyboard input port 56 which is shown coupled to the keyboard 16 through a keyboard output cable 58. The keyboard input port 56 receives the keycodes transmitted from the keyboard 16 across cable 58 responsive to a user depressing one of the keyboard keys. The throttle controller 30 also includes a keyboard input/output port 60 which is coupled to the computer keyboard interface 18 across cable 62.

The throttle controller 30 has a plurality of input devices including discrete switches 64, three-way switches 66 and 68, and throttle 70. The throttle 70 can either be two separate throttle members, i.e., split-throttle, as in the preferred embodiment, or a single throttle member. In addition, throttle controller 30 can include a trackball mounted on the throttle handle near where the thumb naturally rests on the handle, as described in U.S. Pat. No. 5,245,320. If the trackball is included, the trackball encoder outputs can be coupled to a serial input 27 of the computer to act as a "mouse" to move a cursor on the computer display 200 (FIG. 12).

Referring to FIG. 12, a block diagram of the above-described configuration is shown. Shown in FIG. 12 is a display 200 coupled to the video port 24 of the personal computer 12. Also shown in FIG. 12 are keyboard indicator lights 16A, 16B and 16C on keyboard 16 representing the current state of the NUM lock key, the CAPS lock key and the SCROLL lock key. The state of the keyboard lights 16A–16C is controlled by the personal computer 12 during normal mode operation, as is known in the art of computer programming. The personal computer 12 transmits the desired state of these lights via the keyboard port 18 to the keyboard 16 during normal operations. The invention uses this capability to download reconfiguration keycodes to the throttle 30 during the reconfiguration mode, as described further below.

Figure 13:
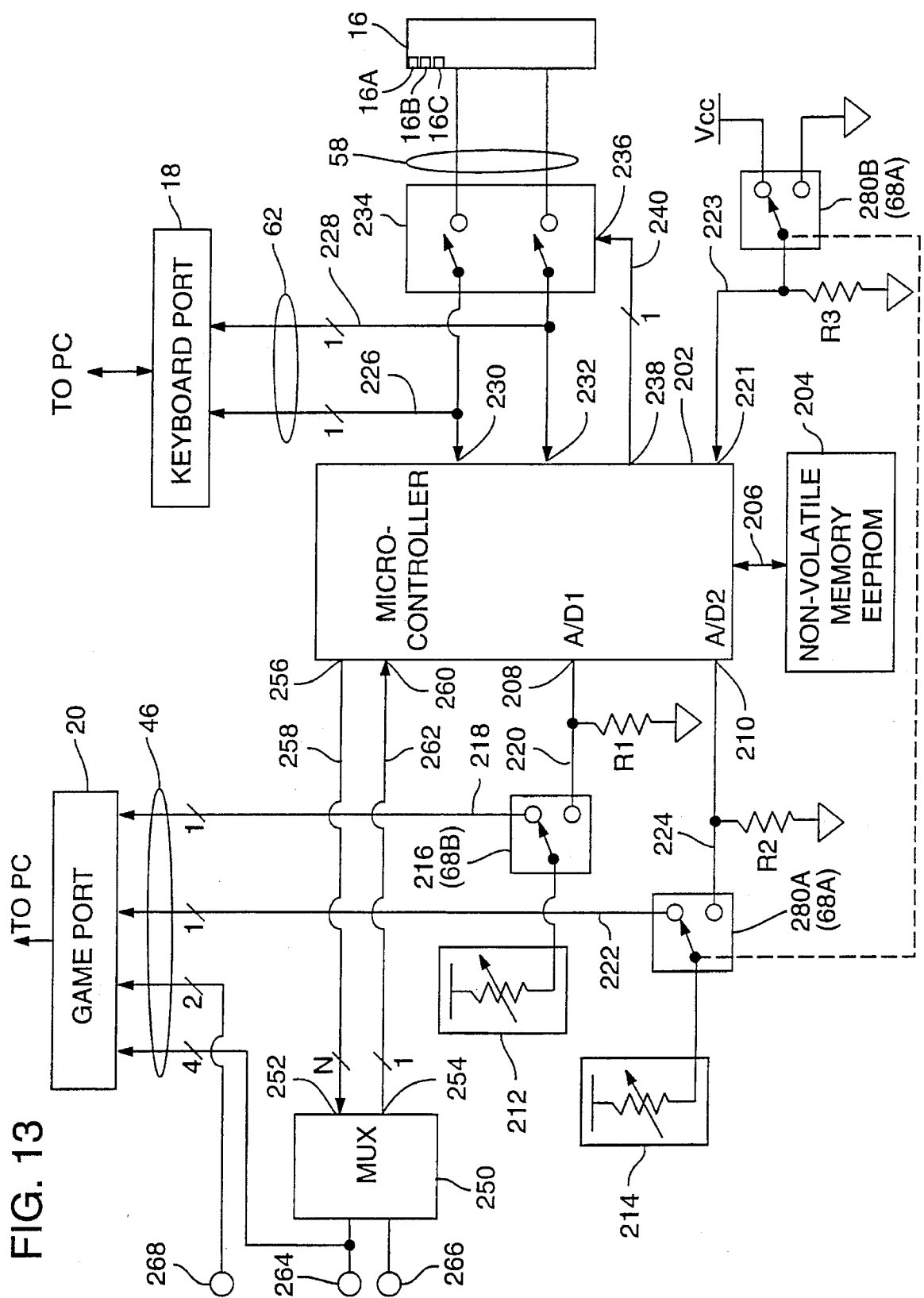
FIG. 13 is a schematic level diagram of the circuitry used in the system of FIG. 12.

Referring now to FIG. 13, a more detailed schematic level drawing of the throttle electronics is shown. The throttle electronics include a microcontroller 202, which, in the preferred embodiment, is a PIC16C71 manufactured by Microchip of Chandler, Ariz. Coupled to the microcontroller 202 is a nonvolatile memory 204 over bus 206. The nonvolatile memory 204 stores keycodes corresponding to the individual input devices, e.g., switches 40. The nonvolatile memory is a read-write memory such as a electrically-erasable programmable read-only memory (EEPROM). The nonvolatile memory must be both read and write so that microcontroller 202 can store reconfigurable keycodes received from the personal computer over the cable 62, as described further below. In the preferred embodiment, the nonvolatile memory is a 1K×8 serial EEPROM, part number 93LC46 or equivalent, manufactured by Microchip of Chandler, Ariz.

The microcontroller 202 further includes A-to-D converter inputs 208 and 210 (A/D1, A/D2) for converting an analog input voltage signal received from input devices 30, 32 to corresponding digital values. The microcontroller 202 further includes a plurality of I/O ports (230, 232, 238, 256, 260) for reading from and writing to the other electronic components. In addition, the microcontroller has an internal nonvolatile memory (not visible) wherein the executable code for the microcontroller is stored. Alternatively, the executable code could be located in an off-chip nonvolatile memory and even the nonvolatile memory 204 itself, depending on the particular microcontroller selected.

Figure 17:
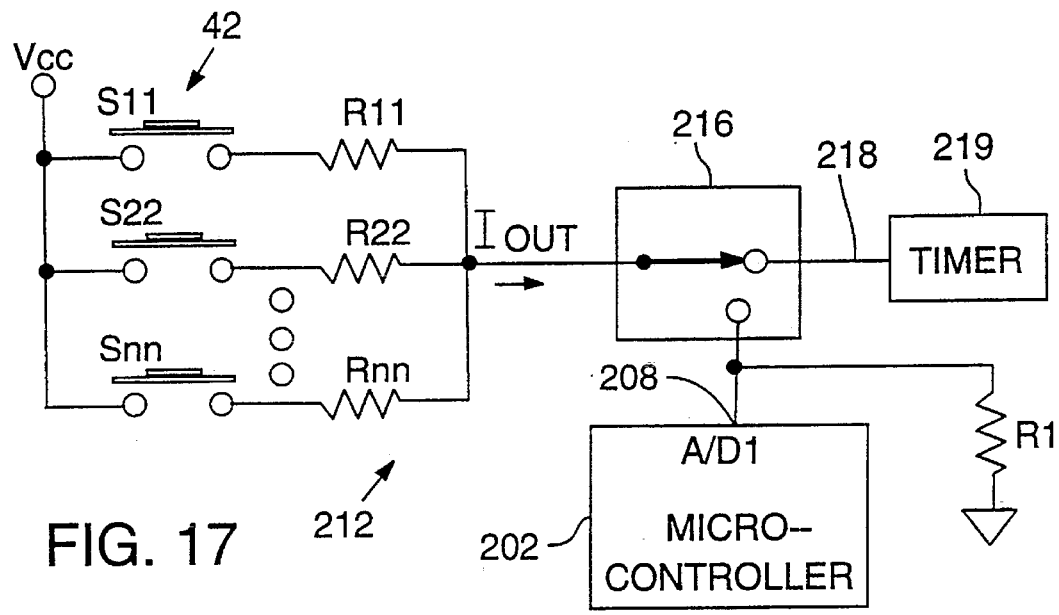
FIG. 17 is a schematic view of the joystick hat coupled to a game board circuit as shown in FIG. 1.

Coupled to the analog-to-digital inputs 208 and 210 are rheostats 212 and 214, respectively. Rheostat 212 corresponds to the output of the hat switch 42 located on the joystick handle 44 as shown in FIG. 1. Thus, moving the hat switch 42 changes the resistance of the rheostat 212 and, therefore, the current produced by the rheostat. A preferred embodiment of rheostat 212 is shown in FIG. 17. A switch 216 is interposed between rheostat 212 and the A-to-D input 208. Connected between the switch 216 and an analog input of the game port 20 is an analog signal line 218. Line 220 is connected between the switch 216 and the A-to-D input 208. A resistor R1 is coupled between line 220 and ground to convert the rheostat 212 to a potentiometer, i.e., a variable voltage source, when switch 216 is set to connect the rheostat 212 to the line 220. Switch 216 corresponds to switch 68B shown in FIG. 1. Switch 216, therefore, enables the hat switch 42 to be operated either in an analog mode wherein the rheostat output is coupled to the analog game port input, or a digital mode wherein the rheostat output is coupled to the A-to-D input 208 and thereafter converted to a corresponding digital keycode which is then transmitted to the personal computer via the keyboard interface 18.

Referring now to FIG. 17, a preferred embodiment of the rheostat 212 and hat switch 42 circuit is shown. Each switch in the circuit corresponds to one of the discrete settings on the hat switch, i.e., center, top, bottom, left, and right. The circuit is arranged so that each switch S11, S22, . . . Snn is connected in series with a corresponding resistor R11, R22, . . . Rnn to form a single switching subcircuit and all of the switching subcircuits are connected between the common input voltage node and a single output node coupled to said one analog output signal line. In this circuit it is preferred for each resistor to have a different value of resistance so that the actuation of each switch produces a separate discrete current level $I_{OUT}$ through switch 216, when the switch 216 is set in the analog mode. Alternatively, the hat switch circuit can be arranged in a ladder circuit with the switches S11, S22, . . . Snn connected between the common input node and a series at output nodes coupled in series by separate resistors to a single output node coupled to said one analog output signal line. In that circuit it is preferred for each resistor to have the same value of resistance.

Figure 18:
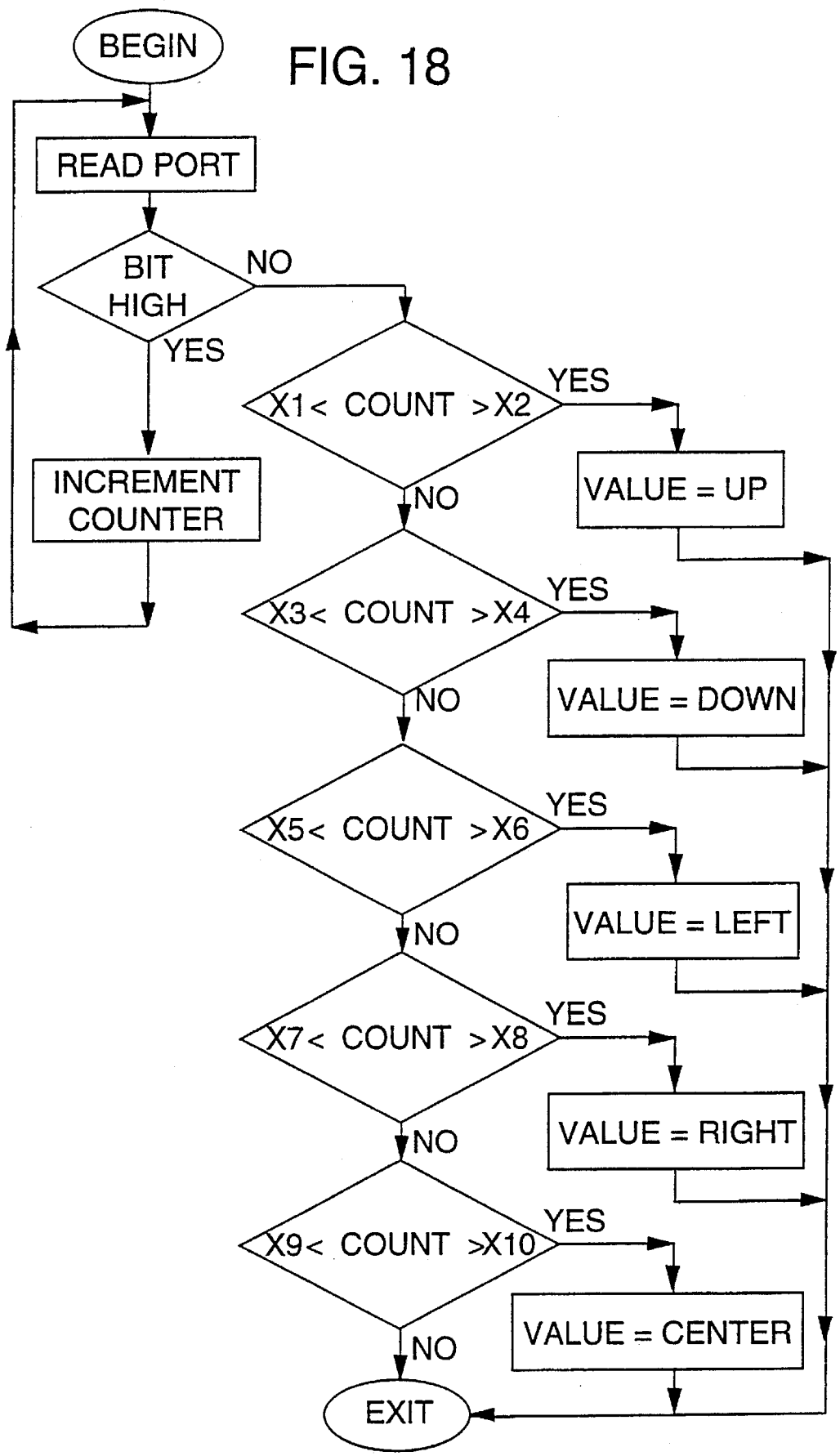
FIG. 18 is flow chart for an input control routine to be used in a video game or simulator software for interpreting analog outputs from the joystick hat switch of FIG. 1.

Included in the game board is a timer 219 that produces a digital pulse having a pulse width proportional to the current $I_{OUT}$ coupled thereto. The game board timer 219 converts the different discrete current levels on the analog output signal line 218 into different duration signals. A subroutine, shown in FIG. 18, is included in the video game/simulation program for timing the different duration signals and selecting a unique control command in the program in accordance with the timed duration. In this way, the personal computer interprets each different discrete level of signal as a separate discrete command and inputs such command to the video game/simulation program to effect a corresponding change in the displayed images produced by the program.

A similar routine to that shown in FIG. 18 is included in the microcontroller 202 firmware for interpreting the discrete voltage levels produced at the analog-to-digital input 208 when switch 216 is placed in the digital mode setting. Each discrete voltage level is assigned a corresponding keycode. When that discrete voltage level is sensed at the analog-to-digital input 208, the assigned corresponding keycode is transmitted to the personal computer over the keyboard interface port.

Referring again to FIG. 13, a rheostat 214, corresponding to the throttle handle 70 position, is coupled to either one of the analog inputs of the game port 20 or the A-to-D input 210. Switch 280A, which corresponds to the three position switch 68A of FIG. 1, connects the rheostat 214 output to either line 222 connected to the game port 20 or line 224 connected to the A-to-D input 210. Line 224 also has a resistor R2 coupled thereto for converting the rheostat 214 to a potentiometer when the rheostat is coupled to the A-to-D input 210. Thus, the throttle controller 30 can either be operated in an analog mode or a digital mode, depending on the state of switch 280A. The analog throttle is used in so-called "Type 0" games, whereas the digital throttle mode is used in "Types 1 and 2" games.

The three position switch includes a third position shown as a separate switch 280B in FIG. 13. The third position places the throttle in a calibration mode as described further below. The third position of the switch 280B can also be a separate switch that is switchable between the calibration mode and a normal mode. The third position of the switch is shown as a connecting a common supply voltage VCC to an input/output port 221 of the microcontroller 202 in the calibration mode and a ground voltage in the functional modes, i.e., the digital and analog modes. When the switch is placed in the third position, the microcontroller senses a voltage on port 221 and the microcontroller branches to a calibration routine responsive thereto. The operation of the calibration routine is described below.

Figure 19:
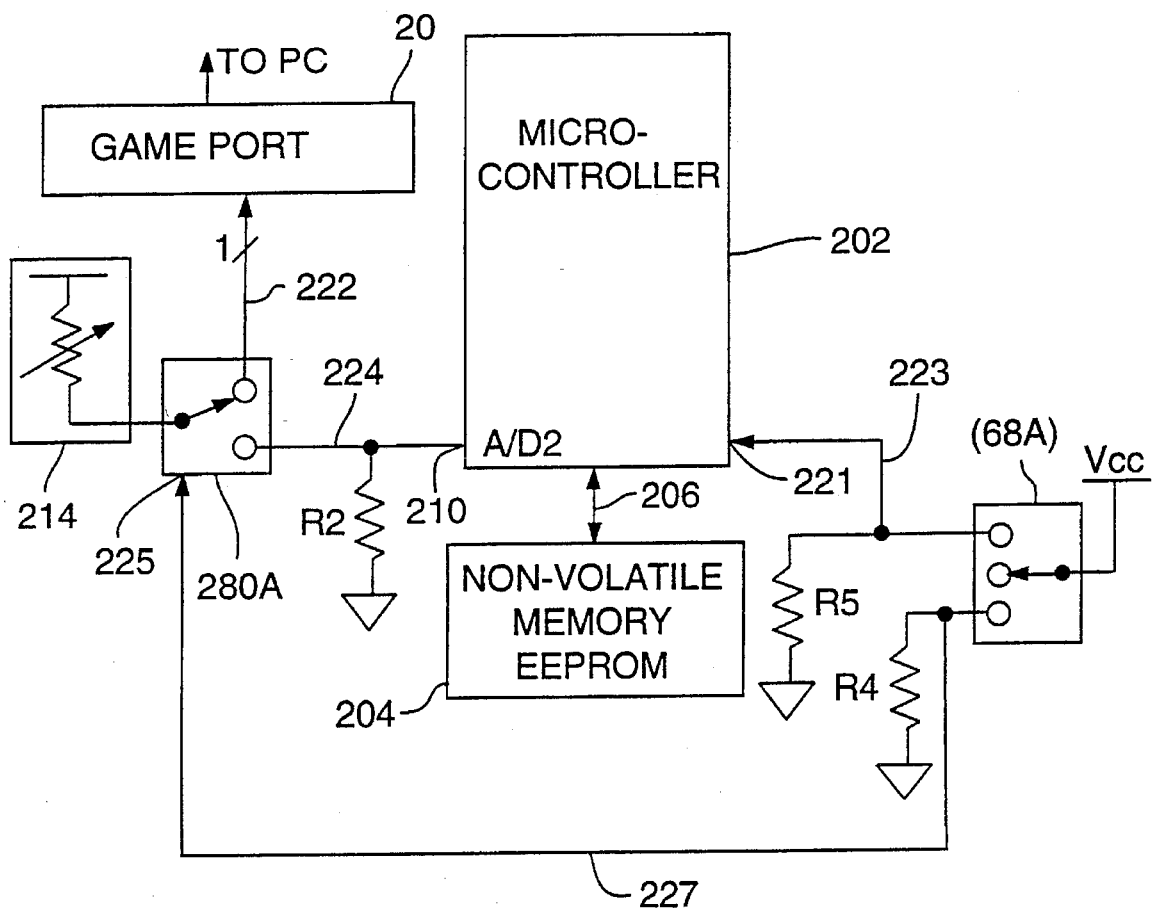
FIG. 19 is a more detailed schematic of the three position switch arrangement and associated circuitry of the throttle controller of FIG. 13.

A more detailed schematic of the three way switch 68A is shown in FIG. 19. In FIG. 19, the switch 68A has a signal line 227 coupled to a select input 225 of switch 280A that selects between the digital and analog modes of the throttle. Switch 280A in FIG. 19 is a digital switch that switches states responsive to the signal on select input 225. Two resistors R4 and R5 pull lines 227 and 223 to ground when switch 68A is in a middle position corresponding to the analog mode. When the switch 68A is in a top position, corresponding to the calibration mode, the supply voltage VCC is coupled to input/output port 221 via line 223. Similarly, when the switch 68A is in a bottom position, corresponding to the digital mode, VCC is coupled to select input 225 via line 227, which causes switch 280A to switch states.

The microcontroller 202 is also responsible for coordinating communication with the PC over the keyboard interface 18. A PC keyboard interface, as is known in the art, is a bi-directional interface. The interface consists of clock line 226 and data line 228, which lines are coupled to the keyboard interface port 18 via cable 62. Although the interface is bi-directional, in a typical personal computer substantially all of the communication over the keyboard interface is from the keyboard to the personal computer to transmit the keycodes to the computer responsive to actuating the keyboard keys. Typical PC software operates on an interrupt basis accepting keycodes whenever input via the keyboard port, rather than waiting to poll the keyboard. However, the personal computer does on occasion transmit data the other way, i.e., from the personal computer to the keyboard. The typical occasion during which the personal computer transmits information to the keyboard is to change the state of the lights 16A–16C on the keyboard. The invention takes advantage of this capability to facilitate downloading the reconfiguration keycodes during the reconfiguration mode as described below with respect to FIG. 11.

In order to intercept the data transmitted from the PC over the keyboard interface, as well as to allow keycodes to be transmitted to the personal computer, the clock line 226 and the data line 228 are coupled to microcontroller I/O ports 230 and 232, respectively. A double throw switch 234 is interposed in lines 226, 228 between the keyboard interface and the keyboard to allow the microcontroller to selectively disable the keyboard 16. Switch 234 is a digital switch or multiplexer which has a control input 236 connected to microcontroller output port 238 via control line 240. The signal on control line 240, therefore, selectively enables or disables the keyboard by either opening or closing switch 234. The microcontroller 202 opens switch 234, as shown in FIG. 13, responsive to the throttle controller 30 being placed in the reconfiguration mode by setting the three position switch 68A to the calibration position. In the preferred embodiment, the switch 234 is part number CD40HCT66 manufactured by National Semiconductor of Santa Clara, Calif.

The various discrete switches on the two controllers 30 and 32 are coupled to controller 202 via multiplexer (MUX) 250. MUX 250 is a $2^N$ to 1 multiplexer. MUX 250 includes $2^N$ inputs and a single output 254. The plurality of discrete switches on the controllers are multiplexed to the microcontroller because of the limited number of available I/O ports in the microcontroller 202. In the event that a more sophisticated microcontroller is employed, the multiplexing scheme shown in FIG. 13 would not be necessary. The multiplexer 250 further includes select inputs 252 that are coupled to microcontroller output port 256 via bus 258. The signal on bus 258 determines which of the $2^N$ inputs are passed through to output 254. The single multiplexer output 254 is connected to controller input port 260 via input line 262.

The throttle discrete switches 264 are coupled to the input to multiplexer 250. The throttle discrete switches 264 are also coupled to the game port 20. Similarly, the throttle discrete inputs 266 are coupled to the multiplexer 250 inputs. Using this configuration, the microcontroller can sample the states of each of the discrete switches 264 and 266 by sequentially changing the select signals on bus 258 and reading the corresponding output on line 262.

The remaining analog outputs 268 of the joystick are coupled to game port 20. The two analog outputs, in the preferred embodiment, correspond to the pitch and roll signals produced by the joystick responsive to movement of the joystick handle.

The controller 30 electronic circuitry shown in FIG. 13 controls all of the transmission to and from the personal computer. The microcontroller 202 coordinates substantially all of the communication to and from the personal computer, with the possible exception of those signals that connect directly to the personal computer via the game port 20. As indicated above, the microcontroller has two primary modes of operation: a functional mode; and a reconfiguration mode.

The functional mode is characterized primarily by transmission of keycodes from the controller 30 to the personal computer. These keycodes can either be input from the keyboard 16 or generated by microcontroller 202 responsive to actuation of one of the input devices on the controllers 30 or 32.

Other potential embodiments of electronics circuitry suitable for transforming input signals to keycodes are described in U.S. Pat. No. 4,716,542 issued to Peltz et al. and U.S. Pat. No. 4,852,031 issued to Brasington, which are incorporated herein by reference.

The reconfiguration mode, however, is characterized primarily by transmission of keycodes from the personal computer to the controller 30 via the keyboard interface. During the reconfiguration mode, the microcontroller disables the keyboard 16 to ensure that the transmission received from the personal computer is not passed on to the keyboard 16. The keycodes are transmitted from the personal computer microprocessor 13 to the microcontroller 202 in a serial fashion using the keyboard protocol, as is known in the art. Any number of data formats can be used to transmit the reconfiguration keycode data from the personal computer to the controller 30. Once the downloaded keycodes are received by the microcontroller 202, the keycodes are stored in the nonvolatile memory 204 where they are subsequently retrieved when a corresponding input device on the controllers 30 and 32 is actuated. This mode is further described in the next section.

Many other video games/simulation system configurations are possible without departing from the inventive principles described herein. For example, the joystick controller 32 and the throttle controller 30 can be interchanged with the joystick controller 32 having the reconfiguration electronics therein. In that case, however, the controller electronics shown in FIG. 13 would then be incorporated into the joystick controller 32. The joystick controller 32 could then be operated independently. With the joystick 32 and the throttle 30 thus interchanged, the joystick would then be coupled to the game card 26 and the throttle controller 30 would be coupled to the joystick controller 32. Furthermore, the joystick controller 32 would have a keyboard input board connectable to the keyboard 16, as well as a keyboard input/output port connectable to the computer keyboard port 18. This configuration would thus allow for a reconfigurable joystick without the need for the throttle controller 30. Similarly, any other type of controller can be designed to substitute for the throttle controller 30 while retaining the reconfiguration capability.

Additionally, the system configuration described hereinabove has focused on the use of the computer keyboard port for transmitting the reconfiguration keycodes from the computer to the controller. However, several other bi-directional computer I/O channels could provide similar capability, e.g., RS-232, Bi-directional Centronics. In addition, the "ADB" bus on the Apple computers would provide a similar transmission path. Additional circuitry, however, is necessary within the controller to communicate over the asynchronous ADB bus.

RECONFIGURING THE GAME CONTROLLERS

Each joystick input and throttle input has an initial corresponding keycode assigned by the manufacturer of the controller. Typically, the initial keycodes match a prevalent video game. If the video game user selects a program which uses keycodes which do not match those supplied by the manufacturer, or the user desires to change the function of one or more of the controller inputs, the initial keycode set is no longer satisfactory. In accordance with the invention, the user can switch into a reconfiguration mode by invoking a reconfiguration program on the computer 12 and changing the state of the three-way switch 68A.

Figure 2:
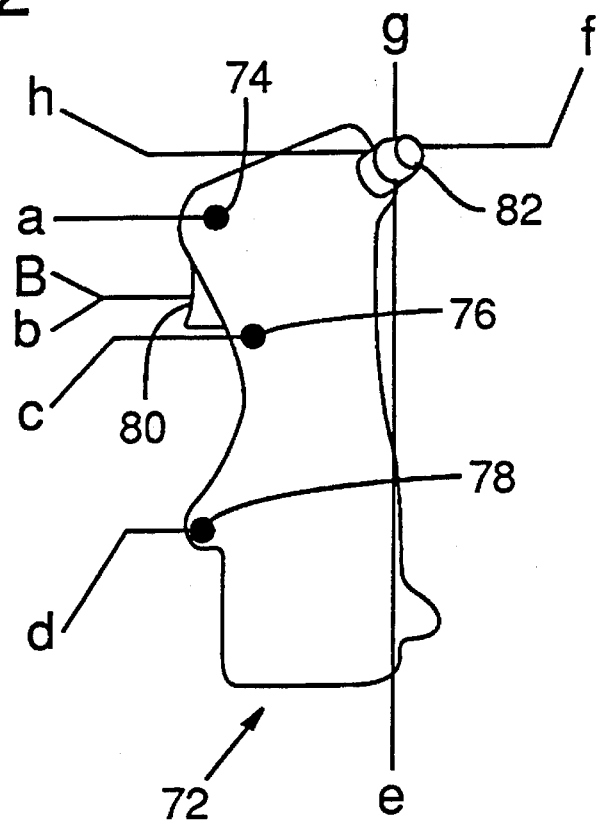
FIG. 2 is a two-dimensional graphical display of the joystick of FIG. 1 as displayed on a video display prior to reconfiguration.

In one embodiment, the reconfiguration program presents a graphical representation of each of the game controllers on the display, along with a menu of configuration assignments. FIG. 2 shows such a representation of the joystick, located generally at 72. Each discrete switch 74, 76, and 78 has a separate unique character associated therewith, "a", "c", "d", respectively. Similarly, hat 82 has four different characters associated with it, i.e., "e", "f", "g", "h", corresponding to the four separate positions of the hat 82. Also, the first and second actuated positions of the multi-stage switch 80 are initially assigned unique keycodes "B" and "b", respectively.

The program indicates which keycode, as represented by the corresponding character, currently corresponds to each input. Although single-character keycodes are shown herein, it is apparent that multi-character keycodes can likewise be used. When the reconfiguration program is initially invoked, the inputs will have no characters associated with them since none will have yet been assigned. Alternatively, the computer can store the currently assigned keycodes or, in the preferred embodiment, the keycodes can be transmitted from the throttle controller 30 to the personal computer 12.

Figure 3:
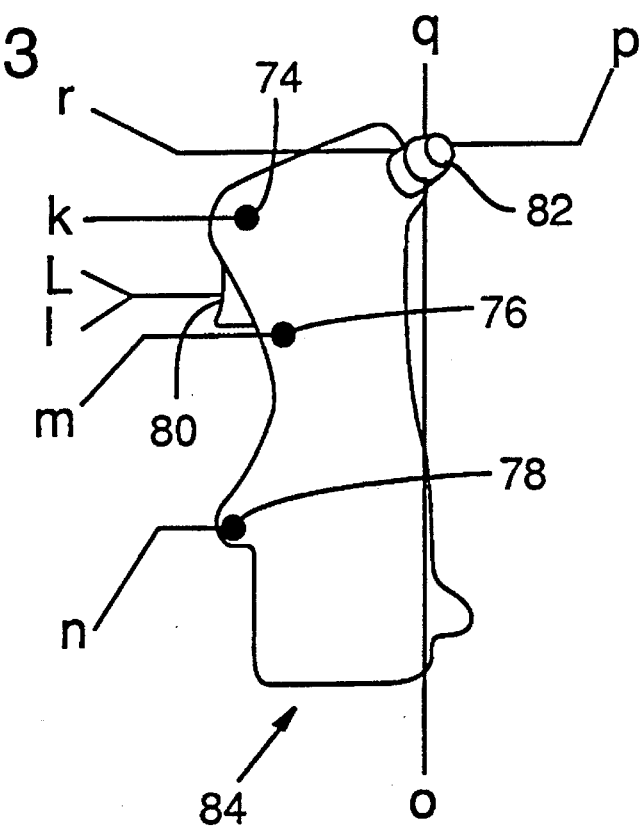
FIG. 3 is a two-dimensional graphical display of the joystick of FIG. 1 after reconfiguration.

The reconfiguration program will prompt the user to input the desired keycodes for each of the controller inputs. In the preferred embodiment, the program simply steps from one input to the next, responsive to the user depressing the desired keyboard character until all of the inputs have been assigned. Referring now to FIG. 3, shown generally at 84 is a graphically representation of the joystick after the joystick inputs have been reassigned. Following the reconfiguration program, for example, the first and second actuated positions of the multi-stage switch 80 are reassigned to keycodes "L" and "l", respectively. Were there more than two actuated positions each would be assigned an individual keycode corresponding to the desired input function. In the preferred embodiment, the first actuated position corresponds to a fire command, i.e., "L", and the second actuated position corresponds to a camera activation command, "l", for a video flight game/simulator.

Figure 4:
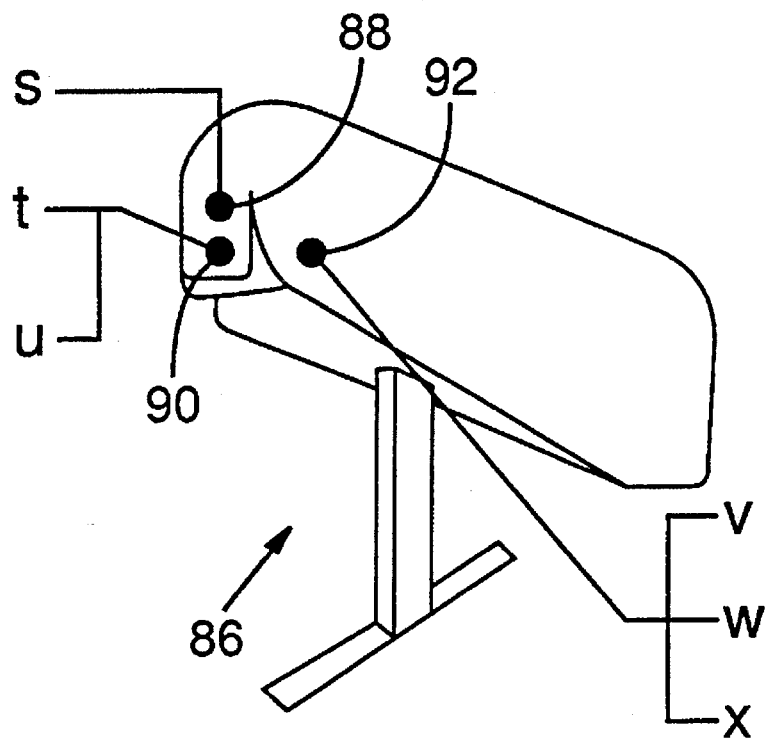
FIG. 4 is a two-dimensional graphical display of a frontal view of the throttle controller of FIG. 1 as displayed on a video display prior to reconfiguration.
Figure 5:
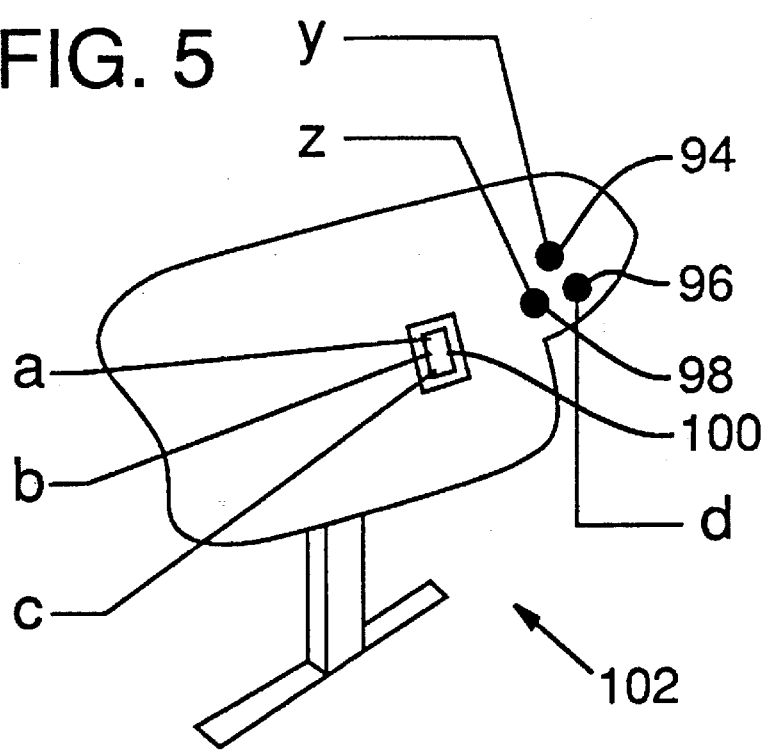
FIG. 5 is a two-dimensional graphical display of a rear view of the throttle controller of FIG. 1 as displayed on a video display prior to reconfiguration.
Figure 6:
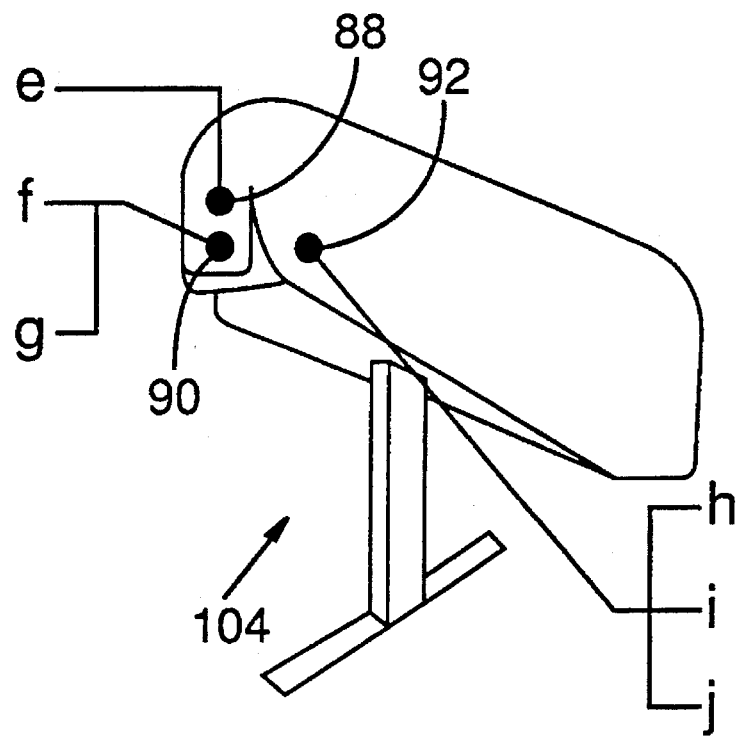
FIG. 6 is a two-dimensional graphical display of a frontal view of the throttle controller of FIG. 1 as displayed on a video display after reconfiguration.
Figure 7:
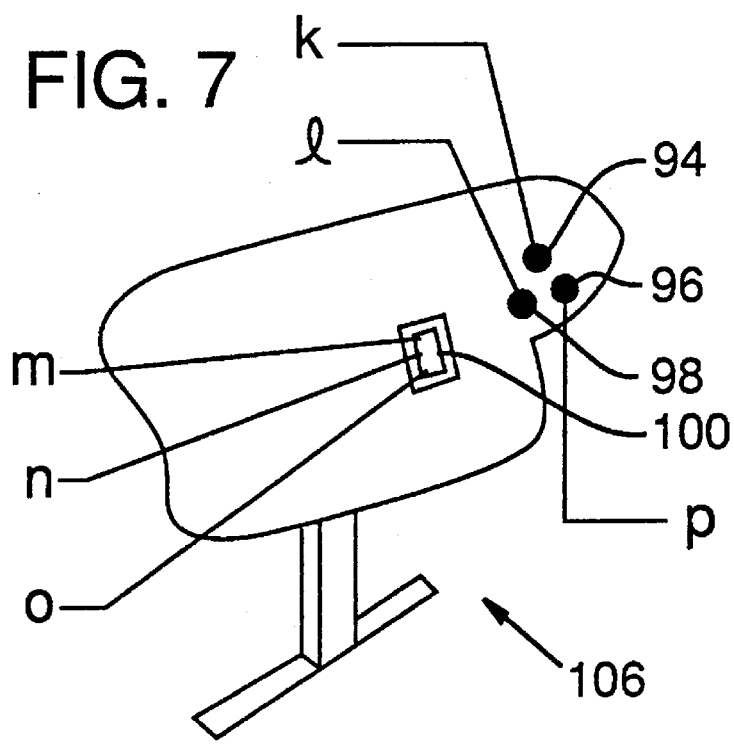
FIG. 7 is a two-dimensional graphical display of a rear view of the throttle controller of FIG. 1 as displayed on a video display after reconfiguration.

Referring now to FIGS. 4 and 5, frontal and rear views of the throttle controller 30, as shown on the display, are shown generally at 86 and 102, respectively. As with the joystick in FIG. 2, each of the throttle inputs has a current keycode associated with it. Discrete input switches 88, 94, 96, and 98 each have a single unique keycode associated with them, and three-way switch 100 has a single unique keycode associated with each switch setting. Input 90, however, has two keycodes associated with it. This corresponding to two of the three switch settings of three-way switch 100. For example, when switch 100 is in a first position, corresponding to keycode "a", discrete input 90 corresponds to keycode "t." In contrast, when switch 100 is in a second position, corresponding to keycode "b", discrete input 90 corresponds to keycode "u". Similarly, discrete switch 92 has three separate keycodes, "v", "w", and "x", corresponding to the three switch settings "a", "b", and "c", respectively.

Once the desired keycodes have been entered, the user commands the reconfiguration program to download the new keycodes to the throttle controller. The computer synchronizes with the throttle controller over the keyboard interface and then transmits a packet of data to the throttle controller over the keyboard port interface 18. In the preferred embodiment, the data packet includes one or more keycodes for each of the controller inputs, each input having a corresponding datum, for example, at a predetermined offset into the packet. In order to avoid contention for the keyboard interface, in the preferred embodiment, the user is prompted to avoid actuating any of the keyboard inputs. If more than one keycode is used for each controller input, the desired number of keycodes are entered in the manner described above.

The throttle controller 30 receives the data packet from the computer 12 and stores the keycodes into the non-volatile memory 114, where it is stored until the controller is subsequently reconfigured, at which time it is overwritten.

Figure 8:
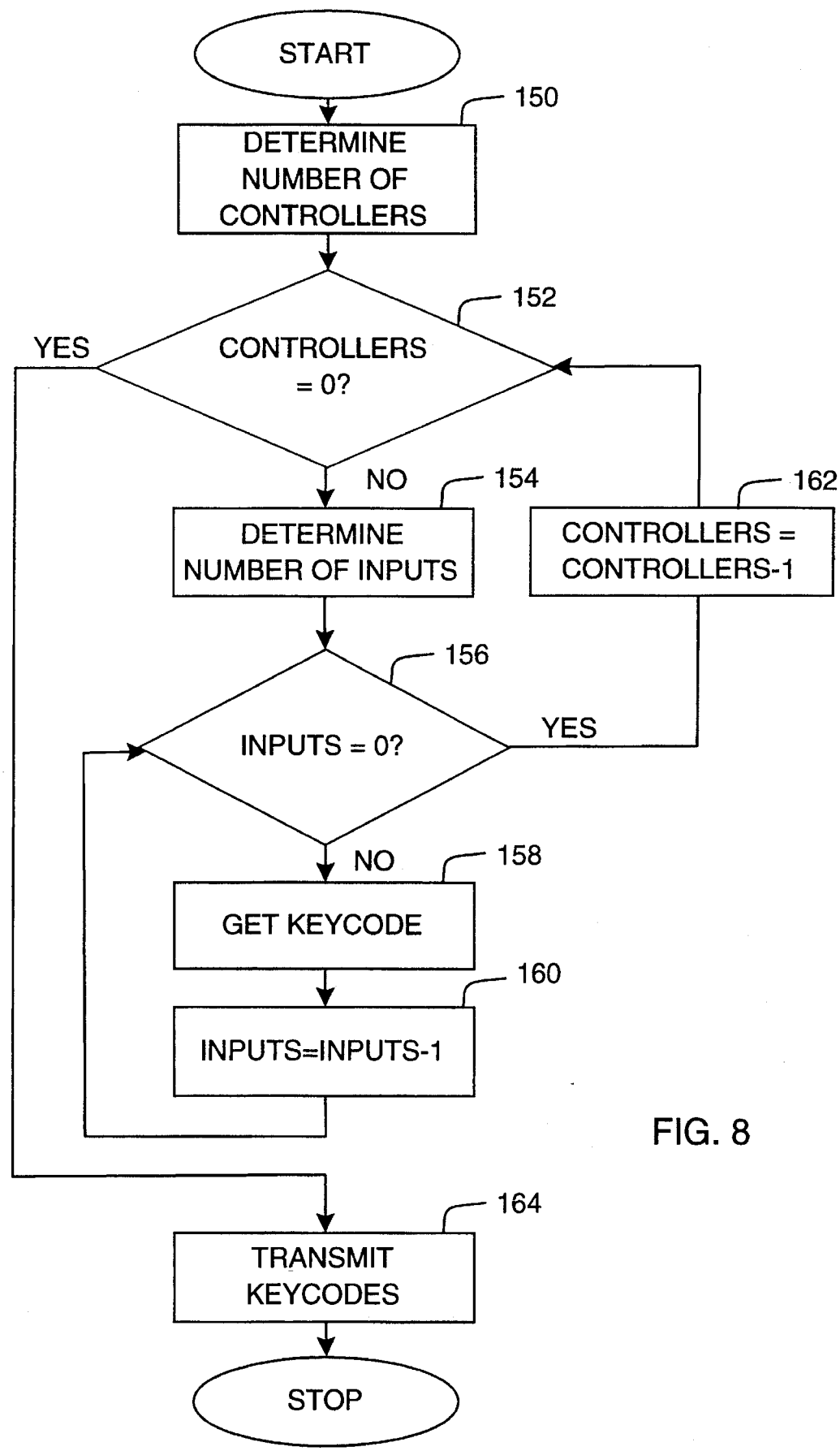
FIG. 8 is a flowchart of the reconfiguration program operating in the host personal computer of FIG. 1.

After operation of the reconfiguration program has been completed, the user simply exits the program and sets the throttle controller three-way switch 68 to a setting corresponding to the functional mode. A flowchart of the reconfiguration program operating in host computer 12 is shown in FIG. 8.

The reconfiguration program begins by determining the number of controllers present in the video game/simulator system in step 150e. This information can either be input by the user or set to default to a standard configuration. The program next enters a loop which begins by comparing the number of controllers to zero in step 152. If the number of controllers is not equal to zero, in step 154, the program determines the number of inputs for one of the controllers, e.g. joystick. The program displays the corresponding controller on the screen as shown in FIGS. 2–7, or displays a fill-in list of inputs as described below with reference to FIG. 10.

The program then prompts the user in step 158 to input a keycode for one of the inputs, as described above. The program advances to the next input in step 160 and decrements the number of inputs 160 remaining to be assigned a keycode. Steps 156 through 160 continue until all of the inputs for the current controller have been assigned. In the event that more than one keycode is associated with a particular input, the program would not automatically move to the next input device after the user has input only a single character. Instead, the program would wait for a special character to be entered, i.e., one that is not normally associated with any desired input keycode. Alternatively, a mouse could be used to reposition the curser in the next input field adjacent the next input.

Once all of the inputs have been assigned, for the first controller (step 156) the remaining number of controllers to be reconfigured is decremented in step 162. If there are any remaining controllers, the steps 154–160 are repeated for each controller.

If there are no controllers remaining to be reconfigured (step 152), the program branches to step 164 and transmits the keycodes input during the reconfiguration program to the throttle controller 30. The keycodes are transmitted in a predetermined format with each keycode corresponding to a particular input in the video game/simulator system. The flowchart of FIG. 8 is sufficient to allow one skilled in the art of computer programming to write a computer program operable on the host computer to implement the reconfiguration program. A preferred embodiment of step 164 is shown in FIG. 11, described below.

Figure 9:
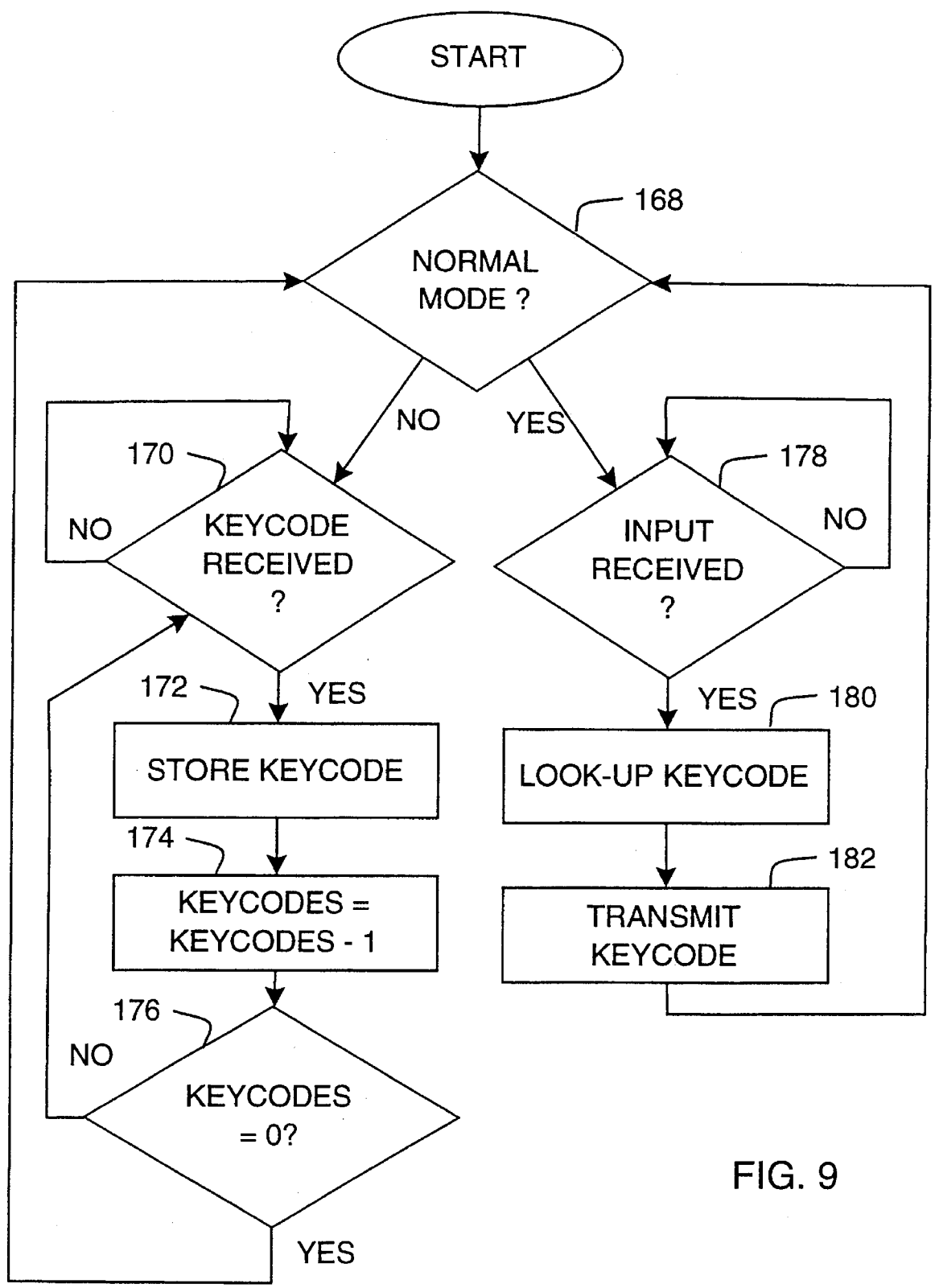
FIG. 9 is a flowchart of a program operating in the game controller of FIG. 1 which receives the reconfiguration information from the host computer.

Referring now to FIG. 9, a flowchart of a program operable on the throttle controller is shown. The program has two modes of operation: a normal mode wherein the program detects controller inputs; and a reconfiguration mode wherein the controller receives the reconfiguration keycodes transmitted from the host computer. In the preferred embodiment, the user can switch the controller between these two modes by setting switch 68 to the appropriate setting, as described above.

The program of FIG. 9 commences in step 168 by determining the state of the controller. This step, in the preferred embodiment, involves sampling the state of the switch 68. If the controller is in the reconfiguration mode, the program awaits receipt of a reconfiguration keycode in step 170. When a keycode is received, in step 172, the keycode is stored in a memory, preferably a non-volative memory such as EEPROM 114, at a predetermined location corresponding to the specified controller input. The number of inputs remaining to be received is decremented in step 174. If there are additional keycodes to be received, the program transitions to step 170 and "busy-waits" for additional keycode transmission from the host. If all of the keycodes have been received, the program in step 176 transitions to step 168 and waits for the controller to be switched to normal mode.

Once the controller is placed in normal mode, the program transitions to step 178 and awaits an input signal on any of the controller inputs received thereby. In the preferred embodiment, the program samples all of the inputs in a round-robin fashion. Once an input signal is detected, the program "looks-up" the corresponding keycode at the predetermined memory location in step 180. The program then transmits that keycode to the host computer to the keyboard input port 18 over cable 62. The program then transitions back to step 168 to determine the current state of the controller. Alternatively, switch 68 can be coupled to an interrupt line such that toggling the switch invokes a interrupt service routine which determines the state of the controller without explicitly polling the switch 68. The flowchart of FIG. 9 is sufficient to allow one skilled in the art of computer programming to write a corresponding computer program operable on the throttle controller 30.

Figure 10:
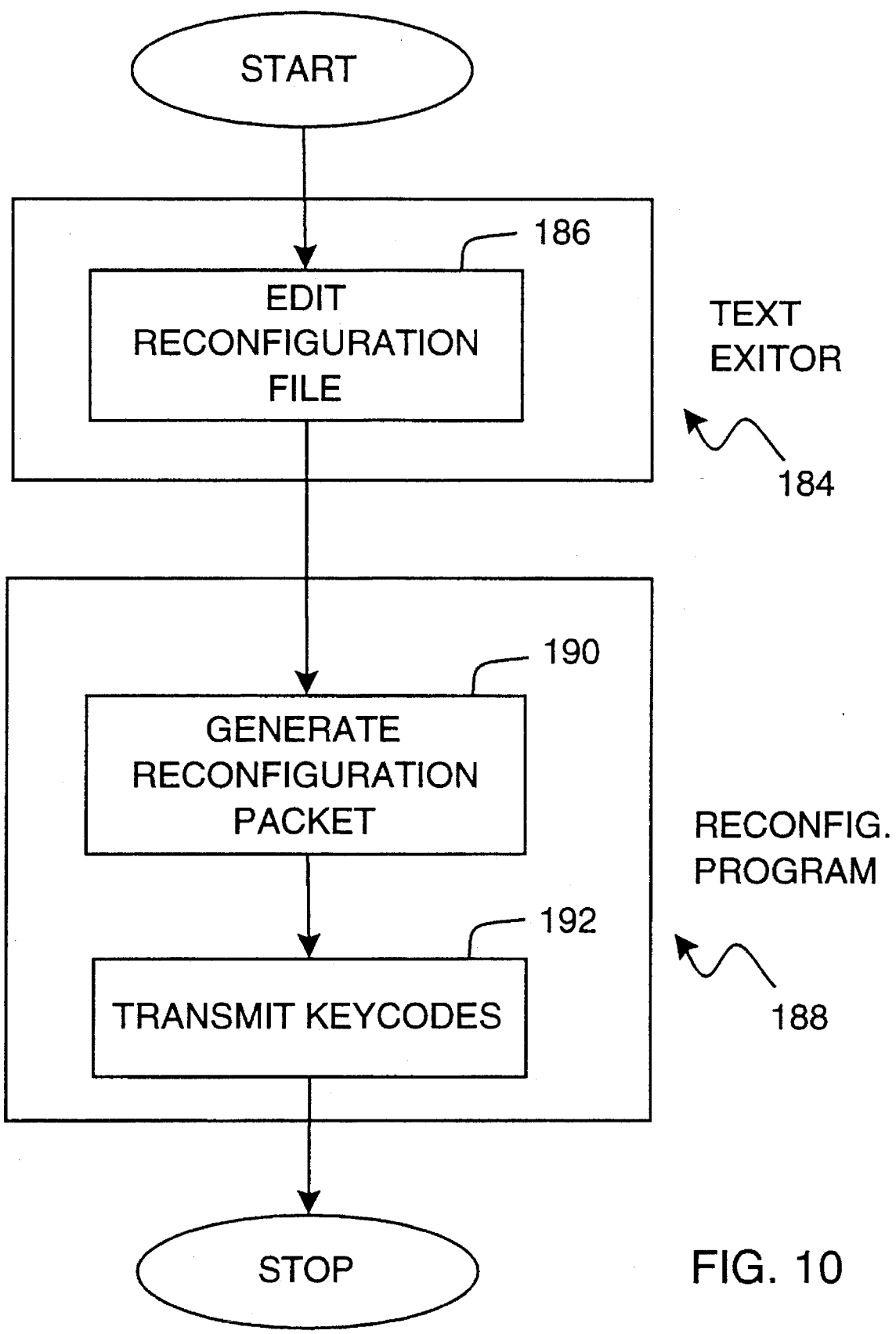
FIG. 10 is a flowchart of a process for reconfiguring the game controller by creating a textual reconfiguration file using a text editor.

In addition to the graphical method for inputting reconfiguration keycodes during the reconfiguration program, the invention further includes a second embodiment of the reconfiguration program wherein the reconfiguration keycodes are input using a conventional text editor. A flowchart of the method using the text editor is shown in FIG. 10. Referring now to FIG. 10, in the first step 184 a text editor is invoked on the computer. Once in the text editor, a reconfiguration file is edited using conventional techniques in step 186. The reconfiguration file can be either supplied by the controller manufacturer, or, alternatively, can be created by the user. The reconfiguration file contains a list of the controller inputs and the corresponding keycodes associated with those controller inputs. The controller inputs are labelled according to a predetermined labelling convention supplied by the controller manufacturer. Adjacent a controller input label is the keycode or keycodes associated with that particular controller input.

In the event that the controller input has more than a single state, e.g., the multi-stage trigger 39 described above, one or more keycodes are listed for each state of the input. Another example is the throttle stick on the throttle controller 30. Some throttle controllers have a digital throttle mode wherein a keycode is generated responsive to incremental movements of the throttle stick. For the digital throttle then, a plurality of keycodes are listed for the digital throttle stick input, each keycode corresponding to a successive incremental position of the throttle stick. An example reconfiguration file is shown in Appendix A.

Once the reconfiguration file has been edited, the text editor can then be terminated and the second embodiment of the reconfiguration program invoked in step 188. This reconfiguration program 188 differs from the above-described reconfiguration program in that the reconfiguration keycodes are not entered graphically. This embodiment of the reconfiguration program contains two steps. In the first step 190, a reconfiguration packet is generated from the reconfiguration file generated in step 186 above. A reconfiguration packet is generated by parsing through the reconfiguration file and assembling a binary reconfiguration packet having the desired format.

Once in the desired format, the reconfiguration packet, including the reconfiguration keycodes, is transmitted to the controller from the computer in step 192. This step is essentially the same as step 164 of FIG. 8. In both cases, the keycodes are transmitted using a predetermined protocol over the keyboard interface. Protocols necessary to transmit the keycodes efficiently and reliably are well-known in the art and are not described further herein.

Referring now to FIG. 11, the preferred method of transmitting the keycodes from the computer to the controller is shown. The method 400 shown in FIG. 11 uses the bits in the keyboard status byte in the personal computer, i.e., memory location 0:417H. The BIOS within the personal computer monitors the status of these bits and, if such status is changed, downloads the present state of the bits to the keyboard to change the state of the corresponding lights. In particular, the method 400 uses bits 4, 5 and 6 to transmit two bits of information at a time. The third bit is used to ensure that at least one of the status bits changes during each iteration of the inner loop of the method steps 408 through 416, as described below.

The method begins at step 402 by determining the number of bytes required to be downloaded to the controller 30. The variable NUM_BYTES is then set equal to the number of bytes N to be downloaded. In step 404, the variable NUM_BYTES is compared to zero to see whether another byte needs to be transmitted to the controller. If NUM_BYTES does not equal zero, the next byte to be transmitted is retrieved in step 405. Next, the number of bits in the byte is set in step 406. The number of bits is an even number, typically eight, but depending on the number of parity bits, this number can vary.

In step 408, the variable NUM_BITS is compared to zero. If NUM_BITS does not equal zero, step 410 is executed and the first two bits of the current byte to be downloaded are extracted from the current byte. The extracted bits are then written out to the keyboard status byte in step 412 along with a third bit which ensures that at least one of the three bits is different than the current value of the bits in the status byte. For example, if the previous two bits went to the keyboard status byte were 00 and the third bit was also a 0 and the current two bits are also 00, then the third bit would need to be set to a 1 so that at least one of the three bits is toggled.

The method then in step 414 executes a keyboard status request which causes the BIOS to compare the current state of the keyboard status byte with the prior state of the keyboard status byte. The keyboard status byte is changed from the prior state, by virtue of a change in at least the third bit. The BIOS then proceeds to download the keyboard status byte to the controller 30 over the keyboard interface port. The downloaded status byte is intercepted by the microcontroller 202, as described above.

Finally, in step 416, the variable NUM_BITS is decremented by two and then transitions back to step 408 to compare once again the variable NUM_BITS to 0. The sequence of steps 408 through 416 are repeated until the number of bits finally reach 0; that is, there are no remaining bits to be transmitted in the current byte.

Once all of the bits of the current byte have been transmitted from the personal computer to the controller 30 over the keyboard port, i.e., NUM_BITS=0, the variable NUM_BYTE is decremented by 1 in step 418. Step 418 then transitions to step 404 where the variable NUM_BYTES is compared to 0 to see whether or not there are remaining bytes to be transmitted to the controller. If there are remaining bytes, step 404 transitions to step 405 and a new current byte is selected and the above-described sequence is repeated. If the number of remaining bytes is 0, however, all of the bytes will have thus been transmitted and the method 400 is be concluded in step 420.

CALIBRATING THE GAME CONTROLLERS

Figure 15:
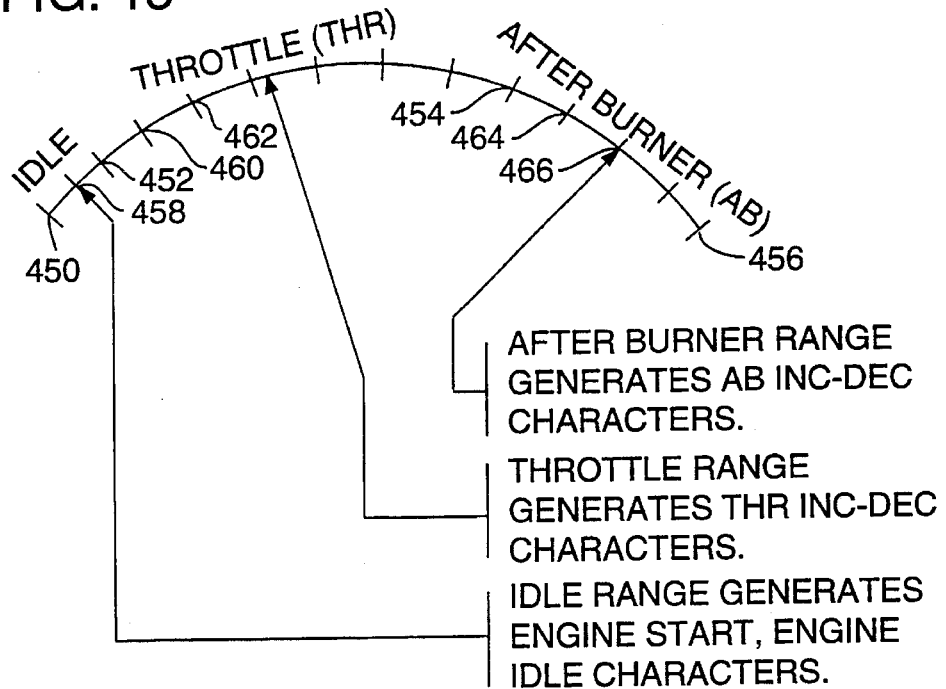
FIG. 15 is an illustration of the operation of the throttle of FIG. 1.

The invention described herein also allows for the analog controller inputs to be calibrated. The calibration process described hereinafter enables the controller functions to be precisely calibrated to the corresponding video game program functions. It allows for less tolerant components to be used in the controller which thus lowers the overall cost of the controller. The calibration process, in the preferred embodiment, is conducted on the throttle stick 70 of FIG. 1. A throttle has a range of travel as shown in FIG. 15. The travel extends from an off position 450 to a full after burner (AB) position 456. In between these two extreme positions are the idle detent position 452, the throttle detent position 454, and a plurality of subdivisions, e.g., 458 through 466. The detent positions allow the user to place the throttle in one of two known positions by simply finding the desired detent.

The full range of thrust of the throttle can be subdivided into an idle range between 450 and 452, a throttle range extending between 452 and 454, and an after burner range extending from 454 to 456. Each of these individual ranges is then further subdivided into individual subdomains. The subdomains determine the resolution of the throttle stick. The greater the number of subdomains, the greater the resolution of the throttle. The number of subdomains is specified by the user in the reconfiguration file, as described above, and a character or keycode is assigned to each subdomain. The exact character assigned is a function of the type of game in which the throttle is employed. For Type 1 games, the same character is associated with each individual subdomain. In Type 2 games, however, a unique character is assigned to each individual subdomain. The characters assigned in the reconfiguration file are then downloaded to the controller in the manner described above.

Figure 16:
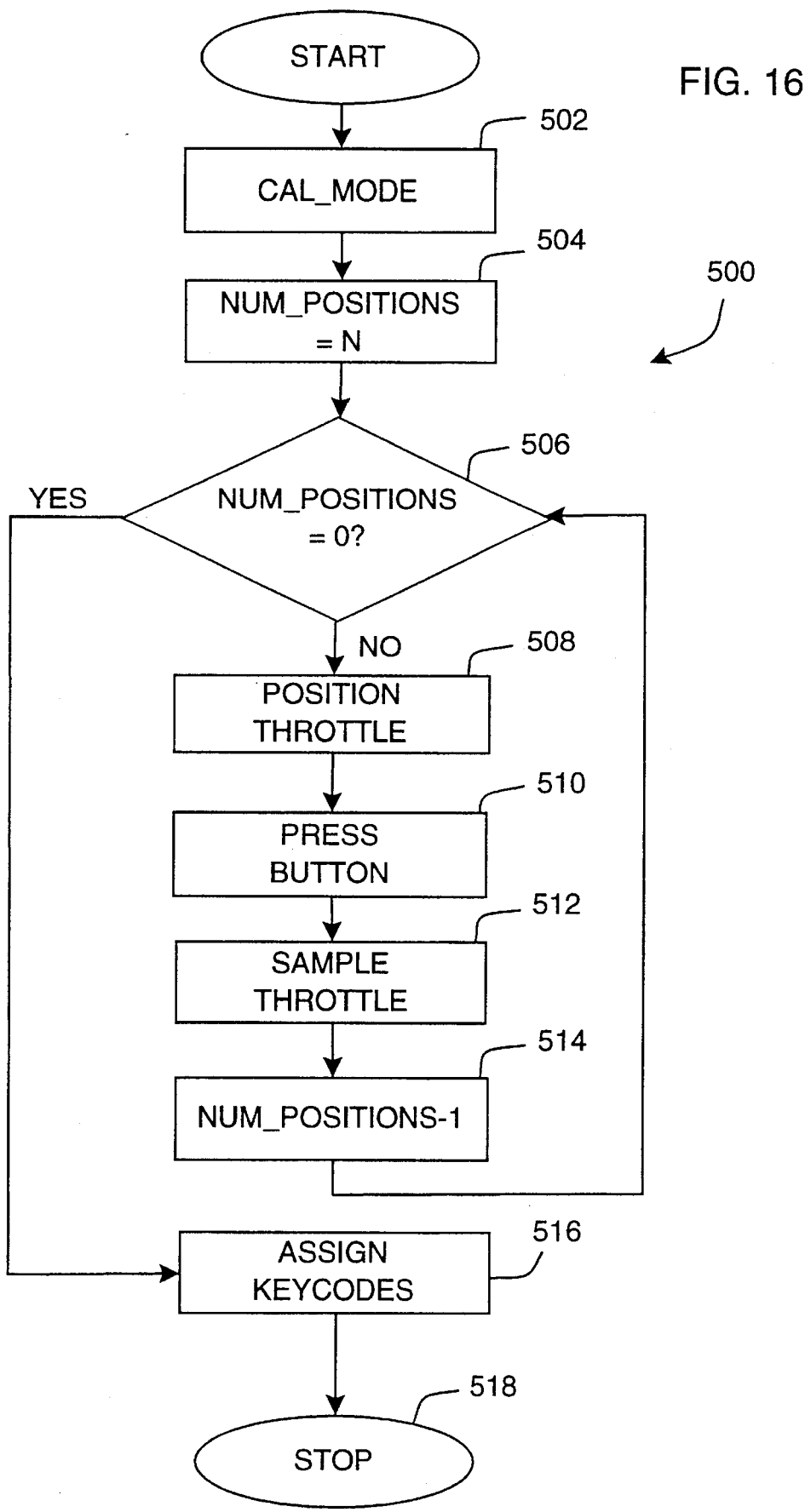
FIG. 16 is a flow chart of a routine for calibrating the throttle of FIG. 1.

The preferred method of calibrating the throttle is shown in FIG. 16. First, the throttle is put into the calibration mode in step 502 by placing the three-way switch 68A in the calibration position and then returning the three-way switch to the digital position. The three-way switch is placed briefly in the calibration position to signal to the microcontroller that a calibration sequence is about to occur. Alternatively, the personal computer could download a calibration keycode which would indicate to the controller that the calibration is about to occur.

Once in the calibration mode, the number of positions of the throttle controller is determined in step 504. For the throttle controller shown in FIG. 15, there are four discrete positions in which the throttle can be placed, i.e., positions 450, 452, 454, and 456.

In step 506, the number of positions is compared to 0; and if not equal to 0, the process transitions to step 508. In step 508, the throttle is manually put in a first calibration position. In the preferred embodiment, this first throttle position is in the full off position 450. Next, in step 5 10, the user is prompted to press a predetermined button on the throttle controller to signal that the throttle is in the first calibration position.

In step 512, the microcontroller 202 within the throttle controller samples an output signal produced by the throttle rheostat on line 224 configured as a potentiometer by switch 280A, to determine a baseline voltage level for the throttle in the full off position 450. The microcontroller A-to-D converter converts this baseline voltage level to a corresponding digital representation. This digital representation is stored for subsequent use in step 516 wherein keycodes are assigned to each of the individual throttle positions, as described further below.

In step 514, the number of positions remaining to be calibrated is decremented and the number of positions is again compared to 0 in step 506. If the number of positions does not equal 0, the method transitions to step 508 wherein the user is prompted to position the throttle to a second calibration position. For a simple two-step calibration, this would correspond to the full after-burner position 456. However, in the preferred embodiment, the user is prompted to place the throttle in the idle detent position 452. Then, in step 510, the user is prompted to again press the same predetermined button which signal to the microcontroller that the throttle is in the desired second calibration position. Then, again, the microcontroller samples the output of the throttle rheostat in step 512 and converts it to a digital representation via the A-to-D converter. Then the number of remaining positions is decremented in step 514 and the number of positions is compared against 0 in step of 506.

Assuming there are remaining positions, this sequence of steps 508 through 514 are repeated for each of those remaining positions. In the preferred embodiment, the throttle is calibrated at the after-burner detent position 454 as well as the full after-burner position 456. Once all of the throttle calibration positions have been calibrated, individual keycodes are assigned to the each of the calibration positions in step 516. These are the keycodes that have been previously downloaded to the throttle controller 30 which correspond to the particular positions. In addition, however, an individual keycode is associated with each of the subdomains within the full throttle range. The number of subdomains is specified in the reconfiguration file, as described above, and all of the reconfiguration keycodes corresponding to each of the individual subdomains is downloaded during the reconfiguration mode. The microcontroller subdivides the voltage range sampled during the calibration process and assigns individual keycodes to the corresponding voltage ranges within that full range.

Having described and illustrated the principles of the invention in a preferred embodiment thereof, it should be apparent that the invention can be modified in arrangement and detail without departing from such principles. For example, is should be apparent that the number and type of game controllers can be altered without departing from the scope of the invention. Also, the microcontroller and nonvolatile memory could be in the joystick, coupled directly to the keyboard port, rather than the throttle controller. We claim all such modifications and variation coming within the spirit and scope of the following claims.

APPENDIX A

```
     FCS
     GAME 1
 5   BTN UB ENT
     BTN MB F8
     BTN LB SCRLCK
     BTN HU 8 3
     BTN HR F10
10   BTN HL e
     BTN HD F9 F9
     BTN HM N
     WCS
     BTN 1 RU INS DEL RM INS DEL RD f
15   BTN 2 RU z n RM z n RD g
     BTN 3 RU t RM t RD |
     BTN 4 RU r RM r RD SHFTD SCRLCK SHFTU
     BTN 5 RU x RM x RD w
     BTN 6 b
20   RKR UP F6
     RKR MD F5
     RKR DN \
     THR 24 5 = - / / . ,

25
```

© 1993 Thrustmaster, Inc.

40

APPENDIX B

Program MKXLoad;

{ V1.00 - 10/17/93 - Initial Release }
{ V1.01 - 10/18/93 - Fixed error in WCSGEN which cut program at 123 bytes
}
{ V1.10 - 10/19/93 - Deleted CAM and Added BTN TG commands }
{ V1.20 - 10/21/93 - Combined Compile and Download Functions }
{           Corrected DN Error }
{ V1.21 - 10/23/93 - Modified Throttle Logic to avoid errors on missing THR
}
{           Added Memory Out Line Number }
{           Added /N Flag }
{ V1.22 - 10/28/93 - Added Errors for Release Codes without Press Codes }
{ V1.23 - 10/29/93 - Added Errors for Invalid Press and Null Release Codes
}
{ V1.25 - 10/29/93 - Added support for non-.ADV files, extra message at startup }
{ V2.00 - 11/12/93 - Changed download method to use keyboard status command }
{ V2.01 - 11/12/93 - Added reset operation to startup,enabled key flag xmit
}

Uses

KBLink,WCXColor,WinTTT5,FastTTT5,DOS,CRT,WCXError,WCXUtils,
WCXVars,WCXComp,WCXGen,WCXDnLd{WCXObj};

Var
  Ch: Char;
  MssgLeader: String;
Begin
  MkWin(1,1,80,25,Black,Black,0);
  WCSBox(1,1,80,3,MK2TitleBorder,MK2TitlePaper);
  FastWrite(15,2,Attr(MK2TitleInk,MK2TitlePaper),'ThrustMaster Mark II WCS Compile/Download Utility v4.01');
  WCSBox(3,5,78,25,MK2PromptBorder,MK2PromptPaper);

FastWrite(30,6,Attr(MK2PromptTitle,MK2PromptPaper),'DOWNLOADING INSTRUCTIONS');
  DumpJunk;
  InitRTError;

© 1993 Thrustmaster, Inc.

```
IsCompiling:=False;
If ParamStr(2) = " Then
  Begin
    UseFlags:=False
  End
Else
  Begin
    UseFlags:=True
  End;
UserFileName:=UCase(Paramstr(1));
If UserFileName = " Then
  Begin
    Error('No .ADV File Specified')
  End;
If Pos('.',UserFileName) = 0 Then
  Begin
    UserFileName:=UserFileName+'.ADV'
  End;
If (Not Exist(UserFileName)) And Not WCSErr Then
  Begin
    Error('Can''t Find '+UserFileName)
  End;
If Not WCSErr Then
  Begin
    FastWrite(5,8,Attr(MK2PromptInk,MK2PromptPaper),
        '1. To enter Download Mode, place the Red WCS Mode Switch in the ANALOG');
    FastWrite(5,9,Attr(MK2PromptInk,MK2PromptPaper),
        ' position, then switch it to the CALIBRATE position and press ENTER.');
    WaitEnter;
    WCSBeep;
    Attrib(5,8,75,9,MK2DimPromptInk,MK2DimPromptPaper);
    FastWrite(5,11,Attr(MK2PromptInk,MK2PromptPaper),
        '2. To begin Download, press Button #1 on the WCS and then IMMEDIATELY');
    FastWrite(5,12,Attr(MK2PromptInk,MK2PromptPaper),
        ' release it. It may take several seconds to clear the WCS buffer.');
    WaitAcknowledge;
    Attrib(5,11,75,12,MK2DimPromptInk,MK2DimPromptPaper);
    IsCompiling:=True;
    CompileProgram;
    IsCompiling:=False;
```

© 1993 Thrustmaster, Inc.

2

```
If Not WCSErr Then
  Begin
    GenObjectCode;
    If Not WCSErr Then
      Begin
        DownloadObjectCode;
      End
  End;
  If WCSErr Then
    Begin
      ShowStatus;
      MssgLeader:='3. File Not Transferred. '
    End
  Else
    Begin
      MssgLeader:='3. Transfer is complete. ';
      Attrib(8,14,73,20,MK2DimMssgInk,MK2DimMssgPaper);
    End;
    FastWrite(5,22,Attr(MK2PromptInk,MK2PromptPaper),
       MssgLeader+'Pull the throttle all the way back, place the');
    FastWrite(5,23,Attr(MK2PromptInk,MK2PromptPaper),
       ' Red Mode Switch in the DIGITAL position and press Button #1.');
    WaitAcknowledge2;
    Attrib(8,14,73,20,MK2DimMssgInk,MK2DimMssgPaper);
    Attrib(5,22,75,23,MK2DimPromptInk,MK2DimPromptPaper);
    DumpJunk;
    KBClearStatus
  End;
  SignOff;
  RmWin;
  ClrScr;
End.
```

© 1993 Thrustmaster, Inc.

```
Unit KBLink;

Interface

Uses
 DOS,CRT,WCSVars;

Procedure KBSendByte(ByteToSend: Byte);
 Procedure KBClearStatus;

Implementation

{$F+}

Procedure KBSendBits(ByteToSend: Byte);
Var
 Temp: Byte;
Begin
 If UseFlags Then
  Begin
   Mem[Seg0040:$0017]:=(ByteToSend * 16) And $70;
   If KeyPressed Then
    ;
  End
 Else
  Begin
   Temp:=(ByteToSend And $07);
   Asm
    jmp @send_it @wait_ibe:
    in al,$64
    and al,$02
    jnz @wait_ibe
    retn @wait_obf:
    in al,$64
    and al,$01
    jz @wait_obf
    retn @clear_ob:
```

© 1993 Thrustmaster, Inc.

```
        in al,$64
        and al,$01
        jz @end_cob
        in al,$60
        jmp @clear_ob
      @end_cob:
        retn @send_it:
        push bp
        cli
        call @clear_ob
        call @wait_ibe
        mov al,$ed
        out $60,al
        call @wait_obf
        in al,$60
        call @wait_ibe
        mov al,[temp]
        out $60,al
        call @wait_obf
        in al,$60
        sti
        pop bp
      End
    End
End;

{$F-}

Procedure KBSendByte(ByteToSend: Byte);
Var
  ByteMap: Array[0..3] of Byte;
  I: Integer;
  Ch: Char;

Begin
  ByteMap[3]:=ByteToSend And $03;
  ByteMap[2]:=((ByteToSend And $0C) Div 4) Or $04;
  ByteMap[1]:=((ByteToSend And $30) Div 16);
  ByteMap[0]:=((ByteToSend And $C0) Div 64) Or $04;
  For I:=0 To 3 Do
    Begin
```

© 1993 Thrustmaster, Inc.

5

```
        KBSendBits(ByteMap[I]);
    End
End;

Procedure KBClearStatus;
Begin
```

```
If UseFlags Then
  Begin
    Mem[Seg0040:$0017]:=$70;
    If KeyPressed Then
      ;
    Delay(10);
    Mem[Seg0040:$0017]:=0;
    If KeyPressed Then
      ;
  End
End;

Begin
End.
```

© 1993 Thrustmaster, Inc.

```
Program MK2Calibrate;
Uses

WCXColor,DOS,CRT,KBLink,WCXVars,WCXUtils,MiscTTT5,FastTTT5,
WinTTT5;
Var
  Ch: Char;

Begin
 MkWin(1,1,80,25,Black,Black,0);
 WCSBox(1,1,80,3,MK2TitleBorder,MK2TitlePaper);
 FastWrite(15,2,Attr(MK2TitleInk,MK2TitlePaper),'ThrustMaster Mark II WCS Calibration Utility v4.00');
 WCSBox(3,5,78,25,MK2PromptBorder,MK2PromptPaper);
 DumpJunk;
 If ParamStr(1) = '' Then
   Begin
     UseFlags:=False
   End
 Else
   Begin
     UseFlags:=True
   End;
 KBClearStatus;
 FastWrite(28,6,Attr(MK2PromptTitle,MK2PromptPaper),'CALIBRATION INSTRUCTIONS');
    FastWrite(5,8,Attr(MK2PromptInk,MK2PromptPaper),'1. To enter Calibrate Mode, place the Red WCS Mode Switch in the ANALOG');
   FastWrite(5,9,Attr(MK2PromptInk,MK2PromptPaper),'  position, then switch it to the CALIBRATE position and press ENTER.');
 WaitEnter;
 WCSBeep;
 Attrib(5,8,75,9,MK2DimPromptInk,MK2DimPromptPaper);
    FastWrite(5,11,Attr(MK2PromptInk,MK2PromptPaper),'2. To begin Calibration, press Button #1 on the WCS and then IMMEDIATELY');
   FastWrite(5,12,Attr(MK2PromptInk,MK2PromptPaper),'  release it. It may take several seconds to clear the WCS buffer.');
 WaitAcknowledge;
 Attrib(5,11,76,12,MK2DimPromptInk,MK2DimPromptPaper);
 SendToThrottle(CalibrateCmd);
   FastWrite(5,14,Attr(MK2PromptInk,MK2PromptPaper),'3. Place the Red WCS Mode Switch in the DIGITAL position, then pull the');
   FastWrite(5,15,Attr(MK2PromptInk,MK2PromptPaper),' Throttle all the
```

© 1993 Thrustmaster, Inc.

way back and press Button #1.');
 WaitAcknowledge;
 Attrib(5,14,75,15,MK2DimPromptInk,MK2DimPromptPaper);
   FastWrite(5,17,Attr(MK2PromptInk,MK2PromptPaper),'4. Move the Throttle forward to the first detent and press Button #1.');
 WaitAcknowledge;
 Attrib(5,17,75,17,MK2DimPromptInk,MK2DimPromptPaper);
   FastWrite(5,19,Attr(MK2PromptInk,MK2PromptPaper),'5. Move the Throttle forward to the second detent and press Button #1.');
 WaitAcknowledge;
 Attrib(5,19,75,19,MK2DimPromptInk,MK2DimPromptPaper);
   FastWrite(5,21,Attr(MK2PromptInk,MK2PromptPaper),'6. Move the Throttle all the way forward and press Button #1.');
 WaitAcknowledge;
 Attrib(5,21,75,21,MK2DimPromptInk,MK2DimPromptPaper);
   FastWrite(5,23,Attr(MK2PromptInk,MK2PromptPaper),'7. Pull the Throttle all the way back and press Button #1.');
 WaitAcknowledge;
 Attrib(5,23,75,23,MK2DimPromptInk,MK2DimPromptPaper);
 DumpJunk;
 KBClearStatus;
 WCSBox(11,13,70,17,MK2MssgBorder,MK2MssgPaper);
   FastWrite(32,14,Attr(MK2MssgTitle,MK2MssgPaper),'CALIBRATION COMPLETE');
   FastWrite(20,15,Attr(MK2MssgInk,MK2MssgPaper),'Calibration of the Mark II WCS is complete.');
   FastWrite(29,16,Attr(MK2MssgInk,MK2MssgPaper),'Press Any Key to Continue');
 WaitKey;
 RmWin;
 ClrScr;
End.

© 1993 Thrustmaster, Inc.

```
Unit WCXBtn;
Interface

Uses
  DOS,CRT,WCXUtils,WCXVars,WCXError,WCXCmd,WCXTkn;

Procedure DoButton;
 Procedure DoFixMT;

Implementation

Procedure DoToggleBtn;
Begin
 GetNextToken;
 With CurrentToken Do
   Begin
     If TokenID = TFlag Then
       Begin
         AddCommand(ToggleOp);
         GetPrStrings;
         GetNextToken;
         If TokenID = TFlag Then
           Begin
             GetPRStrings
           End
         Else
           Begin
             Error('Second PR Strings in Toggle Definition are Missing');
           End
       End
     Else
       Begin
         PutTokenBack;
         GetPRStrings
       End
   End
End;

Procedure DoUMDBtn;
Begin
 With CurrentToken Do
   Begin
     AddCommand(UMDOp);
```

© 1993 Thrustmaster, Inc.

```
      DoToggleBtn;
      GetNextToken;
      If TokenID = RM Then
        Begin
          DoToggleBtn;
          GetNextToken;
          If TokenID = RD Then
            Begin
              DoToggleBtn
            End
          Else
            Begin
              Error('Missing /D Strings')
            End
        End
      Else
        Begin
          Error('Missing /M Strings')
        End
    End
End;

Procedure DoBtnMT;
Begin
  If GameType <> 0 Then
    GetPRStrings
  Else
    Error('BTN MT Codes Cannot Be Used for Game Type 0')
End;

Procedure DoFixMT;
Var
  I: Integer;
Begin
  If OpCodes[MT,0] = 1 Then
    Begin
      CountMem(2);
      OpCodes[MT,0]:=$C0;
      ShiftCodes[MT,0]:=254;
      CharCodes[MT,0]:=8;
      OpCodes[MT,1]:=$C0;
      ShiftCodes[MT,1]:=254;
      CharCodes[MT,1]:=8;
```

© 1993 Thrustmaster, Inc.

```
      End
   Else
     Begin
       I:=0;
       While OpCodes[MT,I] = $40 Do
         Begin
           I:=I + 1
         End;
       If (OpCodes[MT,I] = 0) Or (OpCodes[MT,I] = $80) Then
         Begin
           CountMem(1);
           OpCodes[MT,I + 1]:=$C0;
           ShiftCodes[MT,I + 1]:=254;
           CharCodes[MT,I + 1]:=8;
         End;
       OpCodes[MT,I]:=$80
     End
End;

Procedure DoBtnHM;
Begin
  AddCommand(BtnHMOp);
  GetPRStrings
End;

Procedure DoBtnStd;
Begin
  CountMem(-1);
  With CurrentToken Do
    Begin
      GetNextToken;
      If TokenID = RU Then
        Begin
          DoUMDBtn
        End
      Else
        Begin
          PutTokenBack;
          DoToggleBtn
        End
    End
End;
```

© 1993 Thrustmaster, Inc.

```
Procedure DoBtnRkr;
Var
  I: Integer;
Begin
  With CurrentToken Do
    Begin
      CountMem(-1);
      GetPRStrings;
      If OpCodes[ButtonSelect,0] <> $40 Then
        Begin
          For I:=127 DownTo 1 Do
            Begin
              OpCodes[ButtonSelect,I]:=OpCodes[ButtonSelect,I-1];
              CharCodes[ButtonSelect,I]:=CharCodes[ButtonSelect,I-1];
              ShiftCodes[ButtonSelect,I]:=ShiftCodes[ButtonSelect,I-1];
            End;
          CountMem(1);
          OpCodes[ButtonSelect,0]:=$40;
          CharCodes[ButtonSelect,0]:=$07;
          ShiftCodes[ButtonSelect,0]:=254;
          ButtonPointer:=ButtonPointer+1
        End;
    End
End;

Procedure DoButton;
Begin
  GetNextToken;
  With CurrentToken Do
    Begin
      If TokenID = 0 Then
        Begin
          Case TokenNumVal Of
            1: ChangeTo(W1,'W1');
            2: ChangeTo(W2,'W2');
            3: ChangeTo(W3,'W3');
            4: ChangeTo(W4,'W4');
            5: ChangeTo(W5,'W5');
            6: ChangeTo(W6,'W6');
          Else
            ChangeTo(EndFile,'EOF');
          End
        End;
```

© 1993 Thrustmaster, Inc.

```
    ButtonSelect:=TokenID;
    ButtonPointer:=-1;
    Case TokenID Of
            HM: DoBtnHM; {5}
          UP,DN: DoBtnRkr;
 HU..HL,W4..W5,W1..TG: DoBtnStd; {6..22}
            MT: DoBtnMT; {22}
    Else
      Error('Invalid Button ID')
    End;
    If Not WCSErr Then
      EndButton;
  End
End;

Begin
End.
```

© 1993 Thrustmaster, Inc.

```
first_cmd equ 0c0h        ; first download/calibrate command
cal_cmd equ 0c2h          ; select calibrate command
dl_cmd equ (0c1h ^ cal_cmd)   ; select download command
```

© 1993 Thrustmaster, Inc.

```
Unit WCXCmd;
Interface

Uses
  DOS,CRT,WCXUtils,WCXVars,WCXError,WCXTkn;

Procedure ChangeTo(NewID: Integer; NewGroup: String);
  Procedure DoPRChar;
  Procedure AddCommand(OpCode: Byte);
  Procedure EndButton;
  Procedure GetPRStrings;

Implementation

Procedure ChangeTo(NewID: Integer; NewGroup: String);
Begin
  With CurrentToken Do
    Begin
      TokenID:=NewID;
      TokenGroup:=NewGroup
    End
End;

Procedure DoPRChar;
Var
  ShfTemp: Byte;
Begin
  ButtonPointer:=ButtonPointer + 1;
  With CurrentToken Do
    Begin
      OpCodes[ButtonSelect,ButtonPointer]:=$40;
      If TokenGroup = '/N' Then
        Begin
          CountMem(1);
          ShiftCodes[ButtonSelect,ButtonPointer]:=254;
          CharCodes[ButtonSelect,ButtonPointer]:=7;
          GetNextToken;
          If TokenIsChar Then
            Begin
              PutTokenBack
            End
          Else
```

© 1993 Thrustmaster, Inc.

```
      Begin
        Error('A Character Must Follow a /N Command')
      End
    End
  Else
    Begin
      ShfTemp:=0;
      If TokenIsShf Then
        ShfTemp:=ShfTemp + 1;
      If TokenIsCtl Then
        ShfTemp:=ShfTemp + 2;
      If TokenIsAlt Then
        ShfTemp:=ShfTemp + 4;
      ShiftCodes[ButtonSelect,ButtonPointer]:=ShfTemp;
      If ShiftFlags[ShfTemp,TokenCharCode] = 255 Then
        Begin
          CountMem(2);
          ShiftMap[ShfTemp,ShiftCount[ShfTemp]]:=TokenCharCode;
          CharCodes[ButtonSelect,ButtonPointer]:=ShiftCount[ShfTemp];
          ShiftFlags[ShfTemp,TokenCharCode]:=ShiftCount[ShfTemp];
          ShiftCount[ShfTemp]:=ShiftCount[ShfTemp]+1;
        End
      Else
        Begin
          CountMem(1);

CharCodes[ButtonSelect,ButtonPointer]:=ShiftFlags[ShfTemp,TokenCharCode];
        End
      End
    End
End;

Procedure AddCommand(OpCode: Byte);
Begin
  CountMem(1);
  ButtonPointer:=ButtonPointer + 1;
  OpCodes[ButtonSelect,ButtonPointer]:=0;
  CharCodes[ButtonSelect,ButtonPointer]:=OpCode;
  ShiftCodes[ButtonSelect,ButtonPointer]:=254;
End;

Procedure EndButton;
```

© 1993 Thrustmaster, Inc.

```
Begin
  OpCodes[ButtonSelect,ButtonPointer]:=0;
End;

Procedure GetPRStrings;
Begin
  With CurrentToken Do
    Begin
      GetNextToken;
      If TokenID = PFlag Then
        Begin
          GetNextToken
        End;
      If TokenID = RFlag Then
        Begin
          Error('Release Codes (/R) Must Have Press Codes (/P)')
        End
      Else
        Begin
          If Not TokenIsChar Then
            Begin
              Error('Invalid Press Code')
            End
          Else
            Begin
              While TokenIsChar Do
                Begin
                  { WriteLn(TokenGroup,' TokenIsChar'); }
                  DoPrChar;
                  GetNextToken
                End;
              { WriteLn(TokenGroup);
              WriteLn(ButtonSelect,' ',ButtonPointer); }
              OpCodes[ButtonSelect,ButtonPointer]:=$80;
              If TokenID = RFlag Then
                Begin
                  If ButtonSelect = HM Then
                    Begin
                      Error('Release Codes Cannot Be Used With BTN HM');
                    End
                  Else
                    Begin
                      GetNextToken;
```

© 1993 Thrustmaster, Inc.

```
                If TokenIsChar Then
                  Begin
                    OpCodes[ButtonSelect,ButtonPointer]:=$C0;
                    While TokenIsChar Do
                      Begin
                        DoPRChar;
                        GetNextToken
                      End;
                    OpCodes[ButtonSelect,ButtonPointer]:=$80;
                  End
                Else
                  Begin
                    Error('Null Release Code Encountered')
                  End
              End
            End;
          PutTokenBack
        End
      End
    End
End;

Begin
End.
```

© 1993 Thrustmaster, Inc.

```
Unit WCXColor;
Interface
Uses
 DOS,CRT,WCXUtils;
Var
 MK2TitleInk: Byte;         { MK2 Title Block              }
 MK2TitlePaper: Byte;       { MK2 Title Background         }
 MK2PromptInk: Byte;        { MK2 Prompt Area Text         }
 MK2PromptPaper: Byte;      { MK2 Prompt Area Background   }
 MK2PromptTitle: Byte;      { MK2 Prompt Area Title        }
 MK2MssgInk: Byte;          { MK2 Message Area Text        }
 MK2MssgPaper: Byte;        { MK2 Message Area Background  }
 MK2MssgTitle: Byte;        { MK2 Message Area Title       }
 MK2DimMssgBkGnd: Byte;
 MK2DimMssgFGnd: Byte;
 MK2DimPromptFGnd: Byte;
 MK2DimPromptBkGnd: Byte;
 MK2PromptBorder: Byte;
 MK2MssgBorder: Byte;
 MK2TitleBorder: Byte;
 MK2DimMssgPaper: Byte;
 MK2DimMssgInk: Byte;
 MK2DimPromptPaper: Byte;
 MK2DimPromptInk: Byte;

MK2Beep: Byte;      { MK22 Beep OFF/ON            }
 MK2Dim: Byte;       { MK22 Prompt Dimming OFF/ON  }

Const
 KeyStrs: Array[0..9] of String = ('MK2TITLEINK','MK2TITLEPAPER',
              'MK2PROMPTINK','MK2PROMPTPAPER',
              'MK2PROMPTTITLE','MK2MSSGINK',
              'MK2MSSGPAPER','MK2MSSGTITLE',
              'MK2BEEP','MK2DIM');

Implementation
Var
 InFile: Text;
 CFGLine: String;

Procedure ParseParameter(StrToParse: String);
Var
```

© 1993 Thrustmaster, Inc.

```
    I: Integer;
    TStr: String;
    NStr: String;
    TVal,Code: Integer;
    ParmStr: String;

Begin
  NStr:='';
  TStr:=StrToParse;
  TStr:=UCase(TStr);
  TStr:=LTrim(TStr);
  If Pos('MK2',TStr) = 1 Then
    Begin
      I:=Pos('=',TStr);
      If I > 1 Then
        Begin
          ParmStr:=Copy(TStr,1,I-1);
          I:=I+1;
          While TStr[I] In ['0'..'9'] Do
            Begin
              NStr:=NStr + TStr[I];
              I:=I+1
            End;
          I:=0;
          While (I < 10) And (ParmStr <> KeyStrs[I]) Do
            Begin
              I:=I + 1;
            End;
          If (I < 10) And (NStr <> '') Then
            Begin
              Val(NStr,TVal,Code);
              Case I Of
                0: MK2TitleInk:=TVal;
                1: MK2TitlePaper:=TVal;
                2: MK2PromptInk:=TVal;
                3: MK2PromptPaper:=TVal;
                4: MK2PromptTitle:=TVal;
                5: MK2MssgInk:=TVal;
                6: MK2MssgPaper:=TVal;
                7: MK2MssgTitle:=TVal;
                8: MK2Beep:=TVal;
                9: MK2Dim:=TVal;
              End
```

© 1993 Thrustmaster, Inc.

21

```
        End
      End
    End
End;

Begin
  ClrScr;
  MK2TitleInk:= Black;
  MK2TitlePaper:= LightGray;
  MK2PromptInk:= White;
  MK2PromptPaper:= Blue;
  MK2PromptTitle:= LightCyan;
  MK2MssgInk:= White;
  MK2MssgPaper:= Red;
  MK2MssgTitle:= Yellow;
  MK2Beep:= 1;
  MK2Dim:= 1;
  If Exist('MARK2.CFG') Then
    Begin
      Assign(InFile,'MARK2.CFG');
      Reset(InFile);
      While Not EOF(InFile) Do
        Begin
          ReadLn(InFile,CFGLine);
          ParseParameter(CFGLine)
        End;
      Close(InFile);
    End;
  MK2PromptBorder:=MK2PromptPaper + 8;
  MK2MssgBorder:=MK2MssgPaper + 8;
  MK2TitleBorder:=MK2TitlePaper + 8;
  If MK2Dim > 0 Then
    Begin
      If MK2PromptInk > 8 Then
        Begin
          MK2DimMssgInk:= MK2PromptInk - 8;
          MK2DimPromptInk:= MK2PromptInk - 8
        End
    End
  Else
    Begin
      MK2DimMssgInk:= MK2PromptInk;
      MK2DimPromptInk:= MK2PromptInk
```

© 1993 Thrustmaster, Inc.

```
  End;
MK2DimMssgPaper:= MK2PromptPaper;
MK2DimPromptPaper:= MK2PromptPaper;
MK2PromptBorder:=MK2PromptPaper + 8;
MK2MssgBorder:=MK2MssgPaper + 8;
  MK2TitleBorder:=MK2TitlePaper + 8
End.
```

© 1993 Thrustmaster, Inc.

```
Unit WCXComp;
Interface

Uses
 DOS,CRT,WCXVars,WCXError,WCXTkn,WCXBtn,WCXThr,WCXGame;

Procedure CompileProgram;

Implementation

Procedure CompileProgram;
Begin
 Done:=False;
 WCSErr:=False;
 Repeat
  Begin
   With CurrentToken Do
    Begin
     GetNextToken;
     Case TokenID Of
        Game: DoGame;
       Btn,Rkr: DoButton;
         Thr: DoThrottle;
       EndFile: Done:=True;
     Else
       Error('GAME, RKR, BTN, or THR Expected')
     End
    End
  End
 Until (KeyPressed Or Done Or WCSErr);
 If Not WCSErr Then
  Begin
   DoFixMT
  End
End;

Begin
End.
```

© 1993 Thrustmaster, Inc.

```
Unit WCXDnld;
Interface

Uses

WCXColor,WinTTT5,FastTTT5,DOS,CRT,WCXUtils,WCXVars,WCXError,KBLink;

Procedure DownloadObjectCode;

Implementation

Const
  FirstCmd: Byte = $0C0;
  DownloadCmd: Byte = $0C1;

Procedure DownloadObjectCode;
Var
  I: Integer;
  NeedDot: Boolean;
  PCtr: Integer;
  GCol,GRow: Integer;
Begin
  KBClearStatus;
  WCSBox(8,14,73,20,MK2MssgBorder,MK2MssgPaper);
    FastWrite(15,15,Attr(MK2MssgTitle,MK2MssgPaper),'           FILE TRANSFER IN PROGRESS');
    FastWrite(15,16,Attr(MK2MssgInk,MK2MssgPaper),'Please do not disturb the keyboard or the Mark II WCS');
    FastWrite(15,17,Attr(MK2MssgInk,MK2MssgPaper),'     while the file is being transferred.');
    FastWrite(15,19,Attr(MK2MssgInk,MK2MssgPaper),'     START >®®®®®®®®®®®®®®®®®®®®®®®< FINISH');
  Delay(50);
  NeedDot:=False;
  GCol:=29;
  GRow:=19;
  PCtr:=0;
  SendToThrottle(DownloadCmd);
  For I:=0 To MaxPgmSize Do
    Begin
      SendToThrottle(UserProgram[I]);
      NeedDot:=Not NeedDot;
```

© 1993 Thrustmaster, Inc.

```
      If NeedDot Then
        Begin
          Delay(10)
        End;
      PCtr:=PCtr+1;
      If ((PCtr=5) And (MaxPgmSize=124)) Or (PCtr=10) Then
        Begin
          PCtr:=0;
          PlainWrite(GCol,GRow,'†');
          GCol:=GCol+1;
        End
    End;
End;

Begin
End.
```

© 1993 Thrustmaster, Inc.

```
Unit WCXError;

Interface
Uses
  MiscTTT5,WCXColor,DOS,CRT,WCXTkn,WCXVars;

Procedure Error(ErrorString: String);
  Procedure MyExit;
  Procedure InitRTError;
  Procedure ShowStatus;
  Procedure SignOff;

Implementation
Uses
  WCXUtils,FastTTT5;

Var
  EStr1,EStr2: String;
  ErrorReported: Boolean;

Function ErrorFileName: String;
Var
  TStr: String;
  P,L: Integer;
Begin
  TStr:=UserFileName;
  While Pos('\',TStr) <> 0 Do
    Begin
      P:=Pos('\',TStr);
      L:=Length(TStr) - P;
      TStr:=Copy(TStr,P+1,L);
    End;
  L:=Length(TStr);
  If Pos('.',TStr) = L Then
    Begin
      TStr:=Copy(TStr,1,L-1)
    End;
  ErrorFileName:=TStr
End;

Procedure SignOff;
Var
  StatX: Integer;
```

© 1993 Thrustmaster, Inc.

```
   TStr1,TStr2: String;
Begin
  WCSBox(11,13,70,17,MK2MssgBorder,MK2MssgPaper);
  If WCSErr Then
    Begin
      If ErrorReported Then
        Begin
          EStr1:=ErrorFileName+' Has Not Been Downloaded to the Mark II'
        End;
      FastWrite(32,14,Attr(MK2MssgTitle,MK2MssgPaper),'COMPILE/LOAD ERROR');
      StatX:=41 - (Length(EStr1) Div 2);
      FastWrite(StatX,15,Attr(MK2MssgInk,MK2MssgPaper),EStr1);
      StatX:=41 - (Length(EStr2) Div 2);
      FastWrite(StatX,16,Attr(MK2MssgInk,MK2MssgPaper),EStr2)
    End
  Else
    Begin
      Str(PgmPtr+3:0,Tstr1);
      Str(MaxPgmSize+4:0,TStr2);
      FastWrite(33,14,Attr(MK2MssgTitle,MK2MssgPaper),'DOWNLOAD COMPLETE');
      EStr1:=ErrorFileName+' Used '+TStr1+' of '+TStr2+' Available Bytes';
      StatX:=41 - (Length(EStr1) Div 2);
      FastWrite(StatX,15,Attr(MK2MssgInk,MK2MssgPaper),EStr1);
      StatX:=41 - (Length(EStr2) Div 2);
      FastWrite(StatX,16,Attr(MK2MssgInk,MK2MssgPaper),EStr2);
    End;
  WaitKey;
End;

Procedure ShowStatus;
Var
  StatX: Integer;
Begin
  ErrorReported:=True;
  WCSBox(8,14,73,20,MK2MssgBorder,MK2MssgPaper);
    FastWrite(34,15,Attr(MK2MssgTitle,MK2MssgPaper),'COMPILER ERROR');
  FastWrite(13,16,Attr(MK2MssgInk,MK2MssgPaper),
  'The following has been reported by the Mark II Compiler:');
  StatX:=41 - (Length(EStr1) Div 2);
```

© 1993 Thrustmaster, Inc.

```
  FastWrite(StatX,17,Attr(MK2MssgInk,MK2MssgPaper),EStr1);
  EStr1:='The File '+ErrorFileName+' Can Not Be Transferred to the Mark
II';

StatX:=41 - (Length(EStr1) Div 2);
  FastWrite(StatX,19,Attr(MK2MssgInk,MK2MssgPaper),EStr1);
{
  FastWrite(18,19,Attr(MK2MssgInk,MK2MssgPaper),
  'and Will Not Be Transferred to the MARK II WCS.');
}
  Beep;
  Delay(2000);
End;

Procedure Error(ErrorString: String);
Begin
  If IsCompiling Then
    Begin
      Str(LineNumber:0,EStr1);
      EStr1:='ERROR at line '+EStr1+': '+ErrorString;
    End
  Else
    Begin
      EStr1:='ERROR: '+ErrorString
    End;
  WCSErr:=True
End;

Procedure RTError(ErrorString: String);
Begin
  Error(ErrorString);
  ErrorAddr:=Nil
End;

Var
  ExitSave: Pointer;
  ErrCode: Integer;

{$F+}
Procedure MyExit;
Begin
  ExitProc:=ExitSave;
  ErrCode:=ExitCode;
```

© 1993 Thrustmaster, Inc.

```
    If ExitCode > 0 Then
      Begin
        Case ErrCode of
            2: RTError('File Not Found');
            3: RTError('Path Not Found');
            4: RTError('Too Many Files Open');
            5: RTError('Disk/Directory Full or File is Write-Protected');
          100: RTError('Disk Read Error');
          101: RTError('Disk Write Error');
          150: RTError('Disk is Write-Protected');
          152: RTError('Disk Read Error');
          154: RTError('CRC Error');
          156: RTError('Disk Seek Error');
          158: RTError('Sector Not Found');
          162: RTError('General Hardware Failure');
        Else
          Begin
            If ErrCode < 200 Then
              Begin
                RTError('Unknown Disk/System Error')
              End
            Else
              Begin
                RTError('Unknown Error. Send the .ADV File to Thrustmaster')
              End
          End
        End
      End
End;
{$F-}

Procedure InitRTError;
Begin
  ExitSave:=ExitProc;
  ExitProc:=@MyExit
End;

Begin
  ErrorReported:=False;
  WCSErr:=False;
  EStr1:='The .ADV file has been downloaded to the Mark II WCS.';
  EStr2:='Press Any Key to Continue';
End.
```

© 1993 Thrustmaster, Inc.

```
Unit WCXGame;
Interface

Uses
  DOS,CRT,WCXVars,WCXError,WCXTkn;

Procedure DoGame;

Implementation

Procedure GameError;
Begin
  GameType:=0;
  Error('Invalid Game Type')
End;

Procedure RateError;
Begin
  Error('Invalid Rate Parameter')
End;

Procedure DoGame;
Begin
  With CurrentToken Do
    Begin
      GetNextToken;
      If TokenIsNum Then
        Begin
          GameType:=TokenNumVal;
          If (GameType < 0) or (GameType > 2) Then
            Begin
              GameError
            End
          Else
            Begin
              GetNextToken;
              If TokenIsNum Then
                Begin
                  RateParameter:=((TokenNumVal - 20) * 3) Div 2;
                  If RateParameter < 0 Then
                    RateParameter:=1;
                  If RateParameter > 254 Then
                    RateParameter:=254;
```

© 1993 Thrustmaster, Inc.

```
              End
            Else
              Begin
                RateError
              End
          End
        End
      Else
        Begin
          GameError
        End
    End
End;

Begin
End.
```

© 1993 Thrustmaster, Inc.

```
Unit WCXGen;
Interface

Uses
  DOS,CRT,WCXVars,WCXError,WCXTkn;

Procedure GenObjectCode;

Implementation

Procedure WriteProgram(ByteToWrite: Byte);
Var
  TStr: String;
Begin
  If Not WCSErr Then
    Begin
      If PgmPtr > MaxPgmSize Then
        Begin
          Str(MemOutLine,TStr);
          Error('Out of Memory at Line '+ TStr)
        End
      Else
        Begin
          UserProgram[PgmPtr]:=ByteToWrite;
          PgmPtr:=PgmPtr + 1
        End
    End
End;

Procedure GenObjectCode;
Var
  BaseChar: Byte;
  BTemp: Byte;
  I,J,BVal: Integer;
Begin
  PgmPtr:=1;
  BTemp:=RateParameter;
  If BTemp=0 Then
    BTemp:=1;
  WriteProgram(BTemp);
  BaseChar:=8;
  For I:=0 To 7 Do
    Begin
```

© 1993 Thrustmaster, Inc.

```
        BaseChar:=BaseChar + ShiftCount[I];
        WriteProgram(BaseChar);
      End;
    For I:=0 To 7 Do
      Begin
        If ShiftCount[I] > 0 Then
          Begin
            For J:=0 To ShiftCount[I] Do
              Begin
                If ShiftMap[I,J] > 0 Then
                  Begin
                    WriteProgram(ShiftMap[I,J]);
                  End
              End
          End;
      End;
    BaseChar:=8;
    For I:=0 To 7 Do
      Begin
        BTemp:=ShiftCount[I];
        ShiftCount[I]:=BaseChar;
        BaseChar:=BaseChar + BTemp;
      End;
    If OpCodes[HM,0] = 1 Then
      BVal:=HM + 1
    Else
      BVal:=HM;
    For I:=BVal to TG Do
      Begin
        J:=0;
        Repeat
          Begin
            If (ShiftCodes[I,J] < 254) {And (CharCodes[I,J] > 7) }Then
              Begin
                CharCodes[I,J]:=CharCodes[I,J]+ ShiftCount[ShiftCodes[I,J]];
              End;
            BTemp:=OpCodes[I,J] OR CharCodes[I,J];
            WriteProgram(BTemp);
            J:=J+1;
          End
        Until (ShiftCodes[I,J] = 255) Or WCSErr;
      End;
    If Not WCSErr Then
```

© 1993 Thrustmaster, Inc.

```
Begin
  If GameType = 0 Then
    Begin
      WriteProgram(0)
    End
  Else
    Begin
      If OpCodes[THR,0] = 1 Then
        Begin
          Error('No THR Statement Found')
        End
      Else
        Begin
          I:=0;
          Repeat
            Begin
              If ShiftCodes[THR,I] < 254 Then
                Begin
                  CharCodes[THR,I]:=CharCodes[THR,I]+ShiftCount[ShiftCodes[THR,I]];
                End;
              WriteProgram(CharCodes[THR,I]);
              I:=I + 1
            End
          Until (ShiftCodes[THR,I] = 255) Or WCSErr;
        End;
      If Not WCSErr Then
        Begin
          I:=0;
          Repeat
            Begin
              If (ShiftCodes[MT,I] < 254){ And (CharCodes[MT,I] > 7) }Then
                Begin
                  CharCodes[MT,I]:=CharCodes[MT,I]+ShiftCount[ShiftCodes[MT,I]];
                End;
              BTemp:=OpCodes[MT,I] OR CharCodes[MT,I];
              WriteProgram(BTemp);
              I:=I + 1
            End
          Until (ShiftCodes[MT,I] = 255) Or WCSErr;
        End
    End
```

© 1993 Thrustmaster, Inc.

```
    End;
  If Not WCSErr Then
    Begin
      UserProgram[0]:=0;
      For I:=1 to MaxPgmSize Do
        UserProgram[0]:=( UserProgram[0] + UserProgram[I] ) And $FF
    End
End;

Begin
End.
```

© 1993 Thrustmaster, Inc.

ThrustMaster Mark II WCS Calibration Utility v2.02

1. To enter Calibrate Mode, place the Red WCS Mode Switch in the ANALOG
    position, then switch it to the CALIBRATE position and press ENTER.

2. To begin Calibration press Button #1 on the WCS and then IMMEDIATELY
    release it. It may take several seconds to clear the WCS buffer.

3. Place the Red WCS Mode Switch in the DIGITAL position, then pull the
    WCS Throttle all the way back and press Button #1.

4. Move the Throttle forward to the first detent and press Button #1.

5. Move the Throttle forward to the second detent and press Button #1.

6. Move the Throttle all the way forward and press Button #1.

7. Pull the Throttle all the way back and press Button #1.

© 1993 Thrustmaster, Inc.

```
Unit WCXObj;
Interface

Uses
  DOS,CRT,WCXVars,WCXError;

Procedure DownloadObjectCode;

Implementation
Var
  ObjectFile: File of Byte;

Function MakeHex(HexVal: Byte): String;
Const
  HexChrs: String = '0123456789ABCDEF';
Var
  Lo,Hi: Byte;
Begin
  Lo:=HexVal And 15 + 1;
  Hi:=HexVal Div 16 + 1;
  MakeHex:=HexChrs[Hi]+HexChrs[Lo];
End;

Procedure DownloadObjectCode;
Var
  PgmPtr: Integer;
  I: Integer;
Begin
  Assign(ObjectFile,'COMPILED.OBJ');
  ReWrite(ObjectFile);
  For I:=0 To MaxPgmSize Do
    Write(ObjectFile,UserProgram[I]);
  Close(ObjectFile);
End;

Begin
End.
```

© 1993 Thrustmaster, Inc.

```
UNIT WCXScrn;

Interface

Uses
Crt,WCXUtils,FastTTT5,MiscTTT5,MenuTTT5,IOTTT5,WinTTT5,KeyTTT5,PullTTT5;

Const

{ Sign On Colors }

CSBorder: Byte = White;
  CSText: Byte = White;
  CSBkgnd: Byte = Blue;
  CSBright: Byte = Yellow;

MSBorder: Byte = Black;
  MSText: Byte = Black;
  MSBkgnd: Byte = LightGray;
  MSBright: Byte = Black;

{ Standard Screen Colors }

CHiF: Byte = Black;
  CHiB: Byte = Cyan;
  CLoF: Byte = White;
  CLoB: Byte = LightGray;
  CMsgF: Byte = White;
  CMsgB: Byte = Brown;

MHiF: Byte = White;
  MHiB: Byte = Black;
  MLoF: Byte = Black;
  MLoB: Byte = LightGray;
  MMsgF: Byte = Black;
  MMsgB: Byte = LightGray;

Procedure ClearMessage;
 Procedure TempMessage(TopLine,BottomLine: String; FGnd,BGnd: Byte);
 Procedure ProcMessage(TopLine: String; FGnd,BGnd: Byte);
 Procedure WaitMessage(TopLine,BottomLine: String; FGnd,BGnd: Byte);
 Procedure SignOn(ProgramName,CopyrightMessage: String);
```

© 1993 Thrustmaster, Inc.

```
Var
  HiF,HiB,LoF,LoB,MsgF,MsgB: Byte;

Implementation

Var
  ColorMonitor: Boolean;
  MessageChar: Char;
  SBright,SBorder,SText,SBkgnd: Byte;
  ScreenMinX,ScreenMinY,ScreenMaxX,ScreenMaxY: Byte;

Procedure TempMessage(TopLine,BottomLine: String; FGnd,BGnd: Byte);
Var
  TLine,BLine: String;
  Lin,Col,T,B,W,X: Integer;
Begin
  Lin:=12;
  T:=Length(TopLine) Div 2;
  B:=Length(BottomLine) Div 2;
  W:=Max(Length(TopLine),Length(BottomLine));
  X:=W Div 2;
  Col:=38 - X;
  MkWin(Col,Lin,Col + W + 3,Lin + 3,FGnd,BGnd,2);
  PlainWrite(40 - T,Lin + 1,TopLine);
  PlainWrite(40 - B,Lin + 2,BottomLine)
End;

Procedure WaitMessage(TopLine,BottomLine: String; FGnd,BGnd: Byte);
Begin
  TempMessage(TopLine,BottomLine,FGnd,BGnd);
  Beep;
  MessageChar:=GetKey;
  RmWin
End;

Procedure ProcMessage(TopLine: String; FGnd,BGnd: Byte);
Var
  TLine,BLine: String;
  Lin,Col,T,W,X: Integer;
Begin
  T:=Length(TopLine) Div 2;
  W:=Length(TopLine);
```

© 1993 Thrustmaster, Inc.

```
  X:=W Div 2;
  Col:=40 - X;
  FBox(20,12,60,14,FGnd,BGnd,2);
  PlainWrite(40 - T,13,TopLine);
End;

Procedure ClearMessage;
Begin
  FBox(20,12,60,14,HiF,HiB,0)
End;

Procedure SignOn(ProgramName,CopyrightMessage: String);
Var
  SLine: Integer;
  SColumn: Integer;
  SWidth: Integer;
  SHeight: Integer;

Var
  I: Integer;
  Ch: Char;

Begin
  MkWin(ScreenMinX,ScreenMinY,ScreenMaxX,ScreenMaxY,HiF,HiB,2);
  Delay(500);
  SHeight:=3;
  SLine:=2;
  SWidth:=73; {Max(Length(ProgramName),Length(CopyrightMessage))+1;
}
  SColumn:=((Lo(WindMax) - Lo(WindMin)) Div 2) + Lo(WindMin)-(SWidth
Div 2);

GrowFBox(SColumn,SLine,SColumn+SWidth+2,SLine+SHeight,SBorder
,SBkgnd,2);
  WriteCenter(SLine+1,SBright,SBkgnd,ProgramName);
  WriteCenter(SLine+2,SText,SBkgnd,CopyrightMessage);
  Repeat
    ;
  Until KeyPressed;
  MessageChar:=ReadKey;
  RmWin
End;
```

© 1993 Thrustmaster, Inc.

```
Procedure SetUpColors;
Begin
 If ColorMonitor Then
   Begin
     Hif:=CHiF;
     Hib:=CHiB;
     LoF:=CLoF;
     LoB:=CLoB;
     MsgF:=CMsgF;
     MsgB:=CMsgB;
     SBorder:=CSBorder;
     SText:=CSText;
     SBkgnd:=CSBkgnd;
     SBright:=CSBright;
   End
 Else
   Begin
     Hif:=MHiF;
     Hib:=MHiB;
     LoF:=MLoF;
     LoB:=MLoB;
     MsgF:=MMsgF;
     MsgB:=MMsgB;
     SBorder:=MSBorder;
     SText:=MSText;
     SBkgnd:=MSBkgnd;
     SBright:=MSBright;
   End
End;

Begin
 If (BaseOfScreen = $B000) Then
   ColorMonitor:=False
 Else
   ColorMonitor:=True;
 SetUpColors;
 ScreenMinX:=Lo(WindMin)+1;
 ScreenMiny:=Hi(WindMin)+1;
 ScreenMaxX:=Lo(WindMax)+1;
 ScreenMaxY:=Hi(WindMax)+1;
End.
```

© 1993 Thrustmaster, Inc.

Unit WCXTbls;

Interface

Const
  KeyWords: String = '  HM HU HR HD HL UP W4 '
          + 'W6 W5 DN W1 W2 W3 LB MB UB TG MT '
          + '/T /P /R /U /M /D SHF ALT CTL GAMEBTN RKR THR EOF '
          + 'CAPS';

ShiftedChars: String='~!@#$%^&*()_+QWERTYUIOP{}ASDFGHJKL:"ZXCVBNM<>?|';

UnShiftedChars: String="1234567890-=qwertyuiop[]asdfghjkl;'zxcvbnm,./\";

Keys: Array[0..99] Of String[6] = ('','1','2','3','4','5',
          '6','7','8','9','0','-',
          '=','BSP','TAB','Q','W','E',
          'R','T','Y','U','I','O',
          'P','[',']','A','S',
          'D','F','G','H','J','K',
          'L',';','"','ENT','LSFT','Z',
          'X','C','V','B','N','M',
          ',','.','/','RSFT','LCTL','LALT',
          'SPC','RALT','RCTL','INS','DEL','LAROW',
          'HOME','END','UAROW','DAROW','PGUP','PGDN',
          'RAROW','NUML','KP7','KP4','KP1','KP/',
          'KP8','KP5','KP2','KP0','KP*','KP9',
          'KP6','KP3','KP.','KP-','KP+','KPENT',
          'ESC','F1','F2','F3','F4','F5',
          'F6','F7','F8','F9','F10','F11',
          'F12','SCRLCK','\','/N',' ');

KeyCodes: Array[0..99] of Byte =($0E,$16,$1E,$26,$25,$2E,
          $36,$3D,$3E,$46,$45,$4E,
          $55,$66,$0D,$15,$1D,$24,
          $2D,$2C,$35,$3C,$43,$44,
          $4D,$54,$5B,$1C,$1B,
          $23,$2B,$34,$33,$3B,$42,
          $4B,$4C,$52,$5A,$12,$1A,
          $22,$21,$2A,$32,$31,$3A, © 1993 Thrustmaster, Inc.

```
                    $41,$49,$4A,$59,$14,$11,
                    $29,$39,$14,$70,$71,$6B,
                    $6C,$69,$75,$72,$7D,$7A,
                    $74,$77,$6C,$6B,$69,$4A,
                    $75,$73,$72,$70,$7C,$7D,
                    $74,$7A,$71,$7B,$79,$5A,
                    $76,$05,$06,$04,$0C,$03,
                    $0B,$83,$0A,$01,$09,$78,
                    $07,$7E,$5D,0,0);
```

Implementation

Begin
End.

```
Program Test;
Uses
  CRT,DOS;
Procedure WaitAcknowledge;
Var
  I: Integer;
  Ch: Char;
Begin
  For I:=1 To 10 Do
  Begin
    Repeat
    Until KeyPressed;
    Ch:=ReadKey;
    Write(I)
  End
End.
```

© 1993 Thrustmaster, Inc.

```
Unit WCXThr;
Interface

Uses
  DOS,CRT,WCXUtils,WCXVars,WCXError,WCXCmd,WCXTkn;

Procedure DoThrottle;

Implementation

Procedure GetTSteps;
Begin
  With CurrentToken Do
    Begin
      GetNextToken;
      If TokenIsNum Then
        Begin
          NThrottleSteps:=TokenNumVal;
          AddCommand(NThrottleSteps);
          GetNextToken;
          If TokenIsNum Then
            Begin
              NABSteps:=TokenNumVal;
              AddCommand(NABSteps)
            End
          Else
            Begin
              Error('Invalid AB Step Count')
            End
        End
      Else
        Begin
          Error('Invalid Throttle Step Count')
        End
    End
End;

Procedure DoTType1;
Var
  I: Integer;
Begin
  With CurrentToken Do
    Begin
```

© 1993 Thrustmaster, Inc.

```
        AddCommand(4);
        GetTSteps;
        If Not WCSErr Then
          Begin
            GetPrStrings;
            If ButtonPointer = 8 Then
              Begin
                For I:=0 To ButtonPointer Do
                  Begin
                    OpCodes[ButtonSelect,I]:=0;
                  End
              End
            Else
              Begin
                Error('Error In Throttle Control Characters');
              End;
          End
      End
    End;

Procedure DoTType2;
Var
 I: Integer;
Begin
  With CurrentToken Do
    Begin
      AddCommand(5);
      GetTSteps;
      If Not WCSErr Then
        Begin
          GetPrStrings;
          If ButtonPointer = NThrottleSteps + NABSteps + 2 Then
            Begin
              For I:=0 To ButtonPointer Do
                Begin
                  OpCodes[ButtonSelect,I]:=0;
                End
            End
          Else
            Begin
              Error('Error In Throttle Control Characters');
            End;
        End
```

© 1993 Thrustmaster, Inc.

```
      End
End;

Procedure DoThrottle;
Begin
  ButtonSelect:=CurrentToken.TokenID;
  ButtonPointer:=-1;
  Case GameType Of
    1: DoTTYpe1;
    2: DoTTYpe2;
  Else
    Begin
      Error('Throttle Declared For Game Type 0');
    End
  End
End;

Begin
End.
```

© 1993 Thrustmaster, Inc.

```
Unit WCXTkn;
InterFace

Procedure GetNextToken;
  Procedure PutTokenBack;
  Procedure KillCurrentLine;

Type
  WCSToken = Record
        TokenGroup: String[8];
        TokenID: Integer;
        TokenIsChar: Boolean;
        TokenCharCode: Byte;
        TokenIsNum: Boolean;
        TokenNumVal: Integer;
        TokenIsShf: Boolean;
        TokenIsAlt: Boolean;
        TokenIsCtl: Boolean;
        TokenError: Boolean;
      End;

Var
  CurrentToken: WCSToken;

Implementation

Uses
  DOS,CRT,WCXUtils,WCXTbls,WCXVars;

Var
  CurrentLine: String;
  UseLastToken: Boolean;
  CurrentGroup: String;
  NeedInit,Done: Boolean;
  InFile: Text;

Function NextGroup: String;
Var
  Loc: Integer;
Begin
 If NeedInit Then
   Begin
     Assign(InFile,UserFileName);
```

© 1993 Thrustmaster, Inc.

```
    Reset(InFile);
    NeedInit:=False;
    Done:=False;
    CurrentLine:='';
    UseLastToken:=False;
    CurrentGroup:='';
    LineNumber:=0
  End;
  While (Length(CurrentLine) = 0) And Not Done Do
    Begin
      If Not EOF(InFile) Then
        Begin
          ReadLn(InFile,CurrentLine);
          CurrentLine:=CleanStr(CurrentLine);
          LineNumber:=LineNumber+1;
        End
      Else
        Begin
          Done:=True;
          CurrentGroup:='EOF';
          Close(InFile);
        End
    End;
  If Not Done Then
    Begin
      Loc:=Pos(' ',CurrentLine);
      If Loc > 0 Then
        Begin
          CurrentGroup:=Copy(CurrentLine,1,Loc-1);
          CurrentLine:=Copy(CurrentLine,Loc+1,Length(CurrentLine)-Loc);
        End
      Else
        Begin
          CurrentGroup:=CurrentLine;
          CurrentLine:=''
        End
    End;
  NextGroup:=CurrentGroup
End;

Procedure KillCurrentLine;
Begin
  CurrentLine:=''
```

© 1993 Thrustmaster, Inc.

```
End;

Procedure PutTokenBack;
Begin
  UseLastToken:=True
End;

Procedure InitCurrentToken2;
Begin
  With CurrentToken Do
    Begin
      TokenID:=0;
      TokenNumVal:=0;
      TokenCharCode:=0;
      TokenGroup:='';
      TokenIsChar:=False;
      TokenIsNum:=False;
      TokenError:=False;
    End
End;

Procedure InitCurrentToken;
Begin
  With CurrentToken Do
    Begin
      TokenIsShf:=False;
      TokenIsAlt:=False;
      TokenIsCtl:=False;
      InitCurrentToken2
    End
End;

Function IsNumber(NumStr: String): Boolean;
Const
  NStr: String = '0123456789';
Var
  I: Integer;
  Temp: Boolean;
Begin
  Temp:=True;
  For I:=1 To Length(NumStr) Do
    Begin
      If Pos(NumStr[I],NStr) = 0 Then
```

© 1993 Thrustmaster, Inc.

```
      Begin
        Temp:=False
      End
    End;
  IsNumber:=Temp
End;

Procedure SetCharCode;
Var
  I,Tmp: Integer;
Begin
  With CurrentToken Do
    Begin
      If Length(TokenGroup) = 1 Then
        Begin
          Tmp:=Pos(TokenGroup,ShiftedChars);
          If Tmp > 0 Then
            Begin
              TokenIsShf:=True;
              TokenGroup:=UnshiftedChars[Tmp];
            End
        End;
      I:=0;
      While (I < 99) And (UCase(TokenGroup) <> Keys[I]) Do
        Begin
          I:=I + 1
        End;
      If I < 99 Then
        Begin
          TokenCharCode:=KeyCodes[I];
          TokenIsChar:=True
        End
    End
End;

Procedure CheckTokenError;
Begin
  With CurrentToken Do
    Begin
      If ((Not TokenIsChar) And (Not TokenIsNum) And (TokenID = 0) Or
          ((TokenIsShf Or TokenIsAlt Or TokenIsCtl) And Not TokenIsChar))
Then
        TokenError:=True
```

© 1993 Thrustmaster, Inc.

```
    End
End;

Procedure GetNextToken;
Var
 ECode: Integer;
Begin
 If Not UseLastToken Then
  Begin
   InitCurrentToken;
   With CurrentToken Do
    Begin
     Repeat
      Begin
       InitCurrentToken2;
       TokenGroup:=NextGroup;
       If (Length(TokenGroup) > 1) And (Pos(UCase(TokenGroup),KeyWords) > 0) Then
        Begin
         TokenID:=Pos(UCase(TokenGroup),KeyWords) Div 4;
         If (TokenID = Shf) Or (TokenID = Caps) Then
          TokenIsShf:=True;
         If TokenID = Alt Then
          TokenIsAlt:=True;
         If TokenID = Ctl Then
          TokenIsCtl:=True;
        End
      End
     Until KeyPressed Or (Not (TokenID In [Caps,Shf,Alt,Ctl]));
     If TokenID = 0 Then
      Begin
       If IsNumber(TokenGroup) Then
        Begin
         TokenIsNum:=True;
         Val(TokenGroup,TokenNumVal,ECode);
        End;
       SetCharCode
      End
    End;
   CheckTokenError
  End;
 UseLastToken:=False;
End;
```

© 1993 Thrustmaster, Inc.

```
Begin
 NeedInit:=True
End.
```

© 1993 Thrustmaster, Inc.

```
Unit WCXUtils;

Interface

Procedure WCSBeep;
  Function UCase(InStr: String): String;
  Function LTrim(InStr: String): String;
  Function RTrim(InStr: String): String;
  Function DeREM(PLine: String): String;
  Function CleanStr(PLine: String): String;
  Function Exist(Filename: String): Boolean;
  Procedure WaitAcknowledge;
  Procedure WaitAcknowledge2;
  Procedure WaitEnter;
  Procedure DumpJunk;
  Procedure SendToThrottle(ByteToSend: Byte);
  Procedure CountMem(NBytes: Integer);
  Function Max(FirstVal, SecondVal: Integer): Integer;
  Procedure WaitKey;
  Procedure WCSBox(X1,Y1,X2,Y2,FG,BG: Byte);

Const
  DownloadCmd: Byte = $0C1;
  CalibrateCmd: Byte = $0C2;

Implementation

Uses
WCXColor,MiscTTT5,WCXVars,DOS,CRT,KBLink,FastTTT5,WinTTT5;

Procedure WCSBox(X1,Y1,X2,Y2,FG,BG: Byte);
Begin
  FBox(X1,Y1,X2,Y2,FG,BG,1);
  Attrib(X1+1,Y2,X2,Y2,Black,BG);
  Attrib(X2,Y1,X2,Y2,Black,BG)
End;

Procedure WCSBeep;
Begin
  If MK2Beep > 0 Then
    Begin
      Sound(1000);
      Delay(20);
```

© 1993 Thrustmaster, Inc.

```
    NoSound
  End
End;

Procedure WaitKey;
Var
  Ch: Char;
Begin
  Repeat
    ;
  Until Keypressed;
  Ch:=ReadKey
End;

Function Max(FirstVal, SecondVal: Integer): Integer;
Begin
  If SecondVal > FirstVal Then
    Max:=SecondVal
  Else
    Max:=FirstVal
End;

Procedure CountMem(NBytes: Integer);
Begin
  If MemOutLine = 0 Then
    Begin
      MemUsed:=MemUsed + NBytes;
      If MemUsed > MaxPgmSize Then
        Begin
          MemOutLine:=LineNumber;
        End
    End
End;

Procedure WaitAcknowledge;
Var
  Ch: Char;
Begin
  Ch:=' ';
  Repeat
    If KeyPressed Then
      Ch:=ReadKey
  Until (Ch = Chr(13)) Or (Ch = Chr(8));
```

© 1993 Thrustmaster, Inc.

```
  WCSBeep;
  If NeedPgmSize Then
    Begin
      NeedPgmSize:=False;
      If Ch = Chr(13) Then
        Begin
          MaxPgmSize:=124
        End
      Else
        Begin
          MaxPgmSize:=252
        End
    End;
  Delay(1000);
End;

Procedure WaitAcknowledge2;
Var
  Ch: Char;
Begin
  Ch:=' ';
  Repeat
    If KeyPressed Then
      Ch:=ReadKey
  Until (Ch = Chr(13)) Or (Ch = Chr(8));
  WCSBeep;
  If NeedPgmSize Then
    Begin
      NeedPgmSize:=False;
      If Ch = Chr(13) Then
        Begin
          MaxPgmSize:=124
        End
      Else
        Begin
          MaxPgmSize:=252
        End
    End;
  Attrib(8,14,73,20,MK2DimMssgInk,MK2DimMssgPaper);
  Delay(1000);
End;

Procedure WaitEnter;
```

© 1993 Thrustmaster, Inc.

57

```
Var
  Ch: Char;
Begin
  Ch:=' ';
  Repeat
    If KeyPressed Then
      Ch:=ReadKey
  Until Ch = Chr(13);
End;

Procedure SendToThrottle(ByteToSend: Byte);
Begin
  KBSendByte(ByteToSend)
End;

Procedure DumpJunk;
Var
  Ch: Char;
Begin
  Repeat
    While KeyPressed Do
      Ch:=ReadKey;
    Delay(500)
  Until Not KeyPressed
End;

Function Exist(Filename: String): Boolean;
Var
  Inf: SearchRec;
Begin
  FindFirst(Filename,AnyFile,Inf);
  Exist:= (DOSError = 0);
End;

Function DeREM(PLine: String): String;
Var
  TempStr: String;
  Loc: Integer;
Begin
  TempStr:=PLine;
  Loc:=Pos('REM',UCase(TempStr));
  If Loc = 1 Then
    Begin
```

© 1993 Thrustmaster, Inc.

```
      TempStr:="
    End
  Else
    Begin
      If Loc > 0 Then
        Begin
          TempStr:=Copy(TempStr,1,Loc-1)
        End;
      End;
    DeREM:=TempStr
End;

Function UCase(InStr: String):String;
Var
  I: Integer;
  TempStr: String;
Begin
  If Length(InStr) > 0 Then
    Begin
      TempStr:=";
      For I:=1 to Length(InStr) Do
        Begin
          TempStr:=Concat(TempStr,UpCase(InStr[I]));
        End;
      UCase:=TempStr
    End
  Else
    Begin
      UCase:="
    End
End;

Function LTrim(InStr: String):String;
Var
  I: Integer;
  TmpStr: String;
Begin
  TmpStr:=InStr;
  If Length(InStr) > 0 Then
    Begin
      I:=1;
      While ((InStr[I] = '+') Or (InStr[I] = ' ') Or (InStr[I] = Chr(9)))
          And (I <= Length(InStr)) Do
```

© 1993 Thrustmaster, Inc.

```
Unit WCXVars;
Interface

Uses
  DOS,CRT;

Const
  HM = 1;
  HU = 2;
  HR = 3;
  HD = 4;
  HL = 5;
  UP = 6;
  W4 = 7;
  W6 = 8;
  W5 = 9;
  DN = 10;
  W1 = 11;
  W2 = 12;
  W3 = 13;
  LB = 14;
  MB = 15;
  UB = 16;
  TG = 17;
  MT = 18;
  TFlag = 19;
  PFlag = 20;
  RFlag = 21;
  RU = 22;
  RM = 23;
  RD = 24;
  SHF = 25;
  ALT = 26;
  CTL = 27;
  GAME = 28;
  BTN = 29;
  RKR = 30;
  THR = 31;
  ENDFILE = 32;
  CAPS = 33;

EndPgmOp = 0;
  NullbuttonOp = 1;
```

© 1993 Thrustmaster, Inc.

```
  UmdOp = 2;
  ToggleOp = 3;
  Th1Op=4;
  Th2Op=5;
  BtnHMOp = 6;
  UndefOp = 7;

Type
  UsrPgm = Array[0..252] Of Byte;

Var
  MemUsed: Integer;
  MemOutLine: Integer;
  LineNumber: Integer;
  WCSErr: Boolean;
  RateParameter: Integer;
  GameType: Integer;
  NThrottleSteps: Byte;
  NABSteps: Byte;
  Done: Boolean;
  OutFile: Text;
  CheckSum: Byte;
  UserFileName: String;
  ShiftFlags: Array[0..7,0..255] of Byte;
  ShiftMap: Array[0..7,0..63] of Byte;
  ShiftCount: Array[0..7] of Byte;
  OpCodes: Array[0..32,0..128] of Byte;
  CharCodes: Array[0..32,0..128] of Byte;
  ShiftCodes: Array[0..32,0..128] of Byte;
  UserProgram: UsrPgm;
  ButtonSelect: Integer;
  ButtonPointer: Integer;
  IsCompiling: Boolean;
  UseFlags: Boolean;
  MaxPgmSize: Integer;
  NeedPgmSize: Boolean;
  PgmPtr: Integer;

Implementation
Var
 I,J: Integer;
Begin
 For I:=0 to 7 Do
```

© 1993 Thrustmaster, Inc.

```
    Begin
      For J:=0 To 255 Do
        Begin
          ShiftFlags[I,J]:=255
        End
    End;
  For I:=0 to 7 Do
    Begin
      ShiftCount[I]:=0;
      For J:=0 To 63 Do
        Begin
          ShiftMap[I,J]:=0;
        End
    End;
  For I:=0 to 32 Do
    Begin
      OpCodes[I,0]:=NullButtonOp;
      CharCodes[I,0]:=0;
      ShiftCodes[I,0]:=255;
      For J:=1 To 128 Do
        Begin
          OpCodes[I,J]:=0;
          CharCodes[I,J]:=0;
          ShiftCodes[I,J]:=255;
        End
    End;
  For I:=0 To 252 Do
    Begin
      UserProgram[I]:=0
    End;
  ButtonSelect:=0;
  ButtonPointer:=0;
  GameType:=0;
  RateParameter:=1;
  IsCompiling:=False;
  MemOutLine:=0;
  MemUsed:=26;
  MaxPgmSize:=252;
  NeedPgmSize:=True;
End.

Begin
      I:=I + 1
```

© 1993 Thrustmaster, Inc.

```
      End;
    LTrim:=Copy(InStr,I,Length(InStr) - I + 1);
   End
  Else
   Begin
    LTrim:="
   End
End;

Function RTrim(InStr: String):String;
Var
 I: Integer;
 TempStr:String;
Begin
 If Length(InStr) > 0 Then
   Begin
    I:=Length(InStr);
    While (InStr[I] = ' ') And (I > 0) Do
     Begin
      I:=I - 1
     End;
    TempStr:=Copy(InStr,1,I);
   End
  Else
   Begin
    TempStr:="
   End;
 RTrim:=TempStr
End;

Function CleanStr(PLine: String): String;
Var
 Temp1,Temp2: String;
 I: Integer;
 Spaces: Boolean;
Begin
 Temp1:=LTrim(DeRem(PLine));
 Temp2:=";
 Spaces:=False;
 For I:=1 To Length(Temp1) Do
   Begin
    If Temp1[I] = Chr(9) Then
     Begin
```

© 1993 Thrustmaster, Inc.

```
        Temp1[I]:=' '
      End;
    If Temp1[I] = ' ' Then
      Begin
        If Not Spaces Then
          Begin
            Temp2:=Temp2 + Temp1[I];
            Spaces:= True
          End
      End
    Else
      Begin
        Spaces:=False;
        Temp2:=Temp2 + Temp1[I]
      End
  End;
  CleanStr:=RTrim(Temp2)
End;

Begin
End.
```

APPENDIX C

```
; MAIN_LP is the main program executive loop
main_lp
        call get_buttons            ; read the buttons
        btfsc wcs_flags1,calibrate_mode ; check if download requested
        goto download               ; do the download routine
        movlw 04h                   ; get char pace constant
        movwf inst_ptr              ; set pointer
        call read_current           ; get char pace
        movwf char_pace             ; save it
        movlw 0ch                   ; point to max char id
        movwf inst_ptr
        call read_current           ; read max char id
        addlw 04h                   ; offset to user base - 1
        movwf inst_ptr              ; set instruction pointer to user pgm
        bcf wcs_flags1,scan_done    ; clear the done flag
        bsf wcs_flags1,no_change    ; set the no changes flag
scan_lp
        call fetch_next             ; get next instruction
        movfw char_code             ; get character code
        andlw 0f8h                  ; see if its an char code > 7
        iorwf op_code,w             ; or op code not 0
        skpnz                       ; do char code if so
        goto do_special             ; else do op case handler ; DO_CODE processes the string, determines if a code needs to be sent,
;  and sends the code. When the program gets here, the IP will have been
;  positioned to point to the first byte of the press code for the correct
;  press/release string. All UMD and TT codes are already processed.
```

© 1993 Thrustmaster, Inc.

```
do_code
        btfss delta_2,bttn_changed      ; if this button didn't change, skip
        goto end_and_rotate             ; done, rotate inputs
        bcf wcs_flags1,no_change ; say something changed
        btfsc inbyte_2,bttn_pressed     ; if it wasn't a press, then skip
        goto was_pressed
was_released
        call skip_string;               ; dump the press string
        call chk_for_release            ; 0 if release code exists
        skpnz                           ; done if not
        goto send_release               ; send release if it exists
kill_rptg_char
        btfss wcs_flags1,is_repeating   ; see if a char is repeating
        goto end_and_rotate             ; done if not
        bcf wcs_flags1,is_repeating     ; kill the flag
        call tx_break                   ; kill the character
        goto end_and_rotate             ; now your done
send_release
        call fetch_next                 ; point to start of release code
was_pressed
        call send_string                ; send the press/release string
end_and_rotate
        call skip_button                ; slough the rest of the code
        call get_next_button            ; rotate buttons, set button flags
end_scan
        btfss wcs_flags1,scan_done      ; see if all have been processed
        goto scan_lp
        btfsc wcs_flags1,no_change      ; see if anything changed on this pass
        call do_rptg_char               ; send another repeat code if not
```

© 1993 Thrustmaster, Inc.    2

```
        goto main_lp

; END_PGM executes special op 00 - end of user program end_pgm
        bsf wcs_flags1,scan_done ; terminate scan
        goto end_scan             ; finish the current scan loop ; LOCATE_TT executes opcode 03. It positions the IP to the correct toggle
;   string based on the tt_flag for the current button.

locate_tt
        btfsc tt_flags_2,toggle_on ; is the toggle flag set
        goto scan_lp              ; no, get first string
        call skip_code            ; skip first pr code
        goto scan_lp              ; do other string ; LOCATE_UMD executes opcode 04. It positions the IP based on the current
;   rocker state to the correct one of 3 sets of strings available when UMD
;   codes are defined. Skips 2 if down, 1 if center, none if up.

locate_umd
        btfss adc_result,rkr_up   ; see if rocker is up
        call skip_code            ; skip one if not up
        btfsc adc_result,rkr_dn   ; see if rocker is down
        call skip_code            ; skip one if it's down
        goto scan_lp
```

© 1993 Thrustmaster, Inc.

; SKIP_CODE skips the remainder of the code pointed to by IP. On entry, the
; the IP points to the byte before the code which is to be skipped. On exit,
; the IP points to the last byte in the press/release string. Use to locate
; the correct UMD string.

```
skip_code
        call fetch_next           ; get first byte of code
        call chk_for_tt           ; check for tt code
        skpz
        goto sc_1
        call fetch_next           ; skip tt code
        call sc_1
        call fetch_next
sc_1
        call skip_string          ; skip the press string
        call chk_for_release      ; returns 0=release follows
        skpz                      ; yes, process release code
        return
        goto step_and_skip        ; step into release, skip it
```

; SKIP_STRING sloughs off the rest of the current string. It returns
;   with IP pointing to the last byte in the current string.

```
skip_string
        call chk_code_01          ; see if its a continue code
        skpz                      ; if so, keep going
        return                    ; otherwise, IP > last byte
step_and_skip
        call fetch_next           ; get next code
```

© 1993 Thrustmaster, Inc.

```
        goto skip_string          ; and loop

; SKIP_BUTTON advances the IP to the last byte of the current button. It
;   skips bytes until the opcode is 0 and the opchar is not 03 (get tt).

skip_button
        movfw op_code             ; get opcode
        skpz                      ; if its 0, check for tt code
        goto sb_1                 ; otherwise
        call chk_for_tt           ; if its a tt code, continue
        skpz
        return                    ; otherwise done
sb_1
        call fetch_next           ; get next code
        goto skip_button          ; and loop ; FETCH_NEXT increments the instruction pointer and fetches the
;   next instruction from the EEPROM.

fetch_next
        call read_next            ; increments ip, reads that byte
        movwf op_code             ; save opcode
        andlw 03fh                ; kill op bits
        movwf char_code           ; save the character code
        swapf op_code,f           ; recall op code
        rrf op_code,f             ; move it right two bits
        rrf op_code,w             ; and put it in accumulator
        andlw 03h                 ; kill the rest of it
        movwf op_code             ; save it
        return
```

© 1993 Thrustmaster, Inc.     5

; CHK_FOR_TT checks for a toggle definition when the opcode is 0. It returns
; 0 if the code is tt, non-zero otherwise.

```
chk_for_tt
        movfw char_code         ; get character code
        goto chk_for_cmmn
```

; CHK_FOR_RELEASE returns 0 if the last byte in the string was an opcode 11,
; indicating that a release string is attached.

```
chk_for_release
        movfw op_code           ; get terminal opcode
chk_for_cmmn
        xorlw 03h               ; 0 if it is opcode 3 or opchar 3
        return
```

© 1993 Thrustmaster, Inc.

; READ_THROTTLE reads the throttle input. Just sets it up and jumps into
; read_adc.

```
read_throttle
        movlw throttle_adc_id      ; get throttle id for adc read
        goto read_adc
```

; READ_HAT reads the hat switch input. Just sets it up and falls into
; read_adc.

```
read_hat
        movlw hat_adc_id           ; get hat id for adc read
```

; READ_ADC reads the analog digital input specified by the w register.
; on entry, the w register holds the address of ch0, ch1, ch2, ch3.
; the result is returned in adc_result.

```
read_adc
        iorlw 0c1h                 ; internal rc adc clk, channel,adon
        movwf adcon_0              ;
        movlw .25                  ; wait for sample/hold amplifier delay
        movwf adc_result           ; use adc_result as temp register
read_adc1
        decfsz adc_result,f        ;
        goto read_adc1             ;
        bsf adcon_0,go             ; convert it
        nop                        ; delay
        nop                        ; delay
read_adc2
        btfsc adcon_0,go           ; if still go, loop
```

© 1993 Thrustmaster, Inc.

```
        goto read_adc2              ;
        retlw 0                     ; conversion result now in adc_result
```

```
; GET_BUTTONS reads the buttons once per loop. On exit, the inbyte_1 and
; inbyte_2 registers have been set with the current state of the inputs
; and the delta_1 and delta_2 registers have the change information in
; them. The analog_mode flag will be set if analog throttle if the base
; switch is in the analog position and the calibrate_mode flag will be
; set if it is in the calibrate position.

get_buttons
        movlw  b'00000111'        ; set port b i/o status, k_clk, k_data,
        tris port_b               ;  g2_sense are input, others are out
        clrf temp_2               ; 0 the address counter
getb_2
        clrc                      ; clear carry
        movfw temp_2              ; get counter contents
        movwf temp_1              ; save
        rlf temp_1,f              ; move to address positions
        rlf temp_1,f              ;
        rlf temp_1,w              ; end up with address in w
        movwf port_b              ; set address on port
        bsf port_b,sel_g1         ; turn off group 1
        bsf port_b,sel_g2         ; turn off group 2
        bcf port_b,sel_g1         ; turn on group 1
        clrc                      ; assume input is open
        btfss port_a,sw_g1        ; if input is 1, you're right
        setc                      ; otherwise, say closed
        rrf inbyte_1,f            ; put put it into group 1 holding reg
        bsf port_b,sel_g1         ; turn off group 1
        bcf port_b,sel_g2         ; turn on group 2
        clrc                      ; assume it's open
        btfss port_b,sw_g2        ; bit set, you're right
```

© 1993 Thrustmaster, Inc.

```
        setc                    ; say closed
        rrf inbyte_2,f          ; put in group 2 holding reg
        bsf port_b,sel_g2       ; turn off group 2
        incf temp_2,f           ; update address counter
        movlw 8                 ; is it 8 yet?
        subwf temp_2,w          ;
        skpz                    ; if so, done
        goto getb_2             ; otherwise, loop ; SET_MODE sets up the mode control bits based on position of the base
;   rocker swtich. Note that the calibrate and analog base mode input
;   contacts are inverted from the states of the other buttons due to
;   the hardware configuration.

set_mode bcf wcs_flags1,calibrate_mode   ; clear calibrate mode
        btfss inbyte_2,7                ; check calibrate mode
        bsf wcs_flags1,calibrate_mode   ; set calibrate mode
        bcf wcs_flags1,analog_mode      ; clear analog mode
        btfss inbyte_2,6                ; check analog mode
        bsf wcs_flags1,analog_mode      ; set analog mode move_rkr
        bcf inbyte_1,rkr_dn             ; clear cam bit in inbyte_1
        btfsc inbyte_2,4                ; move rkr dn input
        bsf inbyte_1,rkr_dn
clear_hat_bits
        movlw 00fh                      ; mask off non-hat bits
        andwf inbyte_2,f                ; kill hat bits in inbyte_2
```

© 1993 Thrustmaster, Inc.         10

; DO_HAT reads the hat and sets the appropriate bit in inbyte_2 to correspond
; to the current hat state. If the hat is centered, no bits are set. The
; results are HC < 100 < HL < 125 < HD < 160 < HR < 206 < HU.

```
do_hat
        call read_hat           ; read the hat switch
        movlw 4                 ; initialize hat counter
        movwf temp_1            ; set hat position counter
hat_lp
        movfw temp_1            ; get current hat count
        call get_hat_level      ; get level
        subwf adc_result,w      ; set carry if adc_result > test value
        skpc                    ;
        goto hat_end            ; so you've got it
        decfsz temp_1,f         ; otherwise decrement the hat counter
        goto hat_lp             ; and loop for next
hat_end
        movfw temp_1            ; recall current hat counter
        call get_hat_mask       ; get correct mask for hat position
        iorwf inbyte_2,f        ; or with rest of inputs
```

; SET_DELTAS sets the delta bit registers after the new inputs are generated.
; Because of the action of get_next_button, on entry the delta registers
; contain the previous button state values.

; ENABLE FOR TEST
;       call read_bttns         ; DEBUG ONLY

© 1993 Thrustmaster, Inc.

```
set_deltas:
        movfw inbyte_1          ; get first input byte
        xorwf delta_1,f         ; xor w/previous, set delta reg 1
        andwf delta_1,w         ; delta and on
        xorwf tt_flags_1,f      ; toggles toggle bit
        movfw inbyte_2          ; get second input byte
        xorwf delta_2,f         ; xor w/previous, set delta reg 2
        andwf delta_2,w         ; delta and on
        xorwf tt_flags_2,f      ; toggles toggle bit
set_umd_flags
        clrf adc_result         ; use adc result for temp flags
        btfsc inbyte_1,rkr_dn   ; won't need adc 'til throttle(last)
        bsf adc_result,rkr_dn   ; since MT codes have no umds
        btfsc inbyte_2,rkr_up   ; used in locate umd because the
        bsf adc_result,rkr_up   ; real inputs rotate
        return ; GET_NEXT_BUTTON does a 32-bit rotate of the current input states and
;   current delta values. It is called 16 times per scan by the button
;   processor.

get_next_button
        rlf inbyte_1,f          ; rotate first input to carry
        rlf inbyte_2,f          ; into second input, second to carry
        rlf delta_1,f           ; into first deltas, first to carry
        rlf delta_2,f           ; into second delta
rotate_tt
        bcf status,carry        ; clear the carry
        rlf tt_flags_1,f        ; rotate low to carry
```

© 1993 Thrustmaster, Inc.

```
rlf tt_flags_2,f        ; rotate carry to high
skpnc
bsf tt_flags_1,0
return
```

; Case statements used by various routines

; DO_SPECIAL sorts out opcodes 0..7 for the main loop

```
do_special
        movfw char_code             ; get special code
        addwf pcl,f                 ; indirect jump
        goto end_pgm                ; end of user program
        goto end_and_rotate         ; null button - do nothing
        goto locate_umd             ; find correct umd string
        goto locate_tt              ; find correct toggle string
        goto throttle               ; throttle type 1
        goto throttle               ; throttle type 2
        goto btn_hm                 ; btn hm code
        goto end_pgm                ; not defined
```

; GET_HAT_LEVEL is the look up for the hat switch ADC comparison values.

```
get_hat_level
        addwf pcl,f
        retlw 000h                  ; place holder
        retlw 0d2h                  ; is it right?
        retlw 0a0h                  ; is it down?
        retlw 07dh                  ; is it left?
        retlw 064h                  ; is it neutral?
```

; GET_HAT_MASK is the look up for the current hat position bit.

get_hat_mask

```
        addwf pcl,f
        retlw 080h              ; its up
        retlw 040h              ; its right
        retlw 020h              ; its down
        retlw 010h              ; its left
        retlw 000h              ; its neutral
```

; GET_NEW_STEP returns the new throttle step for zones 2 and 4, 0 otherwise

```
get_new_step
        addwf pcl,f
        retlw 0                 ; no step in zone 0
        retlw 0                 ; no step in zone 1
        goto z2_step            ; set throttle step in zone 2
        retlw 0                 ; no step in zone 3
        goto z4_step            ; set ab step in zone 4
```

; T_TYPE_1 vectors based on the last throttle state. It jumps into
; the t1_xx tables to handle the transition to the new throttle state.

```
t_type_1
        movfw old_throttle_zone
        addwf pcl,f             ; offset
        goto t1_0x
        goto t1_1x
        goto t1_2x
        goto t1_3x
        goto t1_4x
t1_0x
```

```
        movfw new_throttle_zone
        addwf pcl,f              ; offset
        goto t1_00
        goto t1_01
        goto t1_02
        goto t1_03
        goto t1_04
t1_1x
        movfw new_throttle_zone
        addwf pcl,f              ; offset
        goto t1_10
        goto t1_11
        goto t1_12
        goto t1_13
        goto t1_14
t1_2x
        movfw new_throttle_zone
        addwf pcl,f              ; offset
        goto t1_20
        goto t1_21
        goto t1_22
        goto t1_23
        goto t1_24
t1_3x
        movfw new_throttle_zone
        addwf pcl,f              ; offset
        goto t1_30
        goto t1_31
        goto t1_32
        goto t1_33
```

```
        goto t1_34
t1_4x
        movfw new_throttle_zone
        addwf pcl,f             ; offset
        goto t1_40
        goto t1_41
        goto t1_42
        goto t1_43
        goto t1_44

; T_TYPE_2 vectors based on the last throttle state. It jumps into
;   the t2_xx tables to handle the transition to the new throttle state.

t_type_2
        movfw old_throttle_zone
        addwf pcl,f             ; offset
        goto t2_0x
        goto t2_1x
        goto t2_2x
        goto t2_3x
        goto t2_4x
t2_0x
        movfw new_throttle_zone
        addwf pcl,f             ; offset
        goto t2_00
        goto t2_01
        goto t2_02
        goto t2_03
        goto t2_04
t2_1x
```

© 1993 Thrustmaster, Inc.

```
        movfw new_throttle_zone
        addwf pcl,f              ; offset
        goto t2_10
        goto t2_11
        goto t2_12
        goto t2_13
        goto t2_14
t2_2x
        movfw new_throttle_zone
        addwf pcl,f              ; offset
        goto t2_20
        goto t2_21
        goto t2_22
        goto t2_23
        goto t2_24
t2_3x
        movfw new_throttle_zone
        addwf pcl,f              ; offset
        goto t2_30
        goto t2_31
        goto t2_32
        goto t2_33
        goto t2_34
t2_4x
        movfw new_throttle_zone
        addwf pcl,f              ; offset
        goto t2_40
        goto t2_41
        goto t2_42
        goto t2_43
```

```
        goto t2_44

; SEND_TSTRING handles the special code for mt press and mt release send_tstring
        movfw op_code
        addwf pcl,f
        goto recall_send
        goto snd_str_1
        goto recall_rptg
        return
```

© 1993 Thrustmaster, Inc.

; SEND_STRING sends the string at IP to the keyboard.

```
send_string
        call chk_code_01        ; see if its a continue code
        skpz                    ; if so, run string
        goto one_char                   ; otherwise, single char, send it
snd_str_1
        movlw 007h              ; is it character #7?
        xorwf char_code,w       ;   used for RKR no repeat
        skpz                    ; don't send it if it is
        call recall_send        ; get char code and send it
snd_str_2
        call fetch_next                 ; get next char
        call chk_code_01        ; is it continue
        skpnz                   ; no, send it and quit
        goto snd_str_1                  ; yes, send it and fetch
        goto recall_send        ; send it chk_code_01
        movfw op_code           ; get op code
        xorlw 01h               ; zero if code 01
        return
```

; BTN_HM handles the special case for the hat center position

```
btn_hm
        comf inbyte_2,w         ; get inverted hat states
        andwf delta_2,w                 ; and with changes (any hat open up?)
        andlw 0f0h              ; mask other buttons
        skpz                    ; if none opened, skip the string
```

© 1993 Thrustmaster, Inc.        20

```
        goto snd_hm              ; otherwise, send the hm string
        call step_and_skip       ; skip the hm string
        goto scan_lp             ; back for next
snd_hm
        call snd_str_2           ; send the hm string
        goto scan_lp             ; back for next
```

; ONE_CHAR sends the current char, sets up repeat if press

```
one_char
        btfss inbyte_2,bttn_pressed    ; can repeat if press
        goto recall_send         ; send single char if not
        call recall_rptg         ; send the first repeating char
        movlw .250               ; do 200 millisecond additional delay
        goto ack_delay
```

; On entry, the character to be sent is in w. In all cases, it is the
; WCS character ID which is passed, not the actual scan code.

; SEND_CHAR sends a single complete character to the keyport.

```
recall_send
        movfw char_code          ; recall the character code
send_char
        call char_trans          ; translate and send make code
        goto tx_break            ; send the break code
```

; SEND_RPTG_CHAR sets up the repeating char logic. It also handles opcodes
; 10 and 11 for send_string.

© 1993 Thrustmaster, Inc.     21

```
recall_rptg
      btfsc wcs_flags1,is_repeating    ; is a char repeating?
      call tx_break            ; kill current char
no_rpt
      bsf wcs_flags1,is_repeating      ; set the repeating character flag
      movfw char_code
      goto ct_continue         ; translate and send make code ; CHAR_TRANS converts the WCS character code into the correct scan
;   and CTL, ALT, and SHF informtion.

char_trans
      btfss wcs_flags1,is_repeating    ; is one repeating
      goto ct_continue         ; send if not
      movwf temp_3             ; save new character
      call tx_break            ; break the current character
      bcf wcs_flags1,is_repeating      ; clear the repeater flag
      movfw temp_3             ; recall new char
ct_continue
      movwf current_char       ; save character
      movfw inst_ptr           ; save the IP
      movwf temp_3
      movlw 04h                ; point to NU - 1
      movwf inst_ptr           ;
      clrf temp_2              ; clear the char stat register
      goto ct_lp1
ct_lp
      incf temp_2,f            ; increment shift state
ct_lp1
```

© 1993 Thrustmaster, Inc.

```
        call read_next              ; get next max id
        subwf current_char,w        ; compare to char code
        skpnc                       ; went negative, done
        goto ct_lp                  ; loop back
set_flags
        movfw wcs_flags2            ; get flags
        andlw 0f8h                  ; mask
        iorwf temp_2,w              ; add new bits
        movwf wcs_flags2
        movlw 05h                   ; offset for char lookup
        addwf current_char,w        ; add char code
        movwf inst_ptr              ; set pointer for lookup
        call read_current           ; get the scan code
        movwf current_char          ; save the scan code
        movfw temp_3                ; recall previous IP
        movwf inst_ptr
```

; TX_MAKE sends the character in w to the pc. The character is already
; translated. Appropriate CTL, ALT, and SHF states are added

```
tx_make
        call shift_em               ; send the shift codes
resend_make
        movfw current_char          ; get scan code
;tx_m2
        goto tx_key                 ; send it
```

; TX_BREAK sends the character in current_char to the pc, preceded by a break
; code. The character is already translated and appropriate CTL, ALT, and © 1993 Thrustmaster, Inc.            23

; SHF codes will be applied.

```
tx_break
        movfw current_char              ; get current scan code
        call tx_key_wb                  ;
unshift_em
        bsf wcs_flags1,key_released     ; flag released for unshift
        goto se_2
shift_em
        bcf wcs_flags1,key_released     ; flag pressed for shift
se_2
        btfsc wcs_flags2,shf_down       ; if the shift flag is set
        call send_shift                 ; send the shift
        btfsc wcs_flags2,alt_down; if the alt flag is set
        call send_alt                   ; send the alt
        btfss wcs_flags2,ctl_down; if the ctl flag is set
        return                          ; send the ctl
send_ctl
        movlw ctl_key                   ; get the ctl code and
        goto send_code                  ; get it
send_alt
        movlw alt_key                   ; send the alt
        goto send_code
send_shift
        movlw shf_key                   ; send the shift
send_code
        btfss wcs_flags1,key_released   ; if release, go do break
        goto tx_key                     ; else send make, do delay, return
tx_key_wb
        movwf temp_4                    ; save the character code
```

© 1993 Thrustmaster, Inc.     24

```
bk_temp_4
        movlw break                     ; get a break character
        bsf op_code,no_delay            ; flag for no char delay
        call tx_key                     ; send it
        bcf op_code,no_delay            ; clear it right away
        movlw .50                       ; delay
tx_w_dly
        call tx_delay
        movfw temp_4                    ; recall the char, fall thru to send
        goto tx_key
```

; DO_RPTG_CHAR sends another occurrence of a repeating char if one is active.

```
do_rptg_char
        btfss wcs_flags1,is_repeating   ; exit if char not repeating
        return
        goto resend_make                ; already translated, send it again
```

; CHECK_SUM is called from machine reset to determine if the program is
; valid. It simply adds the 4th thru 127th bytes of EEProm and compares
; that to the checksum byte sent when the program was downloaded. Returns
; zero if they match, non-zero if not.

```
check_sum
        clrf check_sum_temp        ; clear the checksum accumulator
;       movlw .124                 ; set byte count (first version)
        movlw .252                 ; set byte count
        movwf temp_1               ;
        movlw 003h                 ; point to program - 1
        movwf inst_ptr
cs_lp
        call read_next             ; get next program byte
        addwf check_sum_temp,f     ; add to running sum
        decfsz temp_1              ; loop thru whole program
        goto cs_lp
comp_cs
        clrf inst_ptr              ; get program checksum
        call read_current          ;
        xorwf check_sum_temp,w     ; compare to current, should be 0
        return
```

© 1993 Thrustmaster, Inc.

; DOWNLOAD handles program downloading and throttle calibration for the WCS.

```
download
        bsf wcs_flags2,dl_mode          ; flag for others
        bcf k_con_port,k_con            ; set 4066s to off
        call send_enter                 ; send an enter key to start dl
dl_2
        call get_buttons                ; check if still in calibrate mode
        btfss wcs_flags1,calibrate_mode ;
        goto exit_dl                    ; else stop download, restart WCS
get_dl_cmd
        call rx_byte                    ; get next byte, returns 0 if failed
        xorlw cal_cmd                   ; is it calibrate
        skpnz
        goto calibrate                  ; go do calibrate loop
        xorlw dl_cmd                    ; is it a download
        skpz
        goto dl_2                       ; done if not
```

; DO_DNLD is the actual downloading logic

```
do_dnld
;       movlw .124                      ; number of bytes to get (old version)
        movlw .252                      ; number of bytes to get
        movwf dl_bytes                  ; save count
        clrf inst_ptr                   ; point to calibration values
        call read_next                  ; get idle detent value, will rewrite
        movwf cal_temp                  ; save it
        call rx_byte                    ; get checksum value
```

© 1993 Thrustmaster, Inc.

```
        skpnc
        goto dl_2               ; bad read, exit
        call write_first        ; save it
        movfw cal_temp          ; recall id value
        call write_next         ; put it back
        incf inst_ptr           ; skip rest of cal data
dl_lp
        call rx_byte            ; get next, chk bttns, cy set if err
        skpnc
        goto dl_2               ; bad read, exit
        call write_next         ; put it in the eeprom
dl_x
        decfsz dl_bytes,f       ; count out bytes
        goto dl_lp              ; loop for next byte
        goto dl_2               ; done, back to top ; EXIT_DL sets things back to normal and does a software reset exit_dl
        bcf wcs_flags2,dl_mode  ; clear the download mode
        call send_enter         ; send an enter
        goto init_2             ; restart program after push point ; CALIBRATE is the routine which calibrates the throttle handle on the
;   WCS. Order is Min, ID, ABD, Max.

calibrate
        movlw 04h               ; set loop count
        movwf cal_lp_ctr        ; save in counter
        clrf inst_ptr           ; point to cal data
```

© 1993 Thrustmaster, Inc.

```
        call read_current       ; get the checksum
        call write_first        ; setup checksum for rewrite
        call wait_n_enter       ; throttle back wait
        goto cl_2
cal_lp
        call read_throttle      ; adc read the throttle input
        movfw adc_result        ; get throttle value
        call write_next             ; put in eeprom
cl_2
        call wait_n_enter       ; wait til user presses button 1
        decfsz cal_lp_ctr,f     ; decrement loop counter
        goto cal_lp             ; back for more
        goto dl_2               ; back to download loop ; RX_BYTE gets four bytes from the keyport and combines them to form
;   a single byte.

rx_byte
        movlw 04h               ; set loop count (cal and dnld use it)
        movwf cal_lp_ctr        ; save in counter
        clrf rx_temp            ; clear the temporary register
rb_lp
        call rx_key             ; get ed command
        skpnc                   ; if no carry, finish command
        return                      ; else quit with error
        call send_ack               ; send the fa byte
        call rx_key             ; get data bits
        andlw 3                     ; kill all but lo 2 bits
        rlf rx_temp,f           ; push bits left 2
        rlf rx_temp,f           ;
```

© 1993 Thrustmaster, Inc.       29

```
        iorwf rx_temp,f              ; add in next 2
        call send_ack                ; send the fa byte
        decfsz cal_lp_ctr            ; loop 4 times
        goto rb_lp                   ; loop for next
        movfw rx_temp                ; recall byte
        bcf status,carry             ; make sure carry is clear
        return
```

; SEND_ACK transmits an ackowledge byte FAh to the keyport

```
send_ack
        bsf op_code,no_delay         ; check for no delay
        movlw ack_code               ; get the fa code
        movwf temp_4                 ; save for delayed xmit
        call tx_w_dly                ; delay 750 us then send the byte
        bcf op_code,no_delay         ; set up delay again
        return
```

; WAIT_N_ENTER waits for button 1, then sends an enter

```
wait_n_enter
        call wait_button_1           ; wait for button press
```

; SEND_ENTER sends an 'enter' key to the system.

```
send_enter
        movlw enter_key              ; get enter key
        movwf temp_4                 ; set up for transmit
        call tx_key                  ; send it, char delay active
        goto bk_temp_4               ; send temp_4 with break
```

© 1993 Thrustmaster, Inc.        30

© 1993 Thrustmaster, Inc.

; READ_NEXT increments the IP and reads that byte in the eeprom. The
; inst_ptr can be preset to any byte address, 0..128. It is designed
; to provide sequential reading of the eeprom during the fetch of
; the user program.

```
read_next
        incf inst_ptr,f            ; increment instruction pointer
read_current
        rrf inst_ptr,w             ; divide by 2
        andlw 07fh                 ; ensure valid eprom address
        clrf ee_cmd                ; clear the ee command reg
        bsf ee_cmd,6               ; set the read command bit
        call ee_rw                 ; read the byte at ip, byte in opcode
        movfw ee_low_b             ; presume low byte
        btfsc inst_ptr,0           ; if address was odd, get lo if not
        movfw ee_high_b            ; otherwise, get high byte
        return                     ; and quit
```

; WRITE_NEXT writes the byte in w to the next ee location. It buffers
; the first byte that comes along. The second byte triggers the
; actual write. Then it increments the pointer for next time. Falls
; into ee_write. The inst_ptr is treated as a word pointer, different
; from read_next which counts bytes. It is designed to write sequentially
; to the eeprom during download and calibration.

```
write_first
      bcf wcs_flags2,ee_byte_2   ; ensure odd first write to eeprom
        clrf inst_ptr              ; point to first byte
write_next
        btfsc wcs_flags2,ee_byte_2  ; is it second byte?
```

© 1993 Thrustmaster, Inc.         32

```
        goto send_2nd            ; yes
send_1st
        bsf wcs_flags2,ee_byte_2 ; set second byte flag
        movwf ee_temp            ; put byte in low half
        return                   ; and quit send_2nd
        movwf ee_high_b          ; put in ee high byte
        movfw ee_temp            ; recall first byte
        movwf ee_low_b           ; set it up for storage
        bcf wcs_flags2,ee_byte_2 ; clear second byte flag
        movlw ee_wr_en_cmd       ; do eeprom write enable
        clrf ee_cmd              ; clear the command to 0
        call ee_rw               ; send the write enable command
        movfw inst_ptr           ; get address
        incf inst_ptr,f          ; update the pointer
        andlw 07fh               ; ensure valid address
wr_word
        bsf ee_cmd,5             ; set the write bit
        call ee_rw               ; write the two bytes
ready_chk
        clrf ee_cnthi            ; check ready before write disable
        clrf ee_cnt              ;
        call ee_dsel             ; de-select the 93c46.
        call ee_sel              ; re-select the 93c46.
not_ready
        btfsc ee_port,ee_dout    ; if do is a '0', 93c46 still busy
        goto ee_wr_disable       ; otherwise its ready
        decfsz ee_cnt,f          ; decrement ready timer
        goto not_ready           ; try again.
```

© 1993 Thrustmaster, Inc.          33

```
        decfsz ee_cnthi,f        ; lsb done - decrement msb
        goto not_ready           ; try again.
ee_wr_disable
        clrf ee_cmd              ; clear the ee command again
        movlw ee_wr_dis_cmd      ; do eeprom write disable
```

; EE_RW accesses the EEProm for command, read and write operations. On entry,
; the w register contains the address in the lower six bits and the command
; in the upper 2 bits. The data must be in ee_low_b and ee_high_b for a
; write. A read will return the data in those same locations.

```
ee_rw
        movwf ee_addr            ; save the address
        movlw ee_cmd             ; load w with loc of cmd reg
        movwf fsr                ; fsr > ee_cmd
        call ee_sel              ; select the 93c46.
        bsf ee_cmd,7             ; set up the start bit
        call dout_3              ; send command
        call dout_8              ; inc fsr, send addr
        btfsc ee_cmd,1           ; set if read, rotated during command
        goto ee_rd               ; bit was set, do read
        btfsc ee_cmd,0           ; set if write, rotated during command
        call ee_wr               ; so write it
        goto ee_dsel             ; must be enable/disable, just desel
```

; EE_RD reads a word from the eeprom and puts it in ee_low_b and ee_high_b
; Don't combine two din_8s into a din_16. The stack will crash.

© 1993 Thrustmaster, Inc.          34 ee_rd
    call din_8 ; input the first 8 bits
    call din_8 ; input the second 8 bits ; EE_DSEL deselects the 93cx6 device.

ee_dsel
    bcf ee_cs_port,ee_cs ; chip select (cs) = '0' to de-select
    movlw b'00000111' ; set standard port b configuration
    tris ee_port ;
    return ; EE_SEL selects the 93cx6 device.

ee_sel
    movlw b'00000111' ; force bits high
    movwf ee_port ;
    movlw b'00100111' ; enable eeprom data in as input
    tris ee_port
    bsf ee_cs_port,ee_cs ; chip select (cs) = '1' to select
    return ; CLOK_IT clocks an ee_port data bit into or out of the device clok_it
    bsf ee_port,ee_clk ; clock (clk) = '1'.
    nop ; ee_clk pulse width delay
    bcf ee_port,ee_clk ; clock (clk) = '0'.
    return © 1993 Thrustmaster, Inc.

; EE_WR will output 16 bits of data to the 93c46. before calling this routine,
;   the fsr must point to the word being transmitted.

dout_3

```
; INIT is the entry after machine reset to skip case tables in page 0 init
        movlw b'00001011'         ; initialize port a
        tris port_a               ;
        movlw b'00000111'         ; initialize port b was 011
        tris port_b
        bsf k_con_port,k_con      ; set 4066's to on
;       movlw b'00000111'         ; initialize port b
;       tris port_b
        clrwdt                    ; kill the wdt, set prescaler to rtcc
        movlw b'00000101'         ; rtcc internal, lo->hi, prescale=64
        option
        bsf status,rp0            ; switch to page 1
        movlw b'00000010'         ; set adc control register
        movwf adcon               ;
        bcf status,rp0            ; switch to page 0
        bcf ee_cs_port,ee_cs      ; disable eeprom
        call init_vars            ; zero the ram
        call wait_button_1        ; wait til user presses button 1
init_2
        bsf k_data_port,k_data    ; setu keyboard data and clock line
        bsf k_clk_port,k_clk
        bsf k_con_port,k_con      ; set 4066's to on
        call init_vars            ; clear the ram again
check_sum_lp
        call get_buttons          ; read the buttons
        btfsc wcs_flags1,calibrate_mode ; check if download requested
        goto download             ; do the download routine
        call check_sum            ; get program checksum
```

© 1993 Thrustmaster, Inc.

```
        skpnz                   ; if zero
        goto main_lp            ; goto main
        goto check_sum_lp       ; else loop 'til it is ; INIT_VARS clears all chip ram from location 00ch thru 02fh to 0 init_vars
        movlw 00dh              ; point to first non-pic location
        movwf fsr               ; set the file select pointer
        movlw 023h              ; number to clear
        movwf wcs_flags1        ; use adc result reg for count
iv_lp
        clrf indirect           ; clear the byte
        incf fsr,f              ; update the pointer
        decfsz wcs_flags1,f     ; decrement loop counter
        goto iv_lp              ; repeat 'til 0
        return ; WAIT_BUTTON_1 is used at startup and during calibrate.

wait_button_1
;       return                  ; DEBUG ONLY
        call get_buttons        ; read the buttons
        btfss inbyte_1,wcs_1    ; is the button closed?
        goto wait_button_1      ; wait 'til it is
wait_open
        call get_buttons        ; read the buttons
        btfsc inbyte_1,wcs_1    ; is the button open?
        goto wait_open          ; wait 'til it is
        return
```

© 1993 Thrustmaster, Inc.   38

```
        movlw 03h               ; start and command bits
        goto dout_cmmn          ; send the 3 bits
ee_wr
        call dout_8             ; move first 8 bits
dout_8
        incf fsr,f              ; update the pointer
dout_8a
        movlw 08h               ; initialize loop counter.
dout_cmmn
        movwf temp_4            ;
d_o_8
        bcf ee_port,ee_din      ; assume bit is 0
        rlf indirect,f          ; rotate the actual bit into carry
        skpnc                   ; if it's 0, you're right
        bsf ee_port,ee_din      ; otherwise, say 1
        call clok_it            ; clock the 93c46
        decfsz temp_4,f         ; repeat until cnt = 0
        goto d_o_8              ; cnt still > 0
        rlf indirect,f          ; restore reg to original condition.
        return                  ; exit with good status.
```

; DIN_8 will input 8 bits of data from the 93c46. before calling this routine,
;   the fsr must point to the register being used to hold the incomming data.

```
din_8
        incf fsr,f
        movlw 008h              ; initialize loop counter.
        movwf temp_4            ;
d_i_8
```

© 1993 Thrustmaster, Inc.        40

```
call clok_it           ; clock a bit out of the 93c46.
rlf indirect,f         ; make room for incoming bit
bcf indirect,0         ; assume it's a '0'
btfsc ee_port,ee_dout  ; if you're wrong
bsf indirect,0         ; set it to a '1'
decfsz temp_4,f        ; repeat until cnt = 0.
goto d_i_8             ; cnt still > 0
return                 ; exit
```

```
; INIT is the entry after machine reset to skip case tables in page 0 init
        movlw b'00001011'           ; initialize port a
        tris port_a                 ;
        movlw b'00000111'           ; initialize port b was 011
        tris port_b
        bsf k_con_port,k_con        ; set 4066's to on
;       movlw b'00000111'           ; initialize port b
;       tris port_b
        clrwdt                      ; kill the wdt, set prescaler to rtcc
        movlw  b'00000101'          ; rtcc internal, lo->hi, prescale=64
        option
        bsf status,rp0              ; switch to page 1
        movlw b'00000010'           ; set adc control register
        movwf adcon                 ;
        bcf status,rp0              ; switch to page 0
        bcf ee_cs_port,ee_cs        ; disable eeprom
        call init_vars              ; zero the ram
        call wait_button_1          ; wait til user presses button 1
init_2
        bsf k_data_port,k_data      ; setu keyboard data and clock line
        bsf k_clk_port,k_clk
        bsf k_con_port,k_con        ; set 4066's to on
        call init_vars              ; clear the ram again
check_sum_lp
        call get_buttons            ; read the buttons
        btfsc wcs_flags1,calibrate_mode ; check if download requested
        goto download               ; do the download routine
        call check_sum              ; get program checksum
```

© 1993 Thrustmaster, Inc.

```
        skpnz                   ; if zero
        goto main_lp            ; goto main
        goto check_sum_lp       ; else loop 'til it is
```

; INIT_VARS clears all chip ram from location 00ch thru 02fh to 0

```
init_vars
        movlw 00dh              ; point to first non-pic location
        movwf fsr               ; set the file select pointer
        movlw 023h              ; number to clear
        movwf wcs_flags1        ; use adc result reg for count
iv_lp
        clrf indirect           ; clear the byte
        incf fsr,f              ; update the pointer
        decfsz wcs_flags1,f     ; decrement loop counter
        goto iv_lp              ; repeat 'til 0
        return
```

; WAIT_BUTTON_1 is used at startup and during calibrate.

```
wait_button_1
;       return                  ; DEBUG ONLY
        call get_buttons        ; read the buttons
        btfss inbyte_1,wcs_1    ; is the button closed?
        goto wait_button_1      ; wait 'til it is
wait_open
        call get_buttons        ; read the buttons
        btfsc inbyte_1,wcs_1    ; is the button open?
        goto wait_open          ; wait 'til it is
        return
```

© 1993 Thrustmaster, Inc.   43

© 1993 Thrustmaster, Inc.

; RX_KEY is the keyboard receiver entry point. It waits for a key from
;   the PC, reads it, and returns the key in w.

```
rx_key
        call get_buttons            ; check to see if still in cal mode
        movfw inbyte_1              ; get first byte
        andwf delta_1,w             ; and with changes
        andlw 070h                  ; mask b1, b2, b3
        skpnz                       ; see if any pressed
        goto rx_key2
        bsf status,carry            ; return carry to abort
        retlw 0                     ; return a zero
rx_key2
        btfss k_clk_port,k_clk      ; wait 'til clock bit is hi
        goto rx_key                 ;
        btfsc k_data_port,k_data    ; wait for start bit low
        goto rx_key                 ;
        movlw .50                   ; delay
        call tx_delay               ;
rx_get_byte
        bsf k_clk_port,k_clk        ; preset to 1 before enabling output
        bsf k_data_port,k_data      ;
        movlw b'00000110'           ; enable k_clk for output
        tris port_b                 ;
        movlw .9                    ; get 8 bits + parity
        movwf tx_rx_ctr             ;
        call wait40
rx_bit_loop
        clrc                        ; carry will be loaded with data bit
        call clock                  ; clock the data
```

© 1993 Thrustmaster, Inc.    45

```
        btfsc k_data_port,k_data  ; read data from system
        bsf status,carry          ; set carry if cpu bit high
        rrf rx_data,f             ; and shift it in
        decfsz tx_rx_ctr,f        ; received all bits?
        goto rx_bit_loop          ;
rx_ack
        rlf rx_data,f             ; align data word, parity now in carry
        call clock                ; clock in the stop bit
        movlw b'00000100'         ; enable k_clk and k_data for output
        tris port_b               ;
        bcf k_data_port,k_data    ; set data to acknowledge
        call clock                ; clock in the acknowledge bit
        bsf k_data_port,k_data    ; set data high
rx_end
        movlw b'00000111'         ; set data port to input
        tris port_b
        movfw rx_data             ; get recieved character
        bcf status,carry          ; clear carry for no error
        return                    ;

; CLOCK generates a receive clock signal. Signal is wait 20, drop clock line,
;   wait 40, raise clock line, wait 20.

clock
        call wait20               ; delay 20 us
        bcf k_clk_port,k_clk      ; set the clock low
        call wait40               ; delay 40 us
        bsf k_clk_port,k_clk      ; set the clock high
        goto wait20
wait40
```

© 1993 Thrustmaster, Inc.     46

```
        call wait20          ; delay 20 us
wait20
        movlw delay20us      ; delay 20 us
        goto tx_delay        ; return in timer code
```

```
; THROTTLE is the common set-up code for both throttle types. It sets
; up the tcb, new step, and new zone variables.

throttle
        bsf wcs_flags1,scan_done    ; end of scan, throttle is last
        btfsc wcs_flags1,analog_mode   ; skip throttle if in analog mode
        goto end_throttle
        call gen_tcb                ; set up the throttle limit vals
        call read_throttle          ; read the throttle adc value
range_throttle
        movfw thr_max               ; get max throttle value
        subwf adc_result,w          ; sub from new read
        skpc                        ; carry if new > max
        goto set_throttle_dir
force_max
        movfw thr_max               ; recall max throttle
        movwf adc_result            ; force new read to max
set_throttle_dir
        movfw old_throttle_val      ; recall previous
        subwf adc_result,w          ; sub current from previous
        skpnc                       ; if negative, turn it around
        goto chk_move               ; positive, it's ok
        sublw 0                     ; make it positive
chk_move
        andlw 0fch                  ; did it move by 4?
        skpnz                       ; yes, keep going
        goto end_throttle           ; done if not
        movfw adc_result            ; get new throttle value
        movwf old_throttle_val      ; save for next time
        call get_throttle_zone      ; set new throttle zone, delta_z, flag
```

© 1993 Thrustmaster, Inc.

```
        call get_throttle_step          ; set new step

; At this point, the new_throttle_zone, new_throttle_step, and delta_zone
; variable have been set, as well as the max, min, window limit, n_throttle,
; and n_ab steps. The IP points to the mt release string, the opcode still
; has the throttle type in it.

set_type_flag
        bcf wcs_flags1,is_type_2    ; pre_clear, assume type 1
        btfsc char_code,0           ; is 4 or 5, bit 0 = type 2
        bsf wcs_flags1,is_type_2
        btfss wcs_flags2,mt_released    ; chk if need to send press code
        goto do_t do_mt_rel
        call loc_pr                 ; set pointer to pr string
        call do_mt_release          ; skip the press string
do_t
        call sel_throttle           ; do correct throttle type
do_mt_pr
        btfss wcs_flags2,mt_pressed ; check if need press
        goto update_zone
        call loc_pr
        call do_mt_press
update_zone
        movfw new_throttle_zone     ; update old throttle zone
        movwf old_throttle_zone     ;
end_throttle
        goto end_scan               ; back into scan loop
```

© 1993 Thrustmaster, Inc.          49

; SEL_THROTTLE selects the correct throttle handler and jumps to it. Used
; so throttle can do a return

```
sel_throttle
        btfss wcs_flags1,is_type_2        ; is 4 or 5, bit 0 = type 2
        goto t_type_1
        goto t_type_2
```

; GEN_TCB generates the Throttle Control Block for use by the throttle
; routines. The Throttle Control Block contains stored and derived data
; in the following format:

;   0 - n_throttle
;   1 - n_ab
;   2 - minimum throttle value
;   3 - lower idle detent window value, top of zone 4
;   4 - upper idle detent window value, top of zone 3
;   5 - lower ab detent window value, top of zone 2
;   6 - upper ab detent window value, top of zone 1
;   7 - maximum throttle value, top of zone 0

```
gen_tcb
        call read_next             ; get n_throttle
        movwf n_throttle           ; save it
        call read_next             ; get n_ab
        movwf n_ab                 ; save it
        call push_ip               ; save pointer to first throttle byte
        clrf inst_ptr              ; point to cal bytes - 1
        call read_next             ; get idle detent
        addlw 08h                  ; figure max
```

© 1993 Thrustmaster, Inc.

```
        movwf idw_max          ; and set it
        movwf idw_min          ; and set it
        movlw 10h
        subwf idw_min,f        ; drop min by 8
        call read_next         ; get ab detent value
        addlw 08h              ; figure max
        movwf abw_max          ; and set it
        movwf abw_min          ; and set it
        movlw 10h
        subwf abw_min,f        ; drop min by 8
        call read_next         ; get max throttle value
        movwf thr_max
        goto pop_ip            ; restore pointer and go back
```

; GET_THROTTLE_ZONE sets up the new_throttle_zone variable in chip ram.

; It sets the value between 0 and 5 as follows:

;   0 - above ab detent window
;   1 - in ab detent window
;   2 - between ab detent window and idle detent window
;   3 - in idle detent window
;   4 - below idle detent window

```
get_throttle_zone
        movlw idw_min          ; > lower idle detent window value
        movwf fsr              ; put in file select register
        movlw 4                ; set zone counter
        movwf new_throttle_zone
gtz_lp
```

© 1993 Thrustmaster, Inc.     51

```
        movfw indirect              ; get next check value
        addlw 1                     ; inrement to put set as max for zone
        subwf adc_result,w          ; subtract from adc result
        bnc end_gtz                 ; done if negative
gtz_1
        incf fsr,f                  ; increment for next value
        decfsz new_throttle_zone,f  ; decrement zone counter
        goto gtz_lp                 ; loop back if not zone 0
end_gtz
        movfw new_throttle_zone     ; change 4..0 to 0..4
        sublw 04h                   ; sub from 4
        movwf new_throttle_zone     ; put it back
chk_mt
        bcf wcs_flags2,mt_pressed   ; clear the mt pressed and release
        bcf wcs_flags2,mt_released  ;  flags
        skpnz                       ; is current zone 0?
        return                      ; new zone is 0, can't be released
        movfw old_throttle_zone     ; new zone not 0, is old zone 0?
        skpnz                       ; if not, it can't be a release
        bsf wcs_flags2,mt_released  ; it is, flag for release code
        return
```

; GET_THROTTLE_STEP sets the new_throttle_step variable to a value in the

; range 1..nsteps corresponding to the relative position of the throttle
; within the current zone.

; The ADC result register contains the current analog value read from the
; throttle. Variables adc_result, temp_1, temp_2, and temp_3 are modified
; by this subroutine.

© 1993 Thrustmaster, Inc.

```
get_throttle_step
        clrf new_throttle_step          ; zero it for zones 0 and 1
        movfw new_throttle_zone         ; recall zone for step determination
        goto get_new_step               ; do zone vector, back at z?_step
```

; TTYPE1 holds the logic for type 1 throttles.

; Type 1 zone handlers. There is one for each possible from/to zone
;   combination. Vectored from the throttle type 1 tables in page 0.

```
t1_00
t1_11
t1_33
t1_01
        return                      ; nothing
t1_02
        goto t1_2                   ; goto zone 2 setup
t1_03
t1_13
t1_23
        goto t1_max_throttle        ; go do maximum throttle
t1_04
        call t1_03                  ; send release, max the throttle
        goto t1_ab_on               ; send the ab on char
t1_32
        movfw n_throttle
        movwf old_throttle_step
t1_12
t1_22
        goto t1_2
t1_14
t1_24
        call t1_max_throttle
t1_34
        goto t1_ab_on
```

© 1993 Thrustmaster, Inc.   54

```
t1_40
      call t1_ab_off
t1_30
t1_20
      call t1_min_throttle
t1_10
      bsf wcs_flags2,mt_pressed
      return
t1_41
      call t1_ab_off
t1_21
t1_31
      goto t1_min_throttle
t1_42
      call t1_ab_off
      goto t1_2
t1_43
      goto t1_ab_off
t1_44
      goto t1_4
```

; Utility routines

; T1_MIN_THROTTLE sends throttle down characters to move the throttle to 0.
;   Must be in zone 3 or zone 2 first.

```
t1_min_throttle
      movlw 1                  ; point to throttle down char
      call t1_locate           ; set the IP
```

© 1993 Thrustmaster, Inc.       55

```
        movfw old_throttle_step     ; get current step
        clrf old_throttle_step      ; set old steps to 0
        goto move_throttle          ; finish in move
```

; T1_MAX_THROTTLE sends enough throttle up commands to max the throttle.
; Must be in zone 1 or zone 2 first.

```
t1_max_throttle
        call pop_ip                 ; set the IP to point to t_up char
        movfw old_throttle_step     ; get previous throttle step
        subwf n_throttle,w          ; subtract from max number
        call move_throttle          ; move the throttle
        movfw n_throttle            ; set old throttle to max
        movwf old_throttle_step
        return
```

; T1_AB_ON sends the ab on character, then jumps into the zone 4 handler. Moves
;   from zone 3 to zone 4.

```
t1_ab_on
        clrf old_throttle_step      ; set old step to 0
        movlw 2                     ; get offset to ab on character
        call t1_locate              ; position the IP
        call read_next              ; get the character
        call send_char              ; send the ab on character
        goto t1_4
```

; T1_AB_OFF moves the ab to step 0, then sends the ab off character. Moves

© 1993 Thrustmaster, Inc.        56

; from zone 4 to zone 3.

```
t1_ab_off
        movlw 05h              ; point to ab down char
        call t1_locate
        movfw old_throttle_step    ; get last throttle step
        call move_throttle     ; move throttle
        movfw n_throttle       ; get max throttle
        movwf old_throttle_step    ; set max steps for last throttle
        movlw 03h              ; get ab off character
        call t1_locate         ; position the IP
        call read_next         ; get the character
        goto send_char         ; and send it
```

; MOVE_THROTTLE takes care of throttle translation for type 1 throttles.
; On entry, w holds the number of characters to send, the IP points
; to the byte immediately before the character code

```
move_throttle
        movwf move_steps       ; save count
        movfw move_steps       ; set the zero flag
        skpnz                  ; if zero, nothing to send
        return
        call read_next         ; get character
        call char_trans        ; send first char
        goto td_2
td_1
        call resend_make       ; send another make code
td_2
        decfsz move_steps,f    ; loop til current step is 0
```

© 1993 Thrustmaster, Inc.     57

```
        goto td_1
        goto tx_break
```

; T1_LOC_PR sets the IP to point to the press/release strings for the
; mt handlers

```
t1_loc_pr
        movlw 06h            ; set pointer to release string
```

; T1_LOCATE sets the IP to point to particular byte in the type 1 throttle
; data. On entry, w holds the offset to the byte, with 0 being taken
; as the first byte following n_ab.

```
t1_locate
        movwf move_steps     ; save offset
        call pop_ip          ; recall base address
        movfw move_steps     ; recall offset
        addwf inst_ptr,f     ; point to desired byte
        return
```

; T1_2 moves the throttle around in zone 2.

```
t1_2
        call pop_ip          ; restore pointer
        goto t1_24_cmmn
```

; T!_4 moves the throttle around in zone 4.

```
t1_4
        movlw 04h            ; point to ab up char
```

© 1993 Thrustmaster, Inc.  58

```
        call t1_locate              ; move the IP
t1_24_cmmn
        call get_delta_step         ; sets delta_step, ts_decreased
        btfsc wcs_flags1,ts_decreased   ; check for step change
        incf inst_ptr,f
        goto move_throttle          ; go move the throttle in zone
```

; TTYPE2 holds the logic for type 2 throttles.

; Type 2 zone handlers. There is one for each possible from/to zone
;   combination. Vectored from the throttle type 2 tables in page 0.

```
t2_00
t2_11
t2_33
       return                          ; nothing t2_03
t2_13
t2_23
t2_43
       goto t2_max_throttle            ; go do maximum throttle t2_02
t2_12
t2_22
t2_32
t2_42
       goto t2_2 t2_04
t2_14
t2_24
t2_34
t2_44
       goto t2_4
```

```
t2_40
t2_30
t2_20
t2_10
        bsf wcs_flags2,mt_pressed
t2_01
t2_21
t2_31
t2_41
        goto t2_min_throttle
```

; Utility routines

; T2_MIN_THROTTLE sends the first of the throttle characters.

```
t2_min_throttle
        call pop_ip              ; point to first throttle char
        incf inst_ptr,f          ; adjust for read and send
        goto read_and_send
```

; T2_MAX_THROTTLE sends the last of the throttle chars.

```
t2_max_throttle
        call pop_ip              ; restore the ip
        movfw n_throttle         ; get max steps
        addwf inst_ptr,f         ; point to max throttle char
        goto read_and_send       ; read next and send it
```

; T2_2 sends the character when in zone 2.

```
t2_2
      call pop_ip              ; restore pointer
      goto t2_24_cmmn

; T2_4 sends the character when in zone 4.

t2_4
      call pop_ip              ; restore pointer
      movfw n_throttle         ; skip throttle characters
      addwf inst_ptr,f         ; update pointer
t2_24_cmmn
      movfw new_throttle_step  ; get new step
      addwf inst_ptr,f         ; skip to correct character
read_and_send
      call read_current        ; points to char, don't increment
chk_dups
      xorwf old_throttle_step,w ; check against last t char
      skpnz                    ; if the same
      return                   ;   then don't send it
      xorwf old_throttle_step,w ; restore new char code
      movwf old_throttle_step  ; save for next time
      goto send_char ; T2_LOC_PR sets the IP to point to the press/release strings for the
;   mt handlers t2_loc_pr
      call pop_ip              ; restore pointer
      movfw n_throttle         ; get number of throttle chars
      addwf n_ab,w             ; add the number of ab chars
```

© 1993 Thrustmaster, Inc.      62

```
        addwf inst_ptr,f          ; put offset in pointer
        return z2_step
        movlw idw_max             ; point to bottom of zone 2
        movwf fsr                 ; set pointer
        movfw n_throttle          ; get number of steps
        goto gts_cmmn
z3_step
        movfw n_throttle          ; get max throttle
        movwf new_throttle_step   ; put it away
        goto end_gts              ; and quit
z4_step
        movlw abw_max             ; point to bottom of zone 4
        movwf fsr                 ; set pointer
        movfw n_ab                ; get number of steps ; At this point, the FSR points into the throttle control block at the upper
;   idle detent window value for throttle steps and the upper ab detent window
; value for ab steps. Temp_1 holds the number of steps.

gts_cmmn
        movwf temp_1              ; put n_steps in temp 1
        clrf new_throttle_step    ; initialize new step counter to 1
        incf new_throttle_step,f  ; but save w contents
        movfw indirect            ; get low value for current zone
        subwf adc_result,f        ; correct adc result so zone is at 0
        incf fsr,f                ; point to hi value for current zone
        subwf indirect,w          ; generate delta for current zone
```

© 1993 Thrustmaster, Inc.

```
        incf fsr,f              ; point to number of steps for zone
        movwf temp_2            ; save delta value
        movwf temp_3            ; initialize running accumulator
gts_lp
        movfw temp_1            ; get n_steps
        subwf temp_3,f          ; subtract from running accumulator
        bc no_step_chg          ; if positive, same step
step_chg
        incf new_throttle_step,f ; increment new step register
        movfw temp_2            ; recall delta value
        addwf temp_3,f          ; add to running accumulator
no_step_chg
        decfsz adc_result,f     ; count the current read to 0
        goto gts_lp             ; loop again if not
end_gts
        return ; Utilities used by throttle handlers ; PUSH_IP and POP_IP save and restore the instruction pointer.

push_ip
        movfw inst_ptr          ; get instruction pointer
        movwf ip_hold           ; save i
        return pop_ip
        movfw ip_hold           ; get stored pointer
        movwf inst_ptr          ; put it back
        return
```

© 1993 Thrustmaster, Inc.

```
; GET_DELTA_STEP calculates the difference in step value between the old
; step and the new step and returns the absolute value of the difference
; in delta_step. It sets the ts_decreased flag appropriately.

get_delta_step
        bcf wcs_flags1,ts_decreased     ; assume step increase
        movfw old_throttle_step         ; get new step
        subwf new_throttle_step,w       ; subtract old step
        skpnc                           ; positive, skip negate
        goto ds_pos
ds_neg
        bsf wcs_flags1,ts_decreased     ; say zone decreased
        sublw 0                         ; make it positive
ds_pos
        movwf temp_1                    ; save it for a second
        movfw new_throttle_step         ; get new step
        movwf old_throttle_step         ; set old step
        movfw temp_1                    ; recall delta
        return ; DO_MT_PRESS and DO_MT_RELEASE take care of the min throttle
press
; and release logic when entering or exiting throttle zone 0.

do_mt_release
        call fetch_next                 ; dump op, get string
        call skip_string                ; skip the press string
do_mt_press
        call fetch_next                 ; dump op, get string
```

© 1993 Thrustmaster, Inc.    65

```
        goto send_tstring        ; send the string

; LOC_PR locates the MT p/r codes for the two throttle types loc_pr
        btfss wcs_flags1,is_type_2    ;
        goto t1_loc_pr                ; locate pr for type 1
        goto t2_loc_pr                ; locate pr for type 2
```

© 1993 Thrustmaster, Inc.

; TX_KEY send the character in w to the PC.

```
tx_key
        movwf tx_data              ; put char in xmit data reg
;       return                     ; DEBUG ONLY
        bcf intcon,gie             ; disable all interrupts
        movlw b'00000111'          ; set standard port b configuration
        tris port_b                ;
txquiet
        clrf rtcc                  ; clear the real time clock register
txquiet1
        btfss port_b,0             ; test keyboard clock line
        goto txquiet               ; start timer again, clock active
        btfss port_b,1             ; keyboard data line quiet?
        goto txquiet               ;
        btfsc wcs_flags2,dl_mode   ; if download, go fast
        goto gofast                ;
goslow                             ;
        movlw 0feh                 ; character rate in run mode
        goto speedisset            ;
gofast                             ;
;       movlw 30h                  ; character rate in download mode
        movlw 08h                  ; character rate in download mode
        bcf k_con_port,k_con       ; set 4066's to off
speedisset                         ;
        subwf rtcc,w               ; check rtcc, see if quiet long enough
        skpc                       ;
        goto txquiet1              ; no, wait some more bsf wcs_flags2,tx_parity   ; set parity flag, gens odd parity
```

```
            movlw .8                    ; initialize bit counter
            movwf tx_rx_ctr             ;
            movlw b'00010000'           ; used to xor tx_parity on '1's
tx_keyparity
            rrf tx_data,f               ; rotate transmit register
            skpnc                       ; no carry, bit is '0'
            xorwf wcs_flags2,f          ; flip parity bit, bit is 1
            decfsz tx_rx_ctr,f          ; decrement the bit counter
            goto tx_keyparity           ;
            rrf tx_data,f               ; rotate to realign data
            clrc                        ; assume no parity bit
            btfsc wcs_flags2,tx_parity  ; it's 0, you're right
            bsf status,carry            ; otherwise, set the parity
            movlw .9                    ; set bit counter to 8 bits+parity
            movwf tx_rx_ctr             ;
            bsf k_clk_port,k_clk        ; preset to 1 before enabling output
            bsf k_data_port,k_data      ;
            bcf k_con_port,k_con        ; set 4066's to off, disable kbd
            movlw b'00000100'           ; enable k_clk and k_data for output
            tris port_b                 ;
tx_key1
            bcf k_data_port,k_data      ; send start bit
            call tx_clr_clk             ; drop the clock and delay
tx_key2                                 ;
            call tx_set_clk             ; raise the clock and dely
            rrf tx_data,f               ; shift next data bit to carry
            skpnc                       ;
            bsf k_data_port,k_data      ; if carry, set data to 1
            skpc                        ;
            bcf k_data_port,k_data      ; if not carry, set data to 0
```

© 1993 Thrustmaster, Inc.        68

```
        call tx_clr_clk            ; drop clock and delya
        decfsz tx_rx_ctr,f         ; all bits sent?
        goto tx_key2               ; no, loop for next
        call tx_set_clk            ; clean up, raise clock line
        bsf k_data_port,k_data     ; send stop bit
        call tx_clr_clk            ; clear and delay
tx_keyend                          ;
        call tx_set_clk            ; set and delay
        bsf k_data_port,k_data     ; set k_data before releasing
        movlw b'00000111'          ; port b back to standard
        tris port_b                ;
        movlw b'00001011'          ; port a back to standard
        tris port_a                ;
;       btfss wcs_flags2, dl_mode  ; no kbd until out of download
        btfsc wcs_flags2, dl_mode
        return
        bsf k_con_port,k_con       ; set 4066's to on, enable kbd
txquietatend
        clrf rtcc                  ; restart the real time clock
txquietatend1
        btfss port_b,0             ; test clock line
        goto txquietatend          ; start timer again, clock active
        btfss port_b,1             ; test data
        goto txquietatend          ; start timer again, data active
        movlw .3                   ;
        subwf rtcc,w               ;
        skpc                       ; do character delay
        goto txquietatend1         ;
        btfsc op_code,no_delay     ; check for no delay
        return
```

© 1993 Thrustmaster, Inc.

```
; CHAR_DELAY inserts a delay period after a character is sent which is
;   determined by the char_pace variable initialized by the user rate
;   instruction.

char_delay
        incf char_pace,w        ; get char dly + 1
ack_delay
        movwf tx_rx_ctr         ; save in outer loop counter
cd_lp
        movlw k_cdly            ; get inner char delay constant
        call tx_delay           ; run it through the utility timer
        decfsz tx_rx_ctr,f      ; decrement the outer loop
        goto cd_lp              ; go again if not 0
        return tx_clr_clk
        movlw delay10us         ; delay 10 us, clear clock
        movwf tx_timer          ;
tcc_lp
        decfsz tx_timer,f       ;
        goto tcc_lp             ;
        bcf k_clk_port,k_clk    ;
        movlw delay10us         ; delay 10 us and return
        goto tx_delay tx_set_clk
        movlw delay15us         ; delay 15 us
        movwf tx_timer          ;
tsc_lp
```

© 1993 Thrustmaster, Inc.       70

```
        decfsz tx_timer,f        ;
        goto tsc_lp              ;
        bsf k_clk_port,k_clk     ; set the clock line
        movlw delay10us          ; delay 10 us and return
tx_delay
        movwf tx_timer           ;
txd_lp
        decfsz tx_timer,f        ;
        goto txd_lp              ;
        return
```

© 1993 Thrustmaster, Inc.

; WCS.ASM Source Code for WCS Mark II

; Rev 1.00 - 10/20/93 - Initial Release
; Rev 1.01 - 10/24/93 - Modified BTN_HM routine in CHAR.WSC to enable
;                       multi-character HM codes
;                       Change window around detents to +/- 8
; Rev 1.02 - 11/02/93 - Change TTYPE1.ASM to send throttle chars without
;                       break codes
;                       Change CHAR.WCS to add delay after first repeat char
; Rev 1.03 - 11/02/93 - Change DOWNLOAD.WCS to move throttle back after cal
; Rev 2.00 - 11/22/93 - Change DOWNLOAD.WCS to use keyboard light method
;                       Change TXKEY.WCS to fix timing for new download method
;                       Change EEPROM.WCS to simplify

```
        org 000h include "wcs.equ"       ; equates and memory map, etc.
```

; RESET is the entry from power-on reset

```
reset
        goto init_wcs
        include "cases.wcs"     ; case statements
init_wcs
        include "init.wcs"      ; do initialization code
        include "main.wcs"      ; main program loop
```

; major support functions

```
        include "buttons.wcs"      ; button read routines
        include "throttle.wcs"     ; throttle processor routines
        include "ttype1.wcs"       ; throttle type 1 routines
        include "ttype2.wcs"       ; throttle type 2 routines
        include "download.wcs"     ; download and calibrate routines
        include "char.wcs"      ; character/string routines
        include "chksum.wcs"       ; program check sum routines ; hardware support routines include "eeprom.wcs"       ; eeprom support routines
        include "adc.wcs"       ; adc support routines
        include "txkey.wcs"        ; key transmit routines
        include "rxkey.wcs"        ; key recieve routines end
```

© 1993 Thrustmaster, Inc.

; WCS.EQU: Equates and Register Assignments for WCS

; Constants

```
;       enter_key equ 05ah              ; scan code for enter key
        enter_key equ 066h              ; use backspace for 2k part
        ack_code equ 0fah           ; keyboard command acknowledge code
        break equ 0f0h                  ; scan code for break character
        shf_key equ 012h            ; scan code for shf key
        alt_key equ 011h            ; scan code for alt key
        ctl_key equ 014h            ; scan code for ctl key
        k_cdly equ 0fah                 ; inner loop timer for
        ee_cal_data equ 0           ; pointer to eeprom calibration data
        ch_0 equ 00h                    ; adc channel 0 select
        ch_1 equ 08h                    ; adc channel 1 select delay15us equ .6            ; approx count for 15us delay @ 4MHz
        delay10us equ .4            ; approx count for 10us delay @ 4MHz
        delay20us equ .3            ; approx count for 20us delay @ 4MHz first_cmd equ 0c0h          ; first download/calibrate command
        cal_cmd equ 0c2h            ; select calibrate command
        dl_cmd equ (0c1h ^ cal_cmd)     ; select download command go equ 02h                  ; ad con register bit
        hat_adc_id equ ch_1             ; adc channel 1 for hat
        throttle_adc_id equ ch_0 ; adc channel 0 for throttle
        no_err equ 0
        error equ 1
        tries equ 20                ; delay in cycles * 256 after ee ops
```

© 1993 Thrustmaster, Inc.

```
ee_read_cmd   equ b'10000000'   ; read command op code
ee_write_cmd  equ b'01000000'   ; write command op code
ee_wr_en_cmd  equ b'11000000'   ; write enable command op code
ee_wr_dis_cmd equ b'00000000'   ; erase disable command op code
```

; Port Assignments

```
port_a equ 05h              ; port a address
port_b equ 06h              ; port b address
k_con_port equ port_a       ; keyboard control port
k_clk_port equ port_b       ; keyboard clock port
k_data_port equ port_b      ; keyboard data port
ee_port equ port_b          ; port used for 93cx6 control.
ee_cs_port equ port_a       ; port used for 93cx6 chip select
```

; PIC special locations

```
indirect equ 00h        ; indirect addressing register
rtcc equ 01h            ; rtcc working register
pcl equ 02h             ; pcl register id
status equ 03h          ; PIC status register
fsr equ 04h             ; file select register id
adcon equ 08h           ; adc control, bank 0
adcon_0 equ 08h         ; adc control, bank 0
adcon_1 equ 088h        ; adc control, bank 1
adc_result equ 09h      ; adc result register
intcon equ 0bh          ; interrupt control register
option_reg equ 01h      ; old option register
```

; static variables

© 1993 Thrustmaster, Inc.

```
wcs_flags1 equ 0ch        ; gp flag bytes
wcs_flags2 equ 0dh
inbyte_1 equ 0eh          ; first button byte
inbyte_2 equ 0fh          ; second button byte
delta_1 equ 10h               ; first delta bit save
delta_2 equ 11h               ; second delta bit save
tt_flags_1 equ 12h
tt_flags_2 equ 13h
char_pace equ 14h         ; base of user program
inst_ptr equ 15h          ; instruction pointer
op_code equ 16h               ; opcode storage
char_code equ 17h         ; character code storage
old_throttle_zone equ 018h
old_throttle_step equ 019h
old_throttle_val equ 01ah
current_char equ 01bh     ; repeating character storage
ip_hold equ 01ch ; tx/rx variables rx_data equ 01dh
tx_data equ 01eh
tx_rx_ctr equ 01fh
tx_timer equ 020h ; eeprom vars, share with tx/rx ee_cmd equ 01dh           ; this register contains the 4 bit
ee_addr equ 01eh          ; address for eeprom ops
```

© 1993 Thrustmaster, Inc.          76

```
ee_low_b equ 01fh        ; low byte for eeprom ops
ee_high_b equ 020h       ; high byte for eeprom ops
```

; Temporary storage regs

```
temp_1 equ 021h          ; temporary working register
temp_2 equ 022h
temp_3 equ 023h
temp_4 equ 02ah          ; only in char, eeprom
```

; Dynamic Variables

; temporary variables used during download routines

```
dl_bytes equ 025h        ; number of bytes to download
ee_cnt equ 026h          ; used for ready check
ee_cnthi equ 027h        ; used for ready check
cal_lp_ctr equ 02bh      ; used only in calibrate
rx_temp equ 02ch         ; temp storage during download
ee_temp equ 02dh         ; temp storage for ee write
cal_temp equ 02eh        ; temp storage for calibration value check_sum_temp equ 02eh  ; temp storage during checksum routine
```

; temporary variables used during throttle routines

```
new_throttle_step equ 024h
new_throttle_zone equ 025h
move_steps equ 026h
```

© 1993 Thrustmaster, Inc.

```
temp_char equ 027h        ; temporary character storage
n_throttle equ 028h       ; number of throttle steps
n_ab equ 029h             ; number of ab steps
idw_min equ 02bh          ; idle detent window min
idw_max equ 02ch          ; idle detent window max
abw_min equ 02dh          ; ab window min
abw_max equ 02eh          ; ab window max
thr_max equ 02fh          ; maximum throttle value
```

; Bit IDs

; definitions for wcs_flagsI

```
is_type_2 equ 0           ; set for type 2 throttle
no_change equ 1           ; set when no button changes
scan_done equ 2           ; scan complete flag
is_repeating equ 3        ; true if character is repeating
ts_decreased equ 4        ; true if throttle step decreased
analog_mode equ 5         ; set if analog mode selected
calibrate_mode equ 6      ; set if calibrate mode selected
key_released equ 7        ; set during release of key
```

; definitiions for wcs_flags2

```
shf_down equ 0            ; shift state flags
ctl_down equ 1            ;   0=none, 1=shf, 2=ctl, 3=alt
alt_down equ 2            ; not currently used
ee_byte_2 equ 3           ; flag when ee_high is needed
tx_parity equ 4           ; bit for tx parity determination
dl_mode equ 5             ; flag when in download mode
```

© 1993 Thrustmaster, Inc.          78

```
        mt_pressed equ 6           ; flag when min throttle is pushed
        mt_released equ 7          ; flag when min throttle is released
```

; special flag, uses op_code bit 7, only set to short circuit char delay
;   in tx_break. all opcodes have bit 7 as 0, so it is normally clear.
```
        no_delay equ 7             ;
```

; defs for keyboard bits

```
        k_con equ 02h              ; k_con_port bit id
        k_clk equ 00h              ; k_clk_port bit id
        k_data equ 01h             ; k_data_port bit ic
```

; bit id in inbyte_2

```
        bttn_pressed equ 7         ; flag id for button pressed
```

; bit id in delta_2

```
        bttn_changed equ 7         ; flag id for button changed
```

; bit id in tt_flags_2

```
        toggle_on equ 7            ; flag if toggle is on
```

; pic status byte locations

```
        carry equ 0                ; carry bit loc in pic status
        rp0 equ 5                  ; register page switch in pic status
```

```
; pin interrupt control reg locations gie equ 7              ; intcon global interrupt enable bit ; bit defs for inbyte_1 j_trig equ 0
        j_top equ 1            ; top joystick
        j_middle equ 2            ; middle joystick
        j_bottom equ 3            ; bottom joystick
        wcs_3 equ 4            ; wcs button 1
        wcs_2 equ 5            ; wcs button 2
        wcs_1 equ 6            ; wcs button 3
        rkr_dn equ 7           ; wcs rkr down ; bit defs for inbyte_2 wcs_4 equ 0            ; wcs button 6
        wcs_5 equ 1            ; wcs button 5
        wcs_6 equ 2            ; wcs button 4
        rkr_up equ 3           ; wsc rocker up
        hat_left equ 4            ; hat left
        hat_dn equ 5              ; hat down
        hat_right equ 6           ; hat right
        hat_up equ 7              ; hat up ; bit defs for i/o ports sel_g1 equ 06h         ; port b
        sel_g2 equ 07h         ; port b
```

© 1993 Thrustmaster, Inc.            80

```
sw_g1  equ 03h        ; port a
sw_g2  equ 02h        ; port b
ee_cs  equ 04h        ; a) ee_cs_port pin tied to cs
ee_din equ 04h        ; b) ee_port pin tied to di
ee_dout equ 05h       ; b) ee_port pin tied to do
ee_clk equ 03h        ; b) ee_port pin tied to clk
```

; Port A Mapping          Port B Mapping

; A0 - Throttle Input (ADC0)           B0 - Keyboard Clock (I/O)
; A1 - Hat Input (ADC1)                B1 - Keyboard Data (I/O)
; A2 - Keyboard Controller Enable (O)  B2 - Button Group 2 Sense (I)
; A3 - Button Group 1 Sense (I)        B3 - AD0/EEProm Clock (O)
; A4 - EEProm Chip Select (O)          B4 - AD1/Data To EEProm (O)
; A5 - N/A                             B5 - AD2/Data From EEProm (I/O)
; A6 - N/A                             B6 - Button Group 1 Select (O)
; A7 - N/A                             B7 - Button Group 2 Select (O)

; Addresses of inputs and also the order of the bits in inbyte_1,2 right
;   after the button read loop.

; Group 1 Inputs          Group 2 Inputs

; 0 - Joystick Trigger        0 - WCS Button 5 TB
; 1 - Joystick Top            1 - WCS Button 6 TM
; 2 - Joystick Middle         2 - WCS Button 4 TT
; 3 - Joystick Bottom         3 - WCS Rocker Up
; 4 - WCS Button 3 FR         4 - WCS Rocker Dn (hat left)
; 5 - WCS Button 2 FC         5 - J13 (hat down)
; 6 - WCS Button 1 FL         6 - Base Switch Analog (hat rite)

© 1993 Thrustmaster, Inc.         81

; 7 - Joystick Cam (rkr dn)

7 - Base Switch Calibrate (hat up)

WCS Memory Map

| | |
|---|---|
| 00 | Program Checksum |
| 01 | Idle Detent Calibration Value |
| 02 | AB Detent Calibration Value |
| 03 | Maximum Throttle Calibration Value |
| 04 | Character Rate (0..255) |
| 05 | NU - max id. of unshifted characters in map |
| 06 | NS - max id of shifted characters in map |
| 07 | NC - max id of control characters in map |
| 08 | NSC - max id of shf_ctl characters in map |
| 09 | NA - max id. of alt characters in map |
| 0a | NSA - max id of shf_alt characters in map |
| 0b | NC - max id of ctl_alt characters in map |
| 0c | NA - max id of shf_ctl_alt characters in map |

0d..0x     Character map starts here, continues until NU+NS+NC+NA characters have been defined. 56 codes could be referenced, but memory would limit it to something less. Codes are number 8..63, lower 8 are used as opcodes. Character 7 is a special case used for the RKR UP and RKR DN codes.

0x..7f     Remainder of memory available for program storage

Char codes when hi bits are both 0 and low six are less than 8

00 end of user program
01 null button
02 button with umd codes defined
03 button with toggle codes defined © 1993 Thrustmaster, Inc.

04 throttle type 1
05 throttle type 2
06 BTN HM
07 not defined, does end program All other codes have a character ID in the low six bits (cc)

00cc single char, no release, end of definition
01cc start string
10cc single char, no release code (can repeat)
11cc single char, release code follows (can repeat)

For the MT Press and MT Release strings, the following special ops are defined:

00 - end string, no repeat
01 - string continue
10 - single repeating char
11 - null string Within a string, the following subopcodes are defined. Again, the low 6 bits hold a character code (cc).

00cc end of definition
01cc continue string
10cc end of string (used in single chars, UMDs p1,p2,p3,r1,r2)
11cc end of press string, release code follows ( )

Within the button codes, UMD strings will be in order of Up, Middle, Down, if UMD codes are specified for the button in question. All 3 must be present or a single code must be present.

During Compilation, DOWNLOAD arranges the throttle and buttons in the following order within the program before sending them to the WCS.

HM - Hat Release Character (optional)　　　HM
00 - Hat Up　　　HU
01 - Hat Right　HR
02 - Hat Down　　HD
03 - Hat Left　　HL
04 - Rocker Up　UP
05 - WCS 4　　　4
06 - WCS 6　　　6
07 - WCS 5　　　5
08 - Rkr Dn　　　Rkr Dn
09 - WCS 1　　　1
10 - WCS 2　　　2
11 - WCS 3　　　3
12 - Joy Bottom　LB
13 - Joy Middle　MB
14 - Joy Top　　UB
15 - Trigger　　TG
TH - Throttle Opcode (Optional) MT Codes Follow only if present
00 - End of Program Flag All buttons must be present. Unused buttons will be represented by an 01 opcode.

Button Possibilities (bracketed values show possibilities with/without release codes).

1. Single Press, No Release      [00cc,10cc]
2. Single Press, Single Release  11cc, [00cc,10cc]
3. Single Press, String Release  11cc, 01cc, 01cc, [00cc,10cc]
4. String Press, No Release      01cc, 01cc, [00cc, 10cc]
5. String Press, Single Release  01cc, 01cc, 10cc, [00cc, 10cc]
6. String Press, String Release  01cc, 01cc, 11cc, 01cc, 01cc, [00cc, 10cc]

When UMD codes are defined, the three press release pairs will be preceded immediately by an opcode 02.

When a toggle is defined, the press/release pair will be preceded immediately
by an opcode 03.

Rocker

Since the RKR UP and RKR DN codes are non-repeating, a special character
code 7 is defined for when these have single character press codes. The only possibility is that the first byte of the press code for RKR UP and RKR DN is a 47, i.e. continue code, null character. The string processor won't send this code, but since it causes the string to be viewed as multi-character, it will not repeat the next char, which is the actual press code and is defined just like other press code terminations.

Throttle

The compiler will place the throttle opcode last in line after all button opcodes. Throttle data is stored thus:

for type 0:
    opcode (00)         ; just use end of program for type 1:
    opcode (01)
    n_throttle        ; number of throttle steps
    n_ab             ; number of ab steps
    throttle up char   ; all chars are stored as wcs internal
    throttle down char ;  code ids 8..63
    ab on char        ;
    ab off char       ;
    ab up char        ;
    ab down char      ;
    press string      ; defined with BTN MT
    release string     ; defined with BTN MT for type 2
    opcode (02)
    n_throttle        ; number of throttle steps
    n_ab             ; number of after burner steps
    throttle chars     ; all chars are stored as wcs internl
    ab chars         ;  code ids 8..63
    press string     ; defined with button mt
    release string    ; defined with button mt © 1993 Thrustmaster, Inc.

We claim:

1. A method of calibrating a controller in a video game/ simulator on a personal computer having a calibration mode and a functional mode, the controller including a position-detecting input device and a multiposition switch having a calibration position and at least one functional control position, the method comprising:

setting the controller in the calibration mode;

positioning the position-detecting input device into a first position wherein the position-detecting input device generates a first output signal corresponding to the first position;

sampling the first output signal;

assigning one or more keycodes to the first sampled signal;

positioning the position-detecting input device into a second position wherein the position-detecting input device generates a second output signal corresponding to the second position;

sampling the second output signal;

assigning one or more keycodes to the second sampled signal; and switching the controller switch to the functional control position to place the controller in a functional mode responsive to the functional control position;

the keycodes assigned to the first sampled signal being transmitted to the personal computer during the functional mode when the position-detecting input device is positioned in the first position, and the keycodes assigned to the second sampled signal being transmitted to the personal computer during the functional mode when the position-detecting input device is positioned in the second position.

2. A method of calibrating a controller in a video game/ simulator according to claim 1 wherein the step of setting the controller in the calibration mode includes:

switching the controller switch to the calibration position; and detecting the switch position to place the controller in a calibration mode responsive to the calibration position of the switch.

3. A method of calibrating a controller in a video game/ simulator according to claim 1 wherein the step of positioning the position-detecting input device into a first position includes positioning the position-detecting input device in a full forward position, and wherein the step of positioning the position-detecting input device into a second position includes positioning the position-detecting input device in a full off position.

4. A method of calibrating a controller in a video game/ simulator according to claim 3 further including:

positioning the position-detecting input device into a plurality of intermediate positions between the first and second positions wherein the position-detecting input device generates a corresponding plurality of intermediate output signals corresponding to the intermediate positions;

sampling the plurality of intermediate output signals; and assigning one or more keycodes to each intermediate sampled signal;

the keycodes assigned to each intermediate sampled signal being transmitted to the personal computer during the functional mode when the position-detecting input device is positioned in the corresponding intermediate position.

5. A method of calibrating a controller in a video game/ simulator according to claim 1 wherein the step of sampling the first output signal includes:

sampling a first analog voltage signal corresponding to the first position the position-detecting input device; and converting the first sampled analog voltage signal to a digital calibration value; and wherein the step of sampling the second output signal includes:

sampling a second analog voltage signal corresponding to the second position the position-detecting input device; and converting the second sampled analog voltage signal to a digital calibration value.

6. A method of calibrating a controller in a video game/ simulator according to claim 5 further including:

determining a calibration range between the calibration values;

subdividing the calibration range into a plurality of sub-domains; and assigning one or more keycodes to each sub-domain, wherein the corresponding assigned keycodes are transmitted to the personal computer responsive to detecting an output signal from the position-detecting input device within the corresponding sub-domain.

7. A method of calibrating a controller in a video game/ simulator according to claim 6 wherein the step of subdividing the calibration range into a plurality of sub-domains includes subdividing the calibration range into a user-defined number of sub-domains.

8. A video game/simulator system comprising:

a personal computer having a microprocessor operable under control of a video game/simulator program during a functional mode, an input/output bus for connecting peripheral input and output devices to the microprocessor, and a keyboard interface port;

a game board coupled to the input/output bus having a first number of analog inputs and a second number of discrete inputs;

a display coupled to the personal computer for displaying images produced by operating the video game/simulator program;

a video game/simulator controller including:

a user actuated rheostat having an output for producing an output signal, a keyboard input/output port coupled to the computer keyboard interface port, first means for transmitting the rheostat output signal as an analog signal to one of the game board analog inputs, second means for transmitting a digital keycode via the keyboard interface port responsive to the rheostat output signal, and a switch coupling the rheostat output signal selectively to the first and second transmitting means to operate the rheostat in an analog mode or a digital mode.

9. A video game/simulator system according to claim 8 wherein the second transmitting means includes:

a microcontroller having an analog-to-digital input, and a input/output port coupled to the computer keyboard interface port;

a memory coupled to the microcontroller for storing digital keycodes; and a resistor coupled between the microcontroller analog-to-digital input and a common supply voltage;

the microcontroller being operable to transmit a digital keycode via the keyboard interface port responsive to the rheostat output signal when the switch is in the digital mode.

10. A video game/simulator system according to claim 8 wherein the rheostat includes a plurality of parallel discrete resistors coupled between corresponding user-actuated discrete switches and the rheostat output for producing a plurality of discrete rheostat output signals.

11. A video game/simulator system according to claim 10 wherein the microcontroller transmits a digital keycode via the keyboard interface port responsive to each of the rheostat output signals.

12. A video game/simulator system according to claim 9 wherein the video game/simulator controller includes a throttle handle coupled to the rheostat such that the rheostat produces an continuously variable output signal responsive to translational movement of the throttle handle between a first position and a second position when the switch is in the analog mode.

* * * * *